(12) United States Patent
Morinaka et al.

(10) Patent No.: US 11,757,130 B2
(45) Date of Patent: Sep. 12, 2023

(54) ADDITIVE FOR NON-AQUEOUS ELECTROLYTE SOLUTION, NON-AQUEOUS ELECTROLYTE SOLUTION, AND NON-AQUEOUS ELECTROLYTE SOLUTION BATTERY

(71) Applicant: CENTRAL GLASS CO., LTD., Yamaguchi (JP)

(72) Inventors: Takayoshi Morinaka, Ube (JP); Susumu Iwasaki, Ube (JP); Keita Nakahara, Shimonoseki (JP); Makoto Kubo, Kasai (JP); Mikihiro Takahashi, Ube (JP)

(73) Assignee: CENTRAL GLASS CO., LTD., Yamaguchi (JP)

( * ) Notice: Subject to any disclaimer, the term of this patent is extended or adjusted under 35 U.S.C. 154(b) by 349 days.

(21) Appl. No.: 16/645,577

(22) PCT Filed: Sep. 12, 2018

(86) PCT No.: PCT/JP2018/033844
§ 371 (c)(1),
(2) Date: Mar. 9, 2020

(87) PCT Pub. No.: WO2019/054418
PCT Pub. Date: Mar. 21, 2019

(65) Prior Publication Data
US 2020/0287241 A1    Sep. 10, 2020

(30) Foreign Application Priority Data
Sep. 12, 2017   (JP) .................. 2017-175037

(51) Int. Cl.
*H01M 10/0567*   (2010.01)
*H01M 4/131*   (2010.01)
(Continued)

(52) U.S. Cl.
CPC ....... *H01M 10/0567* (2013.01); *H01M 4/131* (2013.01); *H01M 4/133* (2013.01);
(Continued)

(58) Field of Classification Search
CPC ..... H01M 2300/0025; H01M 10/0564; H01M 10/0567; H01M 4/131; H01M 4/133;
(Continued)

(56) References Cited

U.S. PATENT DOCUMENTS 6,340,716 B1 *   1/2002   Armand ............... C07D 233/56
429/188
6,475,679 B1   11/2002   Tsutiya et al.
(Continued)

FOREIGN PATENT DOCUMENTS

CN   105070940   11/2015
EP   1 052 720   11/2000
(Continued)

OTHER PUBLICATIONS

International Search Report dated Dec. 4, 2018 in International (PCT) Application No. PCT/JP2018/033844.
(Continued)

*Primary Examiner* — Brian R Ohara
*Assistant Examiner* — Emily Elizabeth Freeman
(74) *Attorney, Agent, or Firm* — Wenderoth, Lind & Ponack, L.L.P.

(57) ABSTRACT

An additive for a non-aqueous electrolyte solution that can exhibit high-temperature cycle properties at 50° C. or more and low-temperature output properties at −20° C. or less in a well-balanced manner for a non-aqueous electrolyte solution battery. The additive for a non-aqueous electrolyte solution is represented by formula [1],
(Continued)

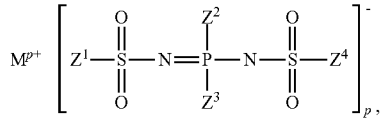

wherein $Z^1$, $Z^2$, $Z^3$, $Z^4$, $M^{p+}$ and p are as defined in the specification.

8 Claims, 4 Drawing Sheets

(51) Int. Cl.
| | | |
|---|---|---|
| | *H01M 4/133* | (2010.01) |
| | *H01M 10/0525* | (2010.01) |
| | *H01M 10/0568* | (2010.01) |
| | *H01M 10/0569* | (2010.01) |
| | *H01M 4/02* | (2006.01) |

(52) U.S. Cl.
CPC ... *H01M 10/0525* (2013.01); *H01M 10/0568* (2013.01); *H01M 10/0569* (2013.01); *H01M 2004/021* (2013.01); *H01M 2004/027* (2013.01); *H01M 2004/028* (2013.01)

(58) Field of Classification Search
CPC ......... H01M 10/0525; H01M 10/0568; H01M 10/0569; H01M 2004/021; H01M 2004/027; H01M 2004/028; H01M 2300/17
See application file for complete search history.

(56) References Cited

U.S. PATENT DOCUMENTS

| | | |
|---|---|---|
| 2002/0013381 A1 | 1/2002 | Armand et al. |
| 2003/0195269 A1 | 10/2003 | Armand et al. |
| 2004/0162362 A9 | 8/2004 | Armand et al. |
| 2005/0158631 A1 | 7/2005 | Armand et al. |
| 2005/0164093 A1 | 7/2005 | Otsuki et al. |
| 2006/0046151 A1 | 3/2006 | Otsuki et al. |
| 2007/0205388 A1 | 9/2007 | Armand et al. |
| 2017/0179528 A1* | 6/2017 | Lee ................ H01M 10/0587 |
| 2018/0375157 A1 | 12/2018 | Garsuch et al. |
| 2018/0375158 A1 | 12/2018 | Morinaka et al. |
| 2021/0028493 A1 | 1/2021 | Morinaka et al. |

FOREIGN PATENT DOCUMENTS

| | | |
|---|---|---|
| EP | 1 517 387 | 3/2005 |
| EP | 3 396 771 | 10/2018 |
| JP | 2000-123867 | 4/2000 |
| JP | 2001-507043 | 5/2001 |
| WO | 99/05100 | 2/1999 |
| WO | 2004/093224 | 10/2004 |
| WO | 2017/111143 | 6/2017 |

OTHER PUBLICATIONS

Extended European Search Report dated May 11, 2021 in corresponding European Patent Application No. 18857282.0.

* cited by examiner

ADDITIVE FOR NON-AQUEOUS ELECTROLYTE SOLUTION, NON-AQUEOUS ELECTROLYTE SOLUTION, AND NON-AQUEOUS ELECTROLYTE SOLUTION BATTERY

FIELD OF THE INVENTION

The present invention relates to an additive for a non-aqueous electrolyte solution and a non-aqueous electrolyte solution that can improve the low-temperature properties and the high-temperature durability in a well-balanced manner when used in a non-aqueous electrolyte solution battery, as well as a non-aqueous electrolyte solution battery using the same.

BACKGROUND TECHNOLOGY

In recent years, storage systems to be applied to small equipment that needs high energy density, such as information-technology-related equipment or communication equipment, specifically, personal computers, video cameras, digital still cameras, and cell phones, and storage systems to be applied to large equipment that needs high power, such as auxiliary power and energy storage for electric vehicles, hybrid electric vehicles and fuel cell electric vehicles have received attention. A non-aqueous electrolyte battery such as a lithium ion battery, a lithium battery, a lithium ion capacitor or a sodium ion battery has been actively developed as a candidate thereof.

Although many of these non-aqueous electrolyte solution batteries have already been put into practical use, each property is not satisfactory in various applications. In particular, in case of the use of being mounted on a vehicle such as an electric vehicle, since high input/output properties are required even in a cold season, the improvement in low-temperature properties is important, and high-temperature cycle properties, such as maintenance of the properties (less increase in the internal resistance) even when repeatedly charged and discharged in a high-temperature environment, are further required.

Until now, as a means of improving the high-temperature properties of non-aqueous electrolyte solution batteries and the battery properties (cycle properties) when charge and discharge are repeated, optimization of various battery components including positive and negative electrode active materials has been studied. Non-aqueous electrolyte solution-related technology is also no exception, and it has been proposed to use various additives for suppressing deterioration due to decomposition of the electrolyte solution on the surface of an active positive electrode or negative electrode. For example, Patent Document 1 proposes to improve battery properties by adding vinylene carbonate to the electrolyte solution.

In addition, as disclosed in Patent Document 2, a method for improving the conductivity of cations (reducing resistance) by using the specific ionic compound as a supporting electrolyte has been proposed.

PRIOR ART DOCUMENTS

Patent Documents

Patent Document 1: Japanese Patent Un-examined Publication number (hereinafter referred to simply as JP-A number) JP-A-2000-123867
Patent Document 2: JP-A-2001-507043

SUMMARY OF THE INVENTION

Subject to be Attained by the Invention

In non-aqueous electrolyte solution batteries using non-aqueous electrolyte solutions disclosed in the prior art documents, the compatibility between the durability performance at high temperature and the output performance at low temperature is not satisfactory, and accordingly there was room for improvement.

For example, although an electrolyte solution containing vinylene carbonate as disclosed in Patent Document 1 has improved cycle properties at high temperature, it has a problem in that the internal resistance significantly increases and the low-temperature properties decrease.

In addition, for example, although an electrolyte solution containing an ionic compound as a supporting electrolyte as disclosed in Example 4 of Patent Document 2 has improved cycle properties at high temperature, it has a problem in that the effect of improving low-temperature properties is low.

Furthermore, an electrolyte solution containing an ionic compound as a supporting electrolyte as disclosed in Example 15 of Patent Document 2 has a problem in that the effects of improving the cycle properties at high temperature and the low-temperature properties are both low.

It is an object of the present invention to provide an additive for a non-aqueous electrolyte solution that can exhibit high-temperature cycle properties at 50° C. or more and low-temperature output properties at −20° C. or less in a well-balanced manner, as well as a non-aqueous electrolyte solution containing such an additive and a non-aqueous electrolyte solution battery using such an electrolyte solution.

Means for Attaining the Subject of the Invention

The present inventors have intensively studied in view of the above problems, and as a result, have found that when an ionic compound having the specific structure is used as an additive in a non-aqueous electrolyte solution containing a non-aqueous solvent and a solute, a non-aqueous electrolyte solution battery using the resultant non-aqueous electrolyte solution can exhibit high-temperature cycle properties and low-temperature output properties in a well-balanced manner, and arrived at the present invention.

That is, the present invention provides an additive for a non-aqueous electrolyte solution (hereinafter, may be generally referred to simply as "ionic compound") represented by the following formula [1]:

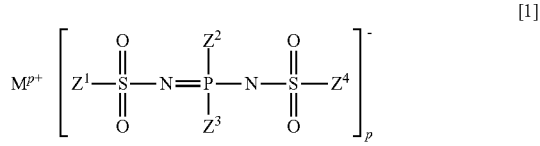

In formula [1], $Z^1$ to $Z^4$ are each independently a fluorine atom or an organic group selected from the group consisting of linear or branched alkyl groups having 1 to 10 carbon atoms, linear or branched alkoxy groups having 1 to 10 carbon atoms, linear or branched alkenyl groups having 2 to 10 carbon atoms, linear or branched alkenyloxy groups having 2 to 10 carbon atoms, linear or branched alkynyl groups having 2 to 10 carbon atoms, linear or branched alkynyloxy groups having 2 to 10 carbon atoms, cycloalkyl groups having 3 to 10 carbon atoms, cycloalkoxy groups having 3 to 10 carbon atoms, cycloalkenyl groups having 3 to 10 carbon atoms, cycloalkenyloxy groups having 3 to 10 carbon atoms, aryl groups having 6 to 10 carbon atoms, and aryloxy groups having 6 to 10 carbon atoms, where the organic group may contain a fluorine atom, an oxygen atom, or an unsaturated bond; and at least one of $Z^1$ to $Z^4$ is a fluorine atom.

Incidentally, the phrase "the organic group contains a fluorine atom" specifically means that a hydrogen atom in the group is substituted with a fluorine atom.

In addition, the phrase "the organic group contains an oxygen atom" specifically means, for example, that "—O—" (ether bond) is interposed between the carbon atoms in the group.

$M^{p+}$ is a proton, a metal cation, or an onium cation, and p is a cation valence.

In the ionic compound, it is preferable that $Z^1$ and $Z^4$ are independently a fluorine atom or a group selected from the group consisting of a methyl group, a trifluoromethyl group, and a phenyl group; $Z^2$ and $Z^3$ are each independently a fluorine atom or a group selected from the group consisting of a methoxy group, an ethoxy group, a propoxyl group, an allyloxy group, a 2-propynyloxy group, and a phenyloxy group; and at least one of $Z^2$ and $Z^3$ is a fluorine atom.

In the ionic compound, $M^{p+}$ is preferably a proton or at least one cation selected from the group consisting of a lithium ion, a sodium ion, a potassium ion, a tetraalkylammonium ion, and a tetraalkylphosphonium ion.

In addition, the present invention relates to a non-aqueous electrolyte solution containing a non-aqueous solvent, a solute, and the above-described additive for a non-aqueous electrolyte solution (hereinafter, may be referred to simply as "non-aqueous electrolyte solution" or "electrolyte solution").

The content of the additive for a non-aqueous electrolyte solution is preferably within a range of 0.005 to 5.0 mass % based on the total amount of the non-aqueous solvent, the solute, and the additive for a non-aqueous electrolyte solution. If the content is higher than 5.0 mass %, the discharge capacity may be decreased by excessive formation of a film. In contrast, if the content is less than 0.005 mass %, the formation of a film is insufficient, and the effect of improving the properties may become difficult to be realized.

The solute is preferably at least one selected from the group consisting of $LiPF_6$, $LiBF_4$, $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(POF_2)_2$, $LiN(FSO_2)(POF_2)$, $LiN(FSO_2)(POF(OCH_2C\equiv CH))$, $LiN(FSO_2)_2$, $LiN(CF_3SO_2)_2$, $LiN(CF_3SO_2)(FSO_2)$, $LiSO_3F$, $NaPF_6$, $NaBF_4$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(POF_2)_2$, $NaN(FSO_2)(POF_2)$, $NaN(FSO_2)_2$ $(POF(OCH_2C\equiv CH))$, $NaN(FSO_2)_2$, $NaN(FSO_2)(FCO)$, $NaN(CF_3SO_2)_2$, $NaN(CF_3SO_2)(FSO_2)$, and $NaSO_3F$.

The non-aqueous electrolyte solution may further contain at least one selected from the group consisting of vinylene carbonate (hereinafter may be referred to as "VC"), fluoroethylene carbonate, 1,3,2-dioxathiolane 2,2-dioxide, tetravinylsilane, 1,3-propanesultone, ethynylethylene carbonate, trans-di fluoroethylene carbonate, and (ethoxy)pentafluorocyclotriphosphazene. When such a compound is contained, at least any one of the cycle properties, high-temperature storage properties, and suppression of gas generation amount tends to be improved. Among these compounds, in particular, it is preferable to contain at least one selected from the group consisting of vinylene carbonate, fluoroethylene carbonate, 1,3,2-dioxathiolane 2,2-dioxide, tetravinylsilane, and 1,3-propanesultone, from the viewpoint of improving at least any one of the cycle properties, high-temperature storage properties, and suppression of gas generation amount.

The lower limit of the content of the compound optionally contained in the electrolyte solution is preferably 0.001 mass % or more, more preferably 0.005 mass % or more, and further preferably 0.01 mass % or more based on the total amount of the non-aqueous solvent, the solute, the additive for a non-aqueous electrolyte solution, and the "optionally contained compound", and the upper limit is preferably 5.0 mass % or less, more preferably 3.0 mass % or less, and further preferably 2.0 mass % or less.

Incidentally, the "optionally contained compound" is described in the item "other solute and additive" in the tables in Examples described below.

In addition, the non-aqueous solvent is preferably at least one selected from the group consisting of cyclic carbonates, chain carbonates, cyclic esters, chain esters, cyclic ethers, chain ethers, sulfone compounds, sulfoxide compounds, and ionic liquids.

In addition, the present invention relates to a non-aqueous electrolyte solution battery (hereinafter, may be referred to simply as a "non-aqueous battery" or "battery") at least including a positive electrode, a negative electrode, and the above-described electrolyte solution.

Effect of the Invention

According to the present invention, it is possible to provide an additive for a non-aqueous electrolyte solution that can exhibit high-temperature cycle properties at 50° C. or more and low-temperature output properties at −20° C. or less in a well-balanced manner, a non-aqueous electrolyte solution containing such an additive, as well as a non-aqueous electrolyte solution battery using such an electrolyte solution.

BRIEF DESCRIPTION BY THE DRAWINGS

DETAILED DESCRIPTION OF THE INVENTION

Figure 1:
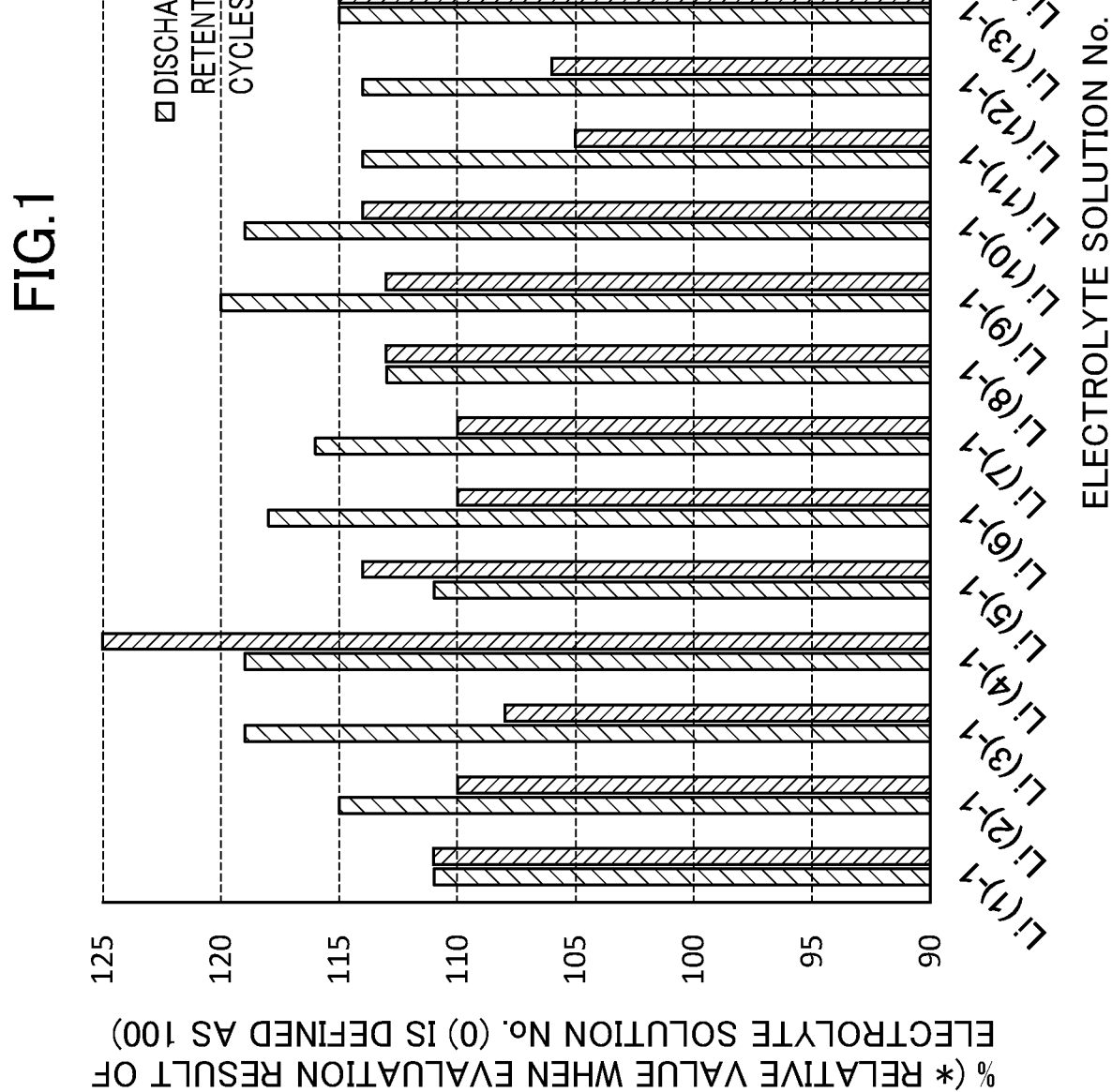
FIG. 1 shows the results of evaluation of Examples 1-1 to 1-16 and Comparative Examples 0 and 1-1 to 1-3.

The present invention will now be described in detail below. However, the descriptions of the components described below are examples of the embodiments of the present invention, and the scope of the present invention is not limited to these specific contents and can be carried out with various modifications within the scope of the gist of the present invention.

1. Additive for a Non-Aqueous Electrolyte Solution

Although the mechanism of the action of improving the battery properties by the present invention is not clear, it is conceived that the ionic compound of the present invention is partially decomposed at the interface between the positive electrode and the electrolyte solution and the interface between the negative electrode and the electrolyte solution to form a film. It is conceived that this film inhibits the direct contact between the non-aqueous solvent or the solute and the active material to prevent the decomposition of the non-aqueous solvent and the solute, so as to inhibit the deterioration of the battery performance.

Further, although the mechanism is not clear, it is important that the ionic compound has both a N=P bond moiety and a sulfonyl moiety (S(=O)$_2$), and it is conceived that a firm film is formed by incorporating the N=P bond moiety and the sulfonyl moiety (S(=O)$_2$) into the film. In addition, it is conceived that the charge in the film is biased and that the film has a high lithium conductivity, that is, has a low resistance (the film has good output properties).

In addition, it is important that the ionic compound has at least one P—F bond or S—F bond from the viewpoint of improving the low-temperature properties. It is conceived that when the above moiety includes a moiety having high electron-withdrawing properties (for example, a fluorine atom or a fluorine-containing alkyl group or alkoxy group), the charge bias is further increased and a film having a lower resistance (a film having better output properties) is formed. A larger number of the P—F bond and the S—F bond in the ionic compound is preferred from the viewpoint of improving the low-temperature properties. In particular, it is most preferable that $Z^1$ to $Z^4$ all represent fluorine atoms from the viewpoint of improving the low-temperature properties.

From the above reasons, it is inferred that the effect of improving the high-temperature cycle properties and the low-temperature output properties in a well-balanced manner is exhibited by the non-aqueous electrolyte solution containing the ionic compound of the present invention.

In the above formula [1], the groups represented by $Z^1$ to $Z^4$ are as follows. Examples of the alkyl group and the alkoxyl group include alkyl groups and fluorine-containing alkyl groups having 1 to 10 carbon atoms, such as a methyl group, an ethyl group, a propyl group, an isopropyl group, a butyl group, a sec-butyl group, a tert-butyl group, a pentyl group, a trifluoromethyl group, a 2,2-difluoroethyl group, a 2,2,2-trifluoroethyl group, a 2,2,3,3-tetrafluoropropyl group, and a 1,1,1,3,3,3-hexafluoroisopropyl group; and alkoxy groups derived therefrom.

Examples of the alkenyl group and the alkenyloxy group include alkenyl groups and fluorine-containing alkenyl groups having 2 to 10 carbon atoms, such as a vinyl group, an allyl group, a 1-propenyl group, an isopropenyl group, a 2-butenyl group, and a 1,3-butadienyl group; and alkenyloxy groups derived therefrom.

Examples of the alkynyl group and the alkynyloxy group include alkynyl groups and fluorine-containing alkynyl groups having 2 to 10 carbon atoms, such as an ethynyl group, a 2-propynyl group, and a 1,1-dimethyl-2-propynyl group; and alkynyloxy groups derived therefrom.

Examples of the cycloalkyl group and the cycloalkoxy group include cycloalkyl groups and fluorine-containing cycloalkyl group having 3 to 10 carbon atoms, such as a cyclopentyl group and a cyclohexyl group; and cycloalkoxy groups derived therefrom.

Examples of the cycloalkenyl group and the cycloalkenyloxy group include cycloalkenyl groups and fluorine-containing cycloalkenyl groups having 3 to 10 carbon atoms, such as a cyclopentenyl group and a cyclohexenyl group; and cycloalkenyloxy groups derived therefrom.

Examples of the aryl group and the aryloxy group include aryl groups and fluorine-containing aryl groups having 6 to 10 carbon atoms, such as a phenyl group, a tolyl group, and a xylyl group; and aryloxy groups derived therefrom.

More specifically, examples of the anion of the ionic compound represented by the above formula [1] include, but not limited to, the following anions (1) to (16):

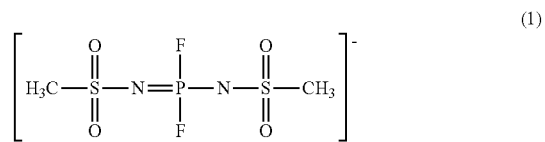

(1)

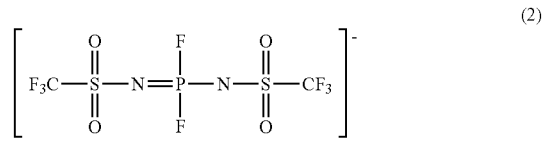

(2)

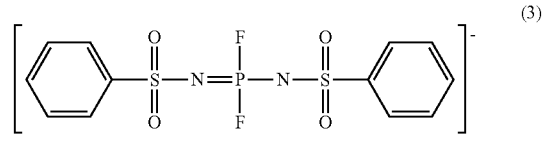

(3)

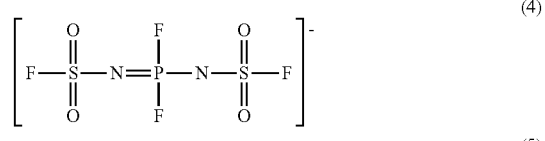

(4)

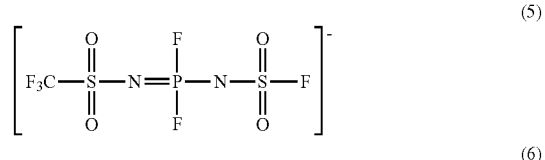

(5)

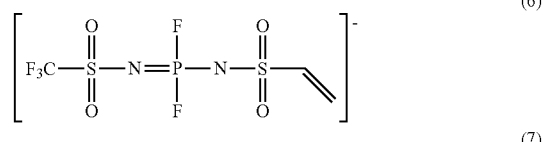

(6)

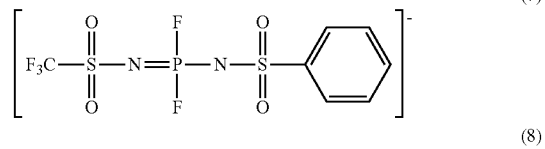

(7)

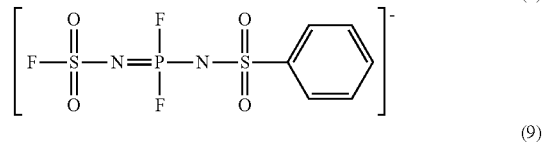

(8)

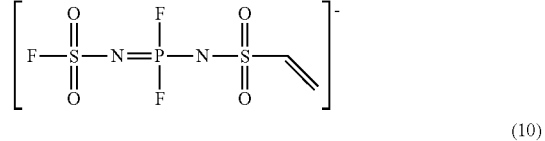

(9)

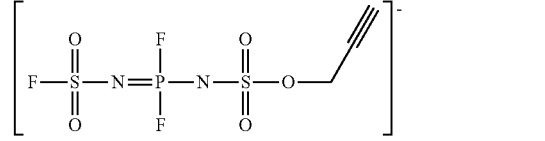

(10)

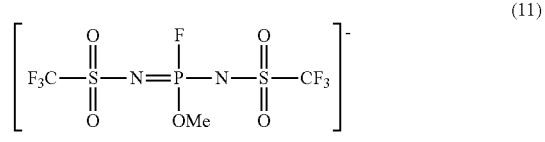

(11)

-continued

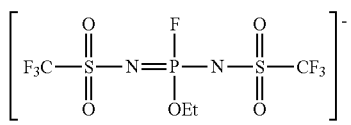
(12)

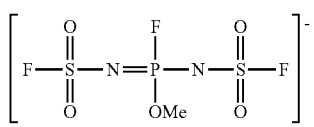
(13)

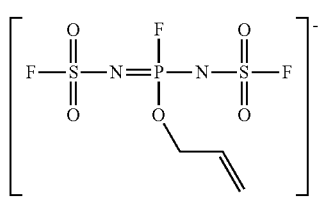
(14)

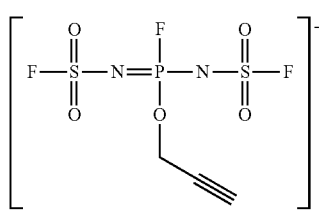
(15)

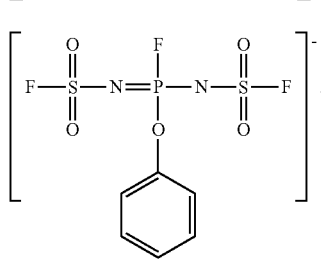
(16)

The ionic compound represented by formula [1] preferably has a high purity. In particular, the content of chlorine (Cl) in the ionic compound as a raw material before being dissolved in the electrolyte solution is preferably 5000 mass ppm or less, more preferably 1000 mass ppm or less, and further preferably 100 mass ppm or less. The use of the ionic compound having a high concentration of remaining chlorine (Cl) tends to corrode the battery members and is therefore not preferred. Especially, a content of chloride (Cl) of higher than 5000 mass ppm may corrode the current collector of the non-aqueous electrolyte solution battery and is not preferred.

In addition, the content of hydrofluoric acid in the ionic compound represented by formula [1] as a raw material before being dissolved in the electrolyte solution is preferably 5000 mass ppm or less and further preferably 1000 mass ppm or less. The content of hydrofluoric acid of higher than 5000 mass ppm may corrode the current collector of the non-aqueous electrolyte solution battery and is not preferred.

The ionic compound represented by formula [1] can be manufactured by various methods, and the manufacturing method is not particularly limited.

For example, as described in Patent Document 2, the ionic compound can be manufactured by reacting a corresponding phosphazo compound ($Z^1SO_2N=PXZ^2Z^3$ (X is a halogen atom)) and a corresponding sulfonylamide compound ($Z^4SO_2NH$-M) in the presence of an organic base or an inorganic base in the absence of a solvent or in a solvent that does not react with them.

The ionic compound can also be obtained by synthesizing $R^1SO_2N=P(R^2)(R^3)-NSO_2R^4$ and then converting $R^1$ to $R^4$ into $Z^1$ to $Z^4$, respectively, by a nucleophilic reaction.

2. Non-Aqueous Electrolyte Solution 2-1. Additive for Non-Aqueous Electrolyte Solution The non-aqueous electrolyte solution of the present invention contains a solute and a non-aqueous solvent both of which will be described below, and the additive for a non-aqueous electrolyte solution described above. Based on the total amount of the non-aqueous solvent, the solute, and the additive for a non-aqueous electrolyte solution, the lower limit of the content of the additive for a non-aqueous electrolyte solution in the electrolyte solution is preferably 0.001 mass % or more, more preferably 0.005 mass % or more, and further preferably 0.01 mass % or more, and the upper limit is preferably 5.0 mass % or less, more preferably 3.0 mass % or less, and further preferably 2.0 mass % or less.

If the content is lower than 0.001 mass %, since it is difficult to sufficiently obtain the effect of improving the battery properties, such a content is not preferred. In contrast, if the content is higher than 5.0 mass %, since a higher effect is not obtained, such a content is useless, and also since the resistance is increased due to excessive film formation to lead to a risk of causing deterioration of the battery performance, such a content is not preferred. The above-described ionic compounds as the additive for a non-aqueous electrolyte solution may be used alone or in any combination and at any ratio of two or more thereof, within a range not exceeding 5.0 mass % according to the application.

2-2. Solute

The type of the solute of the non-aqueous electrolyte solution of the present invention is not particularly limited, and any electrolyte salt can be used. In a non-aqueous electrolyte solution for a metal cation battery or a non-aqueous electrolyte solution for a capacitor, the solute may be a salt having a metal cation or an onium cation as an ion source. For example, in case of a lithium ion battery, the solute may be a lithium salt as the ion source. In case of a sodium ion battery, the solute may be a sodium salt as the ion source. As the counter anion thereof, in view of the degree of dissociation in the non-aqueous electrolyte solution, it is preferable to contain at least one selected from the group consisting of $PF_6^-$, $BF_4^-$, $PF_2(C_2O_4)_2^-$, $PF_4(C_2O_4)^-$, $P(C_2O_4)_3^-$, $BF_2(C_2O_4)^-$, $B(C_2O_4)_2^-$, $PO_2F_2^-$, $N(POF_2)_2^-$, $N(FSO_2)(POF_2)^-$, $N(FSO_2)(POF(OCH_2C\equiv CH))^-$, $N(FSO_2)_2^-$, $N(CF_3SO_2)_2^-$, $N(CF_3SO_2)(FSO_2)^-$, $SO_3F^-$, and $N(FSO_2)(FCO)^-$. In particular, in view of the energy density, output properties, durability performance, etc. as a battery, use of a combination of two or more thereof is preferred.

Examples of the solute in a lithium battery and a lithium ion battery include electrolyte salts, such as $LiPF_6$, $LiBF_4$, $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(POF_2)_2$, $LiN(FSO_2)(POF_2)$, $LiN(FSO_2)(POF(OCH_2C\equiv CH))$, $LiN(FSO_2)_2$, $LiN(CF_3SO_2)_2$, $LiN(C_2F_5SO_2)_2$, $LiN(CF_3SO_2)(FSO_2)$, $LiSO_3F$, $LiClO_4$, $LiAsF_6$, $LiSbF_6$, $LiCF_3SO_3$, $LiC(CF_3SO_2)_3$, $LiPF_3(C_3F_7)_3$, $LiB(CF_3)_4$, and $LiBF_3(C_2F_5)$.

In addition, examples of the solute in a sodium ion battery include electrolyte salts, such as $NaPF_6$, $NaBF_4$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(POF_2)$ 2, $NaN(FSO_2)(POF_2)$, $NaN(FSO_2)(POF(OCH_2C\equiv CH))$, $NaN(FSO_2)_2$, $NaN(CF_3SO_2)_2$, $NaN(C_2F_5SO_2)_2$, $NaN(CF_3SO_2)(FSO_2)$, $NaSO_3F$, NaN $(FSO_2)(FCO)$, $NaClO_4$, $NaAsF_6$, $NaSbF_6$, $NaCF_3SO_3$, $NaC(CF_3SO_2)_3$, $NaPF_3(C_3F_7)_3$, $NaB(CF_3)_4$, and $NaBF_3(C_2F_5)$).

These solutes may be used alone or in any combination and at any ratio of two or more thereof according to the application. In particular, considering the energy density, output properties, life duration, etc. as a battery, preferred are $LiPF_6$, $LiBF_4$, $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(POF_2)_2$, $LiN(FSO_2)(POF_2)$, $LiN(FSO_2)(POF(OCH_2C\equiv CH))$, $LiN(FSO_2)_2$, $LiN(CF_3SO_2)_2$, $LiN(CF_3SO_2)(FSO_2)$, $LiSO_3F$, $NaPF_6$, $NaBF_4$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(POF_2)_2$, $NaN(FSO_2)(POF_2)$, $NaN(FSO_2)(POF(OCH_2C\equiv CH))$, $NaN(FSO_2)_2$, $NaN(CF_3SO_2)_2$, $NaN(CF_3SO_2)(FSO_2)$, and $NaSO_3F$.

A suitable combination of the solutes in a lithium battery and a lithium ion battery is preferably, for example, a combination of at least one selected from the group consisting of $LiBF_4$, $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(POF_2)_2$, $LiN(FSO_2)(POF_2)$, $LiN(FSO_2)(POF(OCH_2C\equiv CH))$, $LiN(FSO_2)_2$, $LiN(CF_3SO_2)_2$, $LiN(CF_3SO_2)(FSO_2)$ and $LiSO_3F$, with $LiPF_6$. The ratio in the above combination (molar ratio when the $LiPF_6$ content is defined as 1 mole) is generally within a range of 1:0.001 to 1:0.5 and preferably 1:0.01 to 1:0.2. The use of such a combination of the solutes at the above-mentioned ratio provides an effect of further improving various battery properties. In contrast, when the ratio of LiPFE is lower than 1:0.5, the ionic conductance of the electrolyte solution decreases, and the resistance tends to increase.

The concentration of these solutes is not particularly limited, and the lower limit thereof is preferably 0.5 mol/L or more, more preferably 0.7 mol/L or more, and further preferably 0.9 mol/L or more, and the upper limit is preferably 2.5 mol/L or less, more preferably 2.0 mol/L or less, and further preferably 1.5 mol/L or less. When the concentration is less than 0.5 mol/L, the ionic conductance decreases, and thereby the cycle properties and output properties of the non-aqueous electrolyte solution battery tend to be reduced. In contrast, when the concentration is higher than 2.5 mol/L, the viscosity of the non-aqueous electrolyte solution increases, and thereby the ionic conductance likewise tends to be reduced, and the cycle properties and output properties of the non-aqueous-electrolyte solution battery may be reduced.

If a large amount of the above solute is dissolved at once in a non-aqueous solvent, the temperature of the non-aqueous electrolyte solution may be increased due to the heat of dissolution of the solute. When the solution temperature is significantly increased, the decomposition of the lithium salt containing a fluorine atom is accelerated, and hydrogen fluoride may be generated. Hydrogen fluoride becomes a cause of deterioration of the battery performance and is therefore not preferred. Accordingly, the solution temperature when the solute is dissolved in a non-aqueous solvent is not particularly limited but is preferably −20° C. to 80° C. and more preferably 0° C. to 60° C.

2-3. Non-Aqueous Solvent

The type of the non-aqueous solvent used in the non-aqueous electrolyte solution of the present invention is not particularly limited, and any non-aqueous solvent can be used. Examples of the non-aqueous solvent include cyclic carbonates, such as propylene carbonate, ethylene carbonate, and butylene carbonate; chain carbonates, such as diethyl carbonate, dimethyl carbonate, and ethyl methyl carbonate; cyclic esters, such as γ-butyrolactone and γ-valerolactone; chain esters, such as methyl acetate and methyl propionate; cyclic ethers, such as tetrahydrofuran, 2-methyltetrahydrofuran, and dioxane; chain ethers, such as dimethoxyethane and diethyl ether; and sulfone compounds and sulfoxide compounds, such as dimethyl sulfoxide and sulfolane. In addition, for example, ionic liquids whose category differs from that of the non-aqueous solvent can be used. In addition, the non-aqueous solvents used in the present invention may be used alone or may be used in any combination and at any ratio of two or more thereof according to the application. Among these non-aqueous solvents, from the viewpoint of the electrochemical stability against their redox and the chemical stability related to the heat and the reaction with the solute, propylene carbonate, ethylene carbonate, diethyl carbonate, dimethyl carbonate, and ethyl methyl carbonate are especially preferred.

For example, it is preferable to use a combination of one or more selected from cyclic carbonates having a high dielectric constant and one or more selected from chain carbonates or chain esters having a low liquid viscosity as the non-aqueous solvent, because such a combination increases the ionic conductance of the electrolyte solution.

2-4. Other Additives

The above is the description about the basic composition of the non-aqueous electrolyte solution of the present invention. Any additives that have been generally used may be added to the non-aqueous electrolyte solution of the present invention at any ratio within a range that does not impair the gist of the present invention. Examples of such additives include compounds that have overcharge prevention effect, negative electrode film-forming effect, and positive electrode protection effect, such as methylene methanedisulfonate, 1,2-ethanedisulfonic acid anhydride, 1,6-diisocyanatohexane, succinonitrile, cyclohexylbenzene, biphenyl, t-butylbenzene, vinylethylene carbonate, difluoroanisole, and dimethylvinylene carbonate.

Further, a metal salt other than the above-mentioned solutes (lithium salts and sodium salts) may be used as an additive. Examples of the metal salt include carboxylic acid salts, such as lithium acrylate, sodium acrylate, lithium methacrylate, and sodium methacrylate; and sulfuric acid ester salts, such as lithium methyl sulfate, sodium methyl sulfate, lithium ethyl sulfate, and sodium ethyl sulfate.

In addition, the non-aqueous electrolyte solution can also be used in a state which is quasi-solidified with a gelling agent or a cross-linking polymer as in case of being used in a non-aqueous electrolyte solution battery called a lithium polymer battery.

3. Non-Aqueous Electrolyte Solution Battery

The non-aqueous electrolyte solution battery of the present invention at least includes (i) the above-described non-aqueous electrolyte solution, (ii) a positive electrode, and (iii) a negative electrode including at least one selected from the group consisting of negative electrode materials containing lithium metal and negative electrode materials capable of occluding and releasing lithium, sodium, potassium, or magnesium. The non-aqueous electrolyte solution battery preferably further includes, for example, (iv) a separator and an outer case.

Positive Electrode (ii)

The positive electrode (ii) preferably includes at least one oxide and/or a polyanion compound as the positive electrode active material.

Positive Electrode Active Material

In a lithium ion secondary battery in which the main cation in the non-aqueous electrolyte solution is lithium, the positive electrode active material constituting the positive electrode (ii) may be any material that can be charged and discharged. Examples thereof include those containing at least one selected from (A) a lithium-transition metal composite oxide containing at least one metal selected from nickel, manganese, and cobalt and having a layered structure, (B) a lithium-manganese composite oxide having a spinel structure, (C) a lithium-containing olivine type phosphate, and (D) a lithium-rich layered transition metal oxide having a layered rock salt type structure.

(A) Lithium-Transition Metal Composite Oxide

Examples of the positive electrode active material (A): the lithium-transition metal composite oxide containing at least one metal selected from nickel, manganese, and cobalt and having a layered structure, include a lithium-cobalt composite oxide, a lithium-nickel composite oxide, a lithium-nickel-cobalt composite oxide, a lithium-nickel-cobalt-aluminum composite oxide, a lithium-cobalt-manganese composite oxide, a lithium-nickel-manganese composite oxide, and a lithium-nickel-manganese-cobalt composite oxide. In addition, those obtained by substituting a part of the transition metal atoms that are the main components of these lithium-transition metal composite oxides with other elements, such as Al, Ti, V, Cr, Fe, Cu, Zn, Mg, Ga, Zr, Si, B, Ba, Y, and Sn, may be used.

As the lithium-cobalt composite oxide or the lithium-nickel composite oxide, specifically, for example, $LiCoO_2$, $LiNiO_2$, lithium cobaltate doped with different elements such as Mg, Zr, Al, or Ti (e.g., $LiCo_{0.98}Mg_{0.01}Zr_{0.01}O_2$, $LiCo_{0.98}Mg_{0.01}Al_{0.01}O_2$, or $LiCo_{0.975}Mg_{0.01}Zr_{0.005}Al_{0.1}O_2$), or lithium cobaltate with a rare earth compound fixed on the surface described in WO 2014/034043 may be used. As described in JP-A-2002-151077, $LiCoO_2$ particle powder having particle surfaces partially coated with aluminum oxide may be used.

The lithium-nickel-cobalt composite oxide and the lithium-nickel-cobalt-aluminum composite oxide are represented by formula [1-1]:

$$Li_aNi_{1-b-c}Co_bM^1_cO_2 \quad [1-1]$$

In formula [1-1], $M^1$ is at least one element selected from the group consisting of Al, Fe, Mg, Zr, Ti, and B; a is $0.9 \leq a \leq 1.2$; and b and c satisfy $0.1 \leq b \leq 0.3$ and $0 \leq c \leq 0.1$.

These composite oxides can be prepared in accordance with, for example, the manufacturing method described in JP-A-2009-137834. Specifically, examples of the composite oxides include $LiNi_{0.8}Co_{0.2}O_2$, $LiNi_{0.85}Co_{0.01}Al_{0.05}O_2$, $LiNi_{0.87}Co_{0.10}Al_{0.03}O_2$, and $LiNi_{0.6}Co_{0.3}Al_{0.1}O_2$.

Examples of the lithium-cobalt-manganese composite oxide and the lithium-nickel-manganese composite oxide include $LiNi_{0.5}Mn_{0.5}O_2$ and $LiCo_{0.5}Mn_{0.5}O_2$.

Examples of the lithium-nickel-manganese-cobalt composite oxide include lithium-containing composite oxides represented by formula [1-2]:

$$Li_dNi_eMn_fCo_gM^2_hO_2 \quad [1-2]$$

In formula [1-2], $M^2$ is at least one element selected from the group consisting of Al, Fe, Mg, Zr, Ti, B, and Sn; d is $0.9 \leq d \leq 1.2$; and e, f, g, and h satisfy $e+f+g+h=1$, $0 \leq e \leq 0.8$, $0 \leq f \leq 0.5$, $0 \leq g \leq 0.5$, and $h \geq 0$.

The lithium-nickel-manganese-cobalt composite oxide preferably contains manganese within the range shown in formula [1-2] for increasing the structural stability and improving the safety of the lithium secondary battery at high temperature and more preferably further contains cobalt within the range shown in formula [1-2] for particularly increasing the high efficiency properties of the lithium ion secondary battery.

Specifically, examples of the lithium-nickel-manganese-cobalt composite oxide include $Li[Ni_{1/3}Mn_{1/3}Co_{1/3}]O_2$, $Li[Ni_{0.45}Mn_{0.35}Co_{0.2}]O_2$, $Li[Ni_{0.5}Mn_{0.3}Co_{0.2}]O_2$, $Li[Ni_{0.6}Mn_{0.2}Co_{0.2}]O_2$, $Li[Ni_{0.49}Mn_{0.3}Co_{0.2}Zr_{0.01}]O_2$, and $Li[Ni_{0.49}Mn_{0.3}Co_{0.2}Mg_{0.01}]O_2$, which have a charge-discharge region of 4.3 V or more.

(B) Lithium-Manganese Composite Oxide Having Spinel Structure

Examples of the positive electrode active material (B): the lithium-manganese composite oxide having a spinel structure, include spinel lithium-manganese composite oxides represented by formula [1-3]:

$$Li_j(Mn_{2-k}M^3_k)O_4 \quad [1-3]$$

In formula [1-3], $M^3$ is at least one metal element selected from the group consisting of Ni, Co, Fe, Mg, Cr, Cu, Al, and Ti; j is $1.05 \leq j \leq 1.15$; and k is $0 \leq k \leq 0.20$. Specifically, examples of thereof include $LiMn_2O_4$, $LiMn_{1.95}Al_{0.05}O_4$, $LiMn_{1.9}Al_{0.1}O_4$, $LiMn_{1.9}Ni_{0.1}O_4$, and $LiMn_{1.5}Ni_{0.5}O_4$.

(C) Lithium-Containing Olivine Type Phosphate Examples of the positive electrode active material (C): the lithium-containing olivine type phosphate, include those represented by formula [1-4]:

$$LiFe_{1-n}M^4_nPO_4 \quad [1-4]$$

In formula [1-4], $M^4$ is at least one selected from Co, Ni, Mn, Cu, Zn, Nb, Mg, Al, Ti, W, Zr, and Cd; and n is $0 \leq n \leq 1$.

Specifically, examples thereof include $LiFePO_4$, $LiCoPO_4$, $LiNiPO_4$, and $LiMnPO_4$, and in particular, $LiFePO_4$ and/or $LiMnPO_4$ is preferred.

(D) Lithium-Rich Layered Transition Metal Oxide

Examples of the positive electrode active material (D): the lithium-rich layered transition metal oxide having a layered rock salt type structure, include those represented by formula [1-5]:

$$xLiM^5O_2 \cdot (1-x)Li_2M^6O_3 \quad [1-5]$$

In formula [1-5], x is a number satisfying $0 < x < 1$; $M^5$ is at least one metal element having an average oxidation number of +3; and $M^6$ is at least one metal element having an average oxidation number of +4. In formula [1-5], $M^5$ is preferably one trivalent metal element selected from Mn, Ni, Co, Fe, V, and Cr and may be composed of equal amounts of divalent and tetravalent metals and having an average oxidation number of +3.

In addition, in formula [1-5], $M^6$ is preferably at least one metal element selected from Mn, Zr, and Ti. Specifically, they include $0.5[LiNi_{0.5}Mn_{0.5}O_2] \cdot 0.5[Li_2MnO_3]$, $0.5[LiNi_{1/3}Co_{1/3}Mn_{1/3}O_2] \cdot 0.5[Li_2MnO_3]$, $0.5[LiNi_{0.375}Co_{0.25}Mn_{0.375}O_2] \cdot 0.5[Li_2MnO_3]$, $0.5[LiNi_{0.375}Co_{0.125}Fe_{0.125}Mn_{0.375}O_2] \cdot 0.5[Li_2MnO_3]$, and $0.45[LiNi_{0.375}Co_{0.25}Mn_{0.375}O_2] \cdot 0.10[Li_2TiO_3] \cdot 0.45[Li_2MnO_3]$.

The positive electrode active material (D) represented by formula [1-5] is known to show a high capacity when charged at a high voltage of 4.4 V (based on Li) or more (for example, U.S. Pat. No. 7,135,252).

These positive electrode active materials can be prepared in accordance with the manufacturing method described in, for example, JP-A-2008-270201, WO 2013/118661, or JP-A-2013-030284.

The positive electrode active material may include at least one selected from the above compounds (A) to (D) as the main component, and examples of other components include transition element chalcogenide, such as $FeS_2$, $TiS_2$, $TiO_2$, $V_2O_5$, $MoO_3$, and $MoS_2$; conductive polymers, such as polyacetylene, polyparaphenylene, polyaniline, and polypyrrole; activated carbon; polymers generating radicals; and carbon materials.

Positive Electrode Current Collector

The positive electrode (ii) includes a positive electrode current collector. As the positive electrode current collector, for example, aluminum, stainless steel, nickel, titanium, or an alloy thereof can be used.

Positive Electrode Active Material Layer

In the positive electrode (ii), for example, a positive electrode active material layer is formed on at least one surface of the positive electrode current collector. The positive electrode active material layer is composed of, for example, the above-mentioned positive electrode active material, a binder, and, as needed, a conductive agent.

Examples of the binder include polytetrafluoroethylene, polyvinylidene fluoride, a tetrafluoroethylene-perfluoroalkyl vinyl ether copolymer, styrene-butadiene rubber (SBR), carboxymethyl cellulose, methyl cellulose, acetate phthalate cellulose, hydroxypropyl methyl cellulose, and polyvinyl alcohol.

As the conductive agent, for example, carbon materials, such as acetylene black, Ketjen black, furnace black, carbon fiber, graphite (granular graphite and flaky graphite), and fluorinated graphite, can be used. In the positive electrode, acetylene black and Ketjen black having low crystallinity are preferred.

Negative Electrode (iii)

The negative electrode material is not particularly limited, and in a lithium battery and a lithium ion battery, for example, lithium metal, an alloy or an intermetallic compound of lithium metal and another metal, a variety of carbon materials (artificial graphite, natural graphite, etc.), a metal oxide, a metal nitride, tin (simple substance), a tin compound, silicon (simple substance), a silicon compound, activated carbon, and a conductive polymer are used.

The carbon materials are, for example, easily graphitizable carbon, hardly graphitizable carbon (hard carbon) having an interplanar distance between the (200) planes of 0.37 nm or more, and graphite having an interplanar distance between the (002) planes of 0.34 nm or less. More specifically, the carbon materials are, for example, pyrolytic carbons, cokes, glassy carbon fibers, organic polymer compound fired products, activated carbon, and carbon blacks. Among these materials, the cokes include pitch coke, needle coke, and petroleum coke. The organic polymer compound fired product is a product obtained by firing and carbonizing, for example, a phenolic resin or a furan resin at an appropriate temperature. Since the carbon materials hardly change the crystal structure by occlusion and release of lithium, a high energy density and also excellent cycle properties are preferably obtained. Incidentally, the shape of the carbon material may be any of fibrous, spherical, granular, and flaky shapes. In addition, amorphous carbon and a graphite material having a surface coated with amorphous carbon are more preferable because the reactivity between the material surface and the electrolyte solution is lowered.

The negative electrode (iii) preferably includes at least one negative electrode active material.

Negative Electrode Active Material

In case of a lithium ion secondary battery in which the main cation in the non-aqueous electrolyte solution is lithium, the negative electrode active material constituting the negative electrode (iii) is a material that can dope and dedope lithium ions, and examples thereof include those containing at least one selected from (E) carbon materials having a lattice plane ((002) plane) d value of 0.340 nm or less determined by X-ray diffraction; (F) carbon materials having a lattice plane ((002) plane) d value of higher than 0.340 nm determined by X-ray diffraction; (G) oxides of one or more metals selected from Si, Sn, and Al; (H) one or more metals selected from Si, Sn, and Al, alloys containing these metals, or alloys of these metals or alloys with lithium; and (I) lithium titanium oxides. These negative electrode active materials can be used alone or in combination of two or more thereof.

(E) Carbon Material Having a Lattice Plane ((002) Plane) d Value of 0.340 nm or Less Determined by X-Ray Diffraction Examples of the negative electrode active material (E): the carbon material having a lattice plane ((002) plane) d value of 0.340 nm or less determined by X-ray diffraction, include pyrolytic carbons, cokes (such as pitch coke, needle coke, and petroleum coke), graphites, organic polymer compound fired products (such as products obtained by firing and carbonizing, for example, a phenolic resin or a furan resin at an appropriate temperature), carbon fibers, and activated carbon; and those obtained by graphitization thereof. The carbon material is one having an interplanar distance between the (002) planes (d002) of 0.340 nm or less measured by an X-ray diffraction method, and especially the carbon material is preferably graphite having a true density of 1.70 g/cm$^3$ or more or a highly crystalline carbon material having properties similar to those of the graphite.

(F) Carbon Material Having a Lattice Plane ((002) Plane) d Value of Higher than 0.340 Nm Determined by X-Ray Diffraction Examples of the negative electrode active material (F): the carbon material having a lattice plane ((002) plane) d value of higher than 0.340 nm determined by X-ray diffraction, include amorphous carbon, which is a carbon material hardly changing the stacking order even when heat-treated at a high temperature of 2000° C. or more. Examples thereof include hardly graphitizable carbon (hard carbon), meso-carbon microbeads (MCMB) fired at 1500° C. or less, and meso-phase pitch carbon fibers (MCF).

(G) Oxide of One or More Metals Selected from Si, Sn, and Al

Examples of the negative electrode active material (G): the oxide of one or more metals selected from Si, Sn, and Al, include oxides that can dope and dedope lithium ions, such as silicon oxide and tin oxide.

For example, $SiO_x$ having a structure in which ultrafine particles of Si are dispersed in $SiO_2$ is known. If this material is used as the negative electrode active material, since Si reacting with Li is in an ultrafine particle form, charge and discharge are smoothly performed. On the other hand, the surface area of the $SiO_x$ particle itself having the above structure is small. Therefore, when it is used as a composition (paste) for forming a negative electrode active material layer, the coating properties and the adhesive properties thereof to the current collector are satisfactory.

Incidentally, since $SiO_x$ significantly changes the volume by charge and discharge, both an increase in the capacity and good charge and discharge cycle properties can be achieved by using SiO together with the above-described graphite as the negative electrode active material (E) at a specific ratio as the negative electrode active material.

(H) One or More Metals Selected from Si, Sn, and Al, Alloys Containing these Metals, or Alloys of these Metals or Alloys with Lithium Examples of the negative electrode active material (H): one or more metals selected from Si, Sn, and Al, alloys containing these metals, or alloys of these metals or alloys with lithium, include metals, such as silicon, tin, and aluminum, silicon alloys, tin alloys, and aluminum alloys, and materials obtained from these metals and alloys by alloying with lithium by charge and discharge can also be used.

Preferred examples include those described in, for example, WO 2004/100293 or JP-A-2008-016424, e.g., metal simple substances, such as silicon (Si) and tin (Sn), (for example, in powder form); the metal alloys; compounds containing the metals; and alloys containing the metals and tin (Sn) and cobalt (Co). The use of such a metal in the electrode can realize a high charge capacity and causes relatively small expansion and contraction of the volume associated with charge and discharge and is therefore preferred. In addition, it is known that when these metals are used in the negative electrode of a lithium ion secondary battery, the metals are alloyed with Li during charging to show a high charge capacity, and the use of such a metal is also preferred on this point.

Furthermore, for example, a negative electrode active material formed of submicron-diameter pillars of silicon or a negative electrode active material formed of fibers of silicon described in, for example, WO 2004/042851 or WO 2007/083155 may be used.

(I) Lithium Titanium Oxide

Examples of the negative electrode active material (I): the lithium titanium oxide, include lithium titanate having a spinel structure and lithium titanate having a ramsdellite structure.

Examples of the lithium titanate having a spinel structure include $Li_{4+\alpha}Ti_5O_{12}$ ($\alpha$ changes within a range of $0 \leq \alpha \leq 3$ according to the charge and discharge reaction). Examples of the lithium titanate having a ramsdellite structure include $Li_{2+\beta}Ti_3O_7$ ($\beta$ changes within a range of $0 \leq \beta \leq 3$ according to the charge and discharge reaction). These negative electrode active materials can be prepared in accordance with the manufacturing method described in, for example, JP-A-2007-018883 or 2009-176752.

For example, in case of a sodium ion secondary battery in which the main cation in the non-aqueous electrolyte solution is sodium, as the negative electrode active material, hard carbon or an oxide, such as $TiO_2$, $V_2O_5$, or $MoO_3$, is used. For example, in case of a sodium ion secondary battery in which the main cation in the non-aqueous electrolyte solution is sodium, as the positive electrode active material, a sodium-containing transition metal composite oxide, such as $NaFeO_2$, $NaCrO_2$, $NaNiO_2$, $NaMnO_2$, or $NaCoO_2$; those in which the transition metals, such as Fe, Cr, Ni, Mn, and Co, of the sodium-containing transition metal composite oxides are mixtures thereof; those in which the transition metals of the sodium-containing transition metal composite oxides are partially substituted by metals other than transition metals; a phosphate compound of a transition metal, such as $Na_2FeP_2O_7$ or $NaCo_3(PO_4)_2P_2O_7$; a sulfide such as $TiS_2$ or $FeS_2$; a conductive polymer such as polyacetylene, polyparaphenylene, polyaniline, or polypyrrole; activated carbon; a polymer generating radicals; or a carbon material is used.

Negative Electrode Current Collector

The negative electrode (iii) includes a negative electrode current collector. As the negative electrode current collector, for example, copper, stainless steel, nickel, or titanium, or an alloy thereof can be used.

Negative Electrode Active Material Layer

In the negative electrode (iii), for example, a negative electrode active material layer is formed on at least one surface of the negative electrode current collector. The negative electrode active material layer is composed of, for example, the above-mentioned negative electrode active material, a binder, and, as needed, a conductive agent.

Examples of the binder include polytetrafluoroethylene, polyvinylidene fluoride, a tetrafluoroethylene-perfluoroalkyl vinyl ether copolymer, styrene-butadiene rubber (SBR), carboxymethyl cellulose, methyl cellulose, acetate phthalate cellulose, hydroxypropyl methyl cellulose, and polyvinyl alcohol.

As the conductive agent, for example, carbon materials, such as acetylene black, Ketjen black, furnace black, carbon fiber, graphite (granular graphite and flaky graphite), and fluorinated graphite, can be used.

Method for Manufacturing Electrodes (Positive Electrode (ii) and Negative Electrode (iii))

An electrode can be obtained by, for example, dispersing and kneading an active material, a binder, and, as needed, a conductive agent at predetermined amounts in a solvent such as N-methyl-2-pyrrolidone (NMP) or water, applying the resultant paste to a current collector, and drying it to form an active material layer. The resultant electrode is preferably compressed by a method such as roll pressing to adjust the density of the electrode to an appropriate level.

Separator (iv)

The above non-aqueous-electrolyte solution battery can include a separator (iv). As a separator for preventing contact between the positive electrode (ii) and the negative electrode (iii), a polyolefin, such as polypropylene or polyethylene, cellulose, paper, a non-woven fabric made of, for example, glass fibers, or a porous sheet is used. These films are preferably microporous so that the electrolyte solution can permeate, and ions can easily pass therethrough.

An example of the polyolefin separator is a microporous polymer film, such as a porous polyolefin film, that electrically insulates the positive electrode and the negative electrode from each other and allows lithium ions to pass therethrough. Specifically, as the porous polyolefin film, for example, a porous polyethylene film may be used alone, or a multilayer film in which a porous polyethylene film and a porous polypropylene film are stacked may be used. In addition, a composite film of porous polyethylene film and polypropylene film is another example.

Outer Case

In constructing a non-aqueous electrolyte solution battery, as the outer case of the non-aqueous electrolyte solution battery, for example, a metal can in, for example, a coin, cylinder, or square shape or a laminated outer case can be used. Examples of the material of the metal can include nickel-plated steel, stainless steel, nickel-plated stainless steel, aluminum or an alloy thereof, nickel, and titanium.

As the laminated outer case, for example, an aluminum laminate film, an SUS laminate film, or a laminate film of a silica-coated, for example, polypropylene or polyethylene can be used.

The structure of the non-aqueous electrolyte solution battery according to the present embodiment is not particularly limited. For example, the structure can be such that an electrode element in which a positive electrode and a negative electrode are disposed opposite each other and a non-aqueous electrolyte solution are contained in an outer case. The shape of the non-aqueous electrolyte solution battery is not particularly limited. An electrochemical device having a shape such as a coin, cylinder, or square shape, or an aluminum laminate sheet type is assembled from the above-mentioned elements.

EXAMPLES

The present invention will now be specifically described by way of examples, but the scope of the present invention is not limited by the examples.

Lithium Ion Battery

Example 1-1

Preparation of Electrolyte Solution

Non-aqueous electrolyte solution No. Li(1)-1 was prepared by using a mixed solvent of ethylene carbonate, dimethyl carbonate, and ethyl methyl carbonate at a volume ratio of 2.5:3:4.5 as a non-aqueous solvent and dissolving $LiPF_6$ as a solute and a Li salt of Anion (1) as the above ionic compound in the solvent such that the concentration of $LiPF_6$ was 1.0 mol/L and that the concentration of the Li salt (the content of Cl and the content of hydrofluoric acid in the ionic compound as a raw material before being dissolved in the electrolyte solution were 70 mass ppm and 120 mass ppm, respectively) was 1.0 mass % based on the total amount of the non-aqueous solvent, the solute, and the ionic compound. The above preparation was performed while maintaining the solution temperature within a range of 20° C. to 30° C. The conditions for preparing the non-aqueous electrolyte solution are shown in Table 1.

Production of Battery

A battery was produced by using the above electrolyte solution, $LiNi_{0.6}Co_{0.2}Mn_{0.2}O_2$ as the positive electrode material, and graphite as the negative electrode material, and the high-temperature cycle properties and the low-temperature output properties of the battery were actually evaluated. The battery for the test was produced as follows.

A $LiNi_{0.6}Co_{0.2}Mn_{0.2}O_2$ powder (90 mass %) was mixed with polyvinylidene fluoride (hereinafter referred to as "PVDF", 5 mass %) as a binder and acetylene black (5 mass %) as a conductive material, and N-methylpyrrolidone (hereinafter referred to as "NMP") was further added to the mixture to make a paste. This paste was applied onto aluminum foil and was dried to form a positive electrode body for a test.

On the other hand, a graphite powder (90 mass %) was mixed with PVDF (10 mass %) as a binder, and NMP was further added to the resultant mixture to form a slurry. The slurry was applied onto copper foil and was dried at 120° C. for 12 hours to form a negative electrode body for a test.

A polyethylene separator was impregnated with the electrolyte solution, so as to assemble a 50 mAh battery with an aluminum laminated outer case.

High-Temperature Cycle Property Test (High-Temperature Durability)

A charge and discharge test at an environmental temperature of 55° C. was performed, and the cycle properties were evaluated. The battery was charged to 4.3 V and discharged until 3.0 V, and a charge and discharge cycle was repeated at a current density of 5.7 $mA/cm^2$. The degree of degradation of the battery after 300 cycles was evaluated based on the discharge capacity retention rate. The discharge capacity retention rate was determined by the following expression.

Discharge Capacity Retention Rate after 300 Cycles:

Discharge capacity retention rate (%)=[(discharge capacity after 300 cycles)/(initial discharge capacity)]×100.

Low-Temperature Output Property Test (Low-Temperature Properties)

Charge and discharge were performed at a current density of 0.38 $mA/cm^2$ up to a charge voltage upper limit of 4.3 V in an environmental temperature of 25° C. by a constant current/constant voltage method. The discharge capacity at this time was defined as discharge capacity A. Subsequently, the battery was charged at a current density of 0.38 $mA/cm^2$ in an environmental temperature of −20° C. up to the charge voltage upper limit of 4.3 V by a constant current/constant voltage method and was then discharged at a constant current density of 9.5 $mA/cm^2$ until a discharge termination voltage of 3.0 V. The discharge capacity at this time was defined as discharge capacity B. The value determined from "[(discharge capacity B)/(discharge capacity A)]×100" was defined as high-output capacity retention rate (%), and the low-temperature output properties of the battery were evaluated.

The results of evaluation of batteries are shown in Table 2 and FIG. 1. Incidentally, the values of the discharge capacity retention rates after cycles and the high-output capacity retention rates of the batteries shown in Table 2 are relative values when the discharge capacity retention rate after cycles and the high-output capacity retention rate of a laminated battery produced using Electrolyte solution No. (0) described below were each defined as 100.

TABLE 1

| Electrolyte solution No. | Ionic compound Type of anion | Counter cation | Conc. [mass %] | Solute Type | Conc. [mol/L] | Other solute and additive Type | Conc. [mass %] |
|---|---|---|---|---|---|---|---|
| Li (1)-1 | (1) | Li+ | 1 | $LiPF_6$ | 1 | — | — |
| Li (2)-1 | (2) | Li+ | 1 | $LiPF_6$ | 1 | — | — |
| Li (3)-1 | (3) | Li+ | 1 | $LiPF_6$ | 1 | — | — |
| Li (4)-1 | (4) | Li+ | 1 | $LiPF_6$ | 1 | — | — |
| Li (5)-1 | (5) | Li+ | 1 | $LiPF_6$ | 1 | — | — |
| Li (6)-1 | (6) | Li+ | 1 | $LiPF_6$ | 1 | — | — |
| Li (7)-1 | (7) | Li+ | 1 | $LiPF_6$ | 1 | — | — |
| Li (8)-1 | (8) | Li+ | 1 | $LiPF_6$ | 1 | — | — |
| Li (9)-1 | (9) | Li+ | 1 | $LiPF_6$ | 1 | — | — |
| Li (10)-1 | (10) | Li+ | 1 | $LiPF_6$ | 1 | — | — |
| Li (11)-1 | (11) | Li+ | 1 | $LiPF_6$ | 1 | — | — |
| Li (12)-1 | (12) | Li+ | 1 | $LiPF_6$ | 1 | — | — |
| Li (13)-1 | (13) | Li+ | 1 | $LiPF_6$ | 1 | — | — |
| Li (14)-1 | (14) | Li+ | 1 | $LiPF_6$ | 1 | — | — |
| Li (15)-1 | (15) | Li+ | 1 | $LiPF_6$ | 1 | — | — |
| Li (16)-1 | (16) | Li+ | 1 | $LiPF_6$ | 1 | — | — |
| (0) | — | — | — | $LiPF_6$ | 1 | — | — |
| (0)-VC-1 | — | — | — | $LiPF_6$ | 1 | VC | 1 |
| Li (17)-1 | (17) | Li+ | 1 | $LiPF_6$ | 1 | — | — |
| Li (18)-1 | (18) | Li+ | 1 | $LiPF_6$ | 1 | — | — |

TABLE 2

| | Electrolyte solution No. | Positive electrode active material | Negative electrode active material | Discharge capacity retention rate after cycles* [%] | High-output capacity retention rate* [%] |
|---|---|---|---|---|---|
| Example 1-1 | Li (1)-1 | $LiNi_{0.6}Co_{0.2}Mn_{0.2}O_2$ | Graphite | 111 | 111 |
| Example 1-2 | Li (2)-1 | | | 115 | 110 |
| Example 1-3 | Li (3)-1 | | | 119 | 108 |
| Example 1-4 | Li (4)-1 | | | 119 | 125 |
| Example 1-5 | Li (5)-1 | | | 111 | 114 |
| Example 1-6 | Li (6)-1 | | | 118 | 110 |
| Example 1-7 | Li (7)-1 | | | 116 | 110 |
| Example 1-8 | Li (8)-1 | | | 113 | 113 |
| Example 1-9 | Li (9)-1 | | | 120 | 113 |
| Example 1-10 | Li (10)-1 | | | 119 | 114 |
| Example 1-11 | Li (11)-1 | | | 114 | 105 |
| Example 1-12 | Li (12)-1 | | | 114 | 106 |
| Example 1-13 | Li (13)-1 | | | 115 | 115 |
| Example 1-14 | Li (14)-1 | | | 116 | 112 |
| Example 1-15 | Li (15)-1 | | | 114 | 113 |
| Example 1-16 | Li (16)-1 | | | 114 | 112 |
| Comparative Example 0 | (0) | | | 100 | 100 |
| Comparative Example 1-1 | (0)-VC-1 | | | 107 | 93 |
| Comparative Example 1-2 | Li (17)-1 | | | 113 | 102 |
| Comparative Example 1-3 | Li (18)-1 | | | 102 | 100 |

*Relative value when the result of evaluation of Electrolyte solution No. (0) was defined as 100.

Examples 1-2 to 1-16 and Comparative Examples 0 and 1-1 to 1-3

Electrolyte solutions were each prepared by the same procedure as that in Electrolyte solution No. Li(1)-1 except that the type of the anion of the ionic compound was changed as shown in Table 1. Incidentally, for the ionic compounds used in the subsequent examples, the contents of Cl were all 200 mass ppm or less, and the contents of hydrofluoric acid were all 450 mass ppm or less.

Electrolyte solution No. (0) was prepared by the same procedure as that in electrolyte solution No. Li(1)-1 except that the ionic compound of the present invention was not added thereto.

Electrolyte solution No. (0)-VC-1 was prepared by the same procedure as that in Electrolyte solution No. Li(1)-1 except that the ionic compound of the present invention was not added thereto and vinylene carbonate (hereinafter, referred to as "VC") was added instead.

Electrolyte solution No. Li(17)-1 and Electrolyte solution No. Li(18)-1 were prepared by the same procedure as that in Electrolyte solution No. Li(1)-1 except that the ionic compound of the present invention was not added thereto and Li salts represented by the following formulae (17) and (18), which are ionic compounds having the structures that do not come under formula [1], were added instead.

The resultant electrolyte solutions were evaluated as in Example 1-1. The results of the evaluation are shown in Table 2 and FIG. 1.

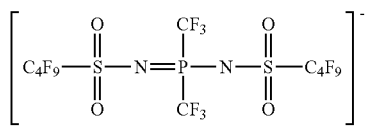

(17)

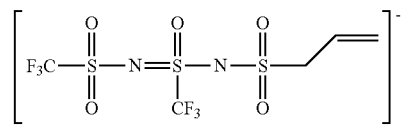

(18)

The comparison of the results above demonstrates:

for Examples 1-1 to 1-16 using electrolyte solutions containing the ionic compound of the present invention, the high-temperature cycle properties and the low-temperature output properties were both improved as compared with Comparative Example 1-1 using an electrolyte solution not containing the ionic compound but instead containing VC as disclosed in Patent Document 1;

for Examples 1-1 to 1-16, the high-temperature cycle properties were equal to or greater than those in Comparative Example 1-2 using an electrolyte solution not containing the ionic compound but instead containing the ionic compound (Li salt of formula (17)) as disclosed in Example 4 of Patent Document 2, and the low-temperature output properties were improved; and for Examples 1-1 to 1-16, the high-temperature cycle properties and the low-temperature output properties were both improved as compared with Comparative Example 1-3 using an electrolyte solution not containing the ionic compound but instead containing an ionic compound (Li salt of formula (18)) as disclosed in Example 15 of Patent Document 2.

Accordingly, it was confirmed that the high-temperature cycle properties and the low-temperature output properties can be exhibited in a well-balanced manner by using an electrolyte solution containing the ionic compound of the present invention.

Further, for Examples 1-1 to 1-16, it was confirmed that the low-temperature properties are improved with an increase in the total number of P—F bonds and S—F bonds of the ionic compound added to the electrolyte solution. That is, the effect of improving the low-temperature properties was the highest in Example 1-4 using electrolyte solution No. Li(4)-1 containing the ionic compound having a total of four bonds.

The effect was high in the following order: in Examples 1-5, 1-8 to 1-10, and 1-13 to 1-16 using Electrolyte solution Nos. Li(5)-1, Li(8)-1, Li(9)-1, Li(10)-1, Li(13)-1, Li(14)-1, Li(15)-1, and Li(16)-1, respectively, containing ionic compounds each having a total of three bonds; in Examples 1-1 to 1-3, 1-6, and 1-7 using Electrolyte solution Nos. Li(1)-1, Li(2)-1, Li(3)-1, Li(6)-1, and Li(7)-1, respectively, containing ionic compounds each having a total of two bonds; and in Examples 1-11 and 1-12 using Electrolyte solution Nos. Li(11)-1 and Li(12)-1, respectively, containing ionic compounds each having a total of one bond.

Examples and Comparative Examples Using Electrolyte Solutions Having Variously Modified Compositions (1)

Figure 2:
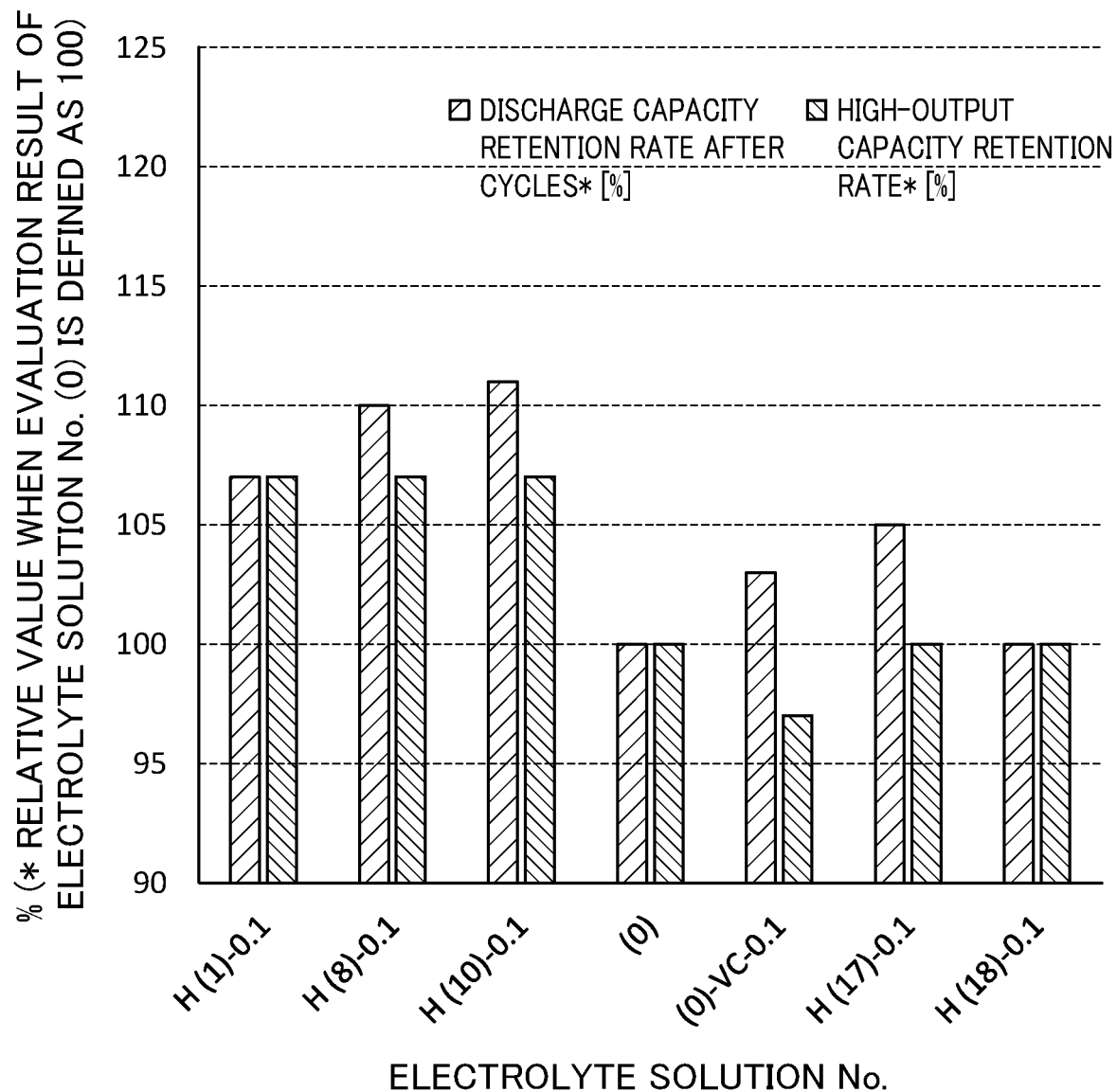
FIG. 2 shows the results of evaluation of Examples 2-1 to 2-3 and Comparative Examples 0 and 2-1 to 2-3.
Figure 3:
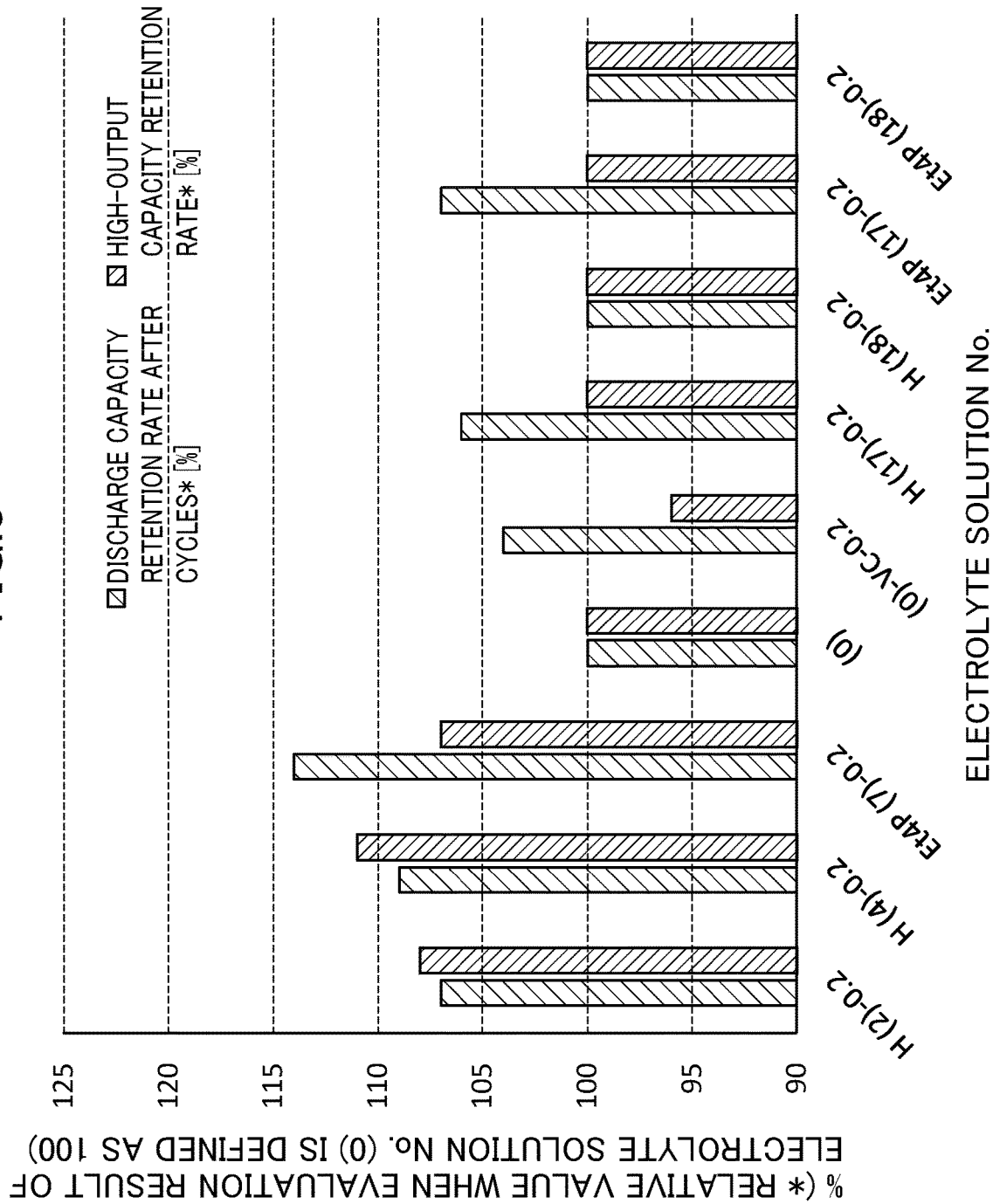
FIG. 3 shows the results of evaluation of Examples 3-1 to 3-3 and Comparative Examples 0 and 3-1 to 3-5.
Figure 4:
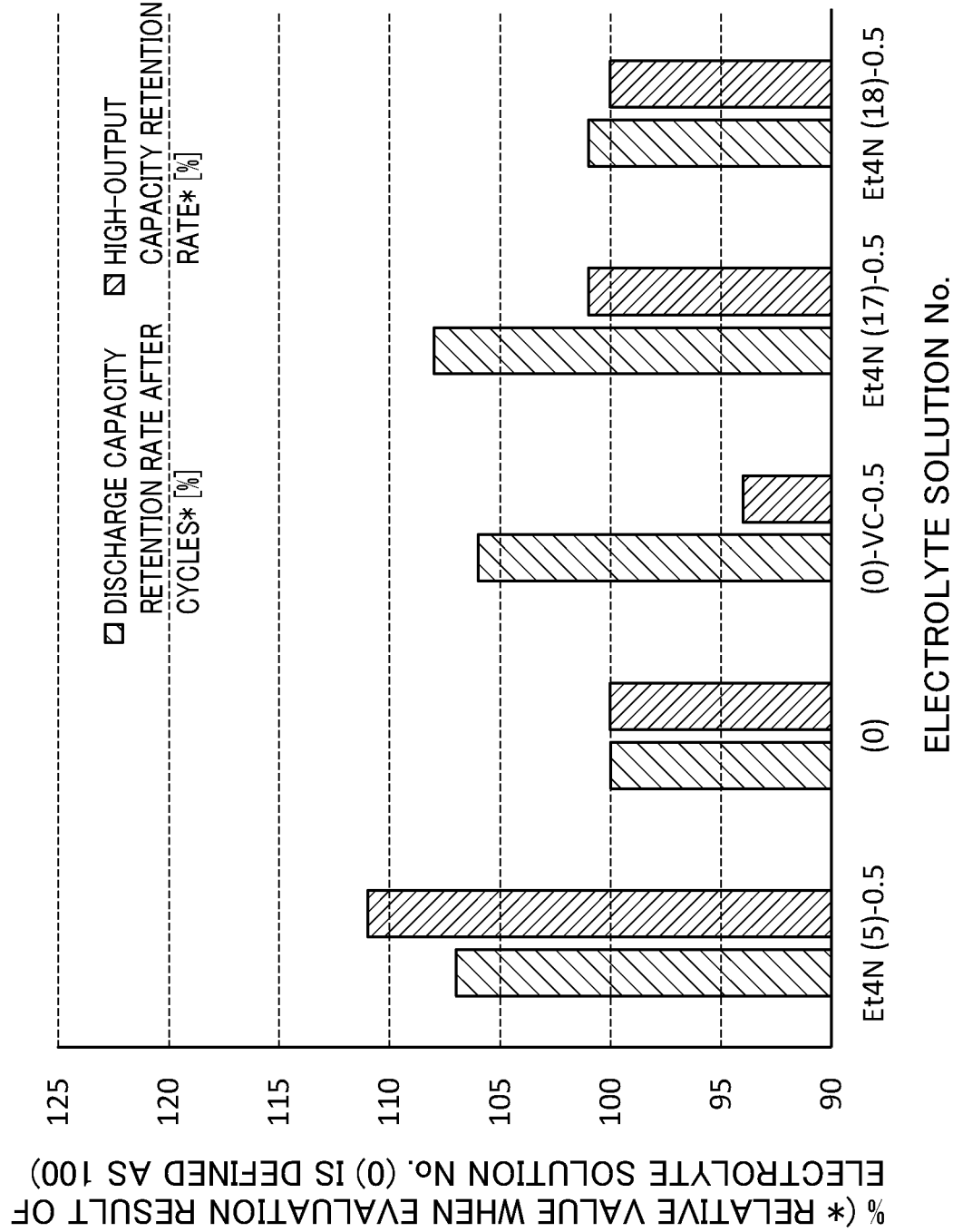
FIG. 4 shows the results of evaluation of Example 4-1 and Comparative Examples 0 and 4-1 to 4-3.

Electrolyte solutions were each prepared by the same procedure as that in Electrolyte solution No. Li(1)-1 except that the type and the concentration of the ionic compounds and the types and the concentrations of other solutes and additives were variously changed as shown in Tables 3 to 8 and FIGS. 2 to 4. The resultant electrolyte solutions were evaluated as in Example 1-1.

It was confirmed that also for the respective Examples, similarly, the high-temperature cycle properties and the low-temperature output properties can be exhibited in a well-balanced manner by using the electrolyte solution containing the ionic compounds of the present invention.

TABLE 3

| Electrolyte solution No. | Ionic compound | | | Solute | | Other solute and additive | |
|---|---|---|---|---|---|---|---|
| | Type of anion | Counter cation | Conc. [mass %] | Type | Conc. [mol/L] | Type | Conc. [mass %] |
| H (1)-0.1 | (1) | H+ | 0.1 | $LiPF_6$ | 1 | — | — |
| H (8)-0.1 | (8) | H+ | 0.1 | $LiPF_6$ | 1 | — | — |
| H (10)-0.1 | (10) | H+ | 0.1 | $LiPF_6$ | 1 | — | — |
| (0) | — | — | — | $LiPF_6$ | 1 | — | — |
| (0)-VC-0.1 | — | — | — | $LiPF_6$ | 1 | VC | 0.1 |
| H (17)-0.1 | (17) | H+ | 0.1 | $LiPF_6$ | 1 | — | — |
| H (18)-0.1 | (18) | H+ | 0.1 | $LiPF_6$ | 1 | — | — |

TABLE 4

| | Electrolyte solution No. | Positive electrode active material | Negative electrode active material | Discharge capacity retention rate after cycles* [%] | High-output capacity retention rate* [%] |
|---|---|---|---|---|---|
| Example 2-1 | H (1)-0.1 | $LiNi_{0.6}Co_{0.2}Mn_{0.2}O_2$ | Graphite | 107 | 107 |
| Example 2-2 | H (8)-0.1 | | | 110 | 107 |
| Example 2-3 | H (10)-0.1 | | | 111 | 107 |
| Comparative Example 0 | (0) | | | 100 | 100 |
| Comparative Example 2-1 | (0)-VC-0.1 | | | 103 | 97 |
| Comparative Example 2-2 | H (17)-0.1 | | | 105 | 100 |
| Comparative Example 2-3 | H (18)-0.1 | | | 100 | 100 |

*Relative value when the result of evaluation of Electrolyte solution No. (0) was defined as 100.

TABLE 5

| Electrolyte solution No. | Ionic compound | | | Solute | | Other solute and additive | |
|---|---|---|---|---|---|---|---|
| | Type of anion | Counter cation | Conc. [mass %] | Type | Conc. [mol/L] | Type | Conc. [mass %] |
| H (2)-0.2 | (2) | H+ | 0.2 | $LiPF_6$ | 1 | — | — |
| H (4)-0.2 | (4) | H+ | 0.2 | $LiPF_6$ | 1 | — | — |
| Et4P (7)-0.2 | (7) | $Et_4P+$ | 0.2 | $LiPF_6$ | 1 | — | — |
| (0) | — | — | — | $LiPF_6$ | 1 | — | — |
| (0)-VC-0.2 | — | — | — | $LiPF_6$ | 1 | VC | 0.2 |
| H (17)-0.2 | (17) | H+ | 0.2 | $LiPF_6$ | 1 | — | — |
| H (18)-0.2 | (18) | H+ | 0.2 | $LiPF_6$ | 1 | — | — |
| Et4P (17)-0.2 | (17) | $Et_4P+$ | 0.2 | $LiPF_6$ | 1 | — | — |
| Et4P (18)-0.2 | (18) | $Et_4P+$ | 0.2 | $LiPF_6$ | 1 | — | — |

TABLE 6

| | Electrolyte solution No. | Positive electrode active material | Negative electrode active material | Discharge capacity retention rate after cycles* [%] | High-output capacity retention rate* [%] |
|---|---|---|---|---|---|
| Example 3-1 | H (2)-0.2 | LiNi$_{0.6}$Co$_{0.2}$Mn$_{0.2}$O$_2$ | Graphite | 107 | 108 |
| Example 3-2 | H (4)-0.2 | | | 109 | 111 |
| Example 3-3 | Et4P (7)-0.2 | | | 114 | 107 |
| Comparative Example 0 | (0) | | | 100 | 100 |
| Comparative Example 3-1 | (0)-VC-0.2 | | | 104 | 96 |
| Comparative Example 3-2 | H (17)-0.2 | | | 106 | 100 |
| Comparative Example 3-3 | H (18)-0.2 | | | 100 | 100 |
| Comparative Example 3-4 | Et4P (17)-0.2 | | | 107 | 100 |
| Comparative Example 3-5 | Et4P (18)-0.2 | | | 100 | 100 |

*Relative value when the result of evaluation of Electrolyte solution No. (0) was defined as 100.

TABLE 7

| | Ionic compound | | | Solute | | Other solute and additive | |
|---|---|---|---|---|---|---|---|
| Electrolyte solution No. | Type of anion | Counter cation | Conc. [mass %] | Type | Conc. [mol/L] | Type | Conc. [mass %] |
| Et4N (5)-0.5 | (5) | Et$_4$N+ | 0.5 | LiPF$_6$ | 1 | — | — |
| (0) | — | — | — | LiPF$_6$ | 1 | — | — |
| (0)-VC-0.5 | — | — | — | LiPF$_6$ | 1 | VC | 0.5 |
| Et4N (17)-0.5 | (17) | Et$_4$N+ | 0.5 | LiPF$_6$ | 1 | — | — |
| Et4N (18)-0.5 | (18) | Et$_4$N+ | 0.5 | LiPF$_6$ | 1 | — | — |

TABLE 8

| | Electrolyte solution No. | Positive electrode active material | Negative electrode active material | Discharge capacity retention rate after cycles* [%] | High-output capacity retention rate* [%] |
|---|---|---|---|---|---|
| Example 4-1 | Et4N (5)-0.5 | LiNi$_{0.6}$Co$_{0.2}$Mn$_{0.2}$O$_2$ | Graphite | 107 | 111 |
| Comparative Example 0 | (0) | | | 100 | 100 |
| Comparative Example 4-1 | (0)-VC-0.5 | | | 106 | 94 |
| Comparative Example 4-2 | Et4N (17)-0.5 | | | 108 | 101 |
| Comparative Example 4-3 | Et4N (18)-0.5 | | | 101 | 100 |

*Relative value when the result of evaluation of Electrolyte solution No. (0) was defined as 100.

Examples and Comparative Examples Using Electrolyte Solutions Having Variously Modified Compositions (2)

Electrolyte solutions were each prepared by the same procedure as that in Electrolyte solution No. Li(1)-1 except that the types and the concentrations of the ionic compounds, the types and the concentrations of other solutes and additives, and the concentration of LiPF$_6$ were variously changed as shown in Tables 9 to 22. The resultant electrolyte solutions were evaluated as in Example 1-1.

It was confirmed that also for each of Examples, similarly, the high-temperature cycle properties and the low-temperature output properties can be exhibited in a well-balanced manner by using the electrolyte solution containing the ionic compound of the present invention.

TABLE 9

| Electrolyte solution No. | Ionic compound | | | Solute | | Other solute and additive | |
|---|---|---|---|---|---|---|---|
| | Type of anion | Counter cation | Conc. [mass %] | Type | Conc. [mol/L] | Type | Conc. [mass %] |
| Li (2)-0.05-LiPF2(Ox)2-1 | (2) | Li+ | 0.05 | LiPF$_6$ | 1 | LiPF$_2$(C$_2$O$_4$)$_2$ | 1 |
| Li (4)-0.05-LiPF2(Ox)2-1 | (4) | Li+ | 0.05 | LiPF$_6$ | 1 | LiPF$_2$(C$_2$O$_4$)$_2$ | 1 |
| Li (6)-0.05-LiPF2(Ox)2-1 | (6) | Li+ | 0.05 | LiPF$_6$ | 1 | LiPF$_2$(C$_2$O$_4$)$_2$ | 1 |
| Li (9)-0.05-LiPF2(Ox)2-1 | (9) | Li+ | 0.05 | LiPF$_6$ | 1 | LiPF$_2$(C$_2$O$_4$)$_2$ | 1 |
| Li (15)-0.05-LiPF2(Ox)2-1 | (15) | Li+ | 0.05 | LiPF$_6$ | 1 | LiPF$_2$(C$_2$O$_4$)$_2$ | 1 |
| (0)-LiPF2(Ox)2-1 | — | — | — | LiPF$_6$ | 1 | LiPF$_2$(C$_2$O$_4$)$_2$ | 1 |
| (0)-LiPF2(Ox)2-1-VC-0.05 | — | — | — | LiPF$_6$ | 1 | LiPF$_2$(C$_2$O$_4$)$_2$, VC | 1, 0.05 |
| Li (17)-0.05-LiPF2(Ox)2-1 | (17) | Li+ | 0.05 | LiPF$_6$ | 1 | LiPF$_2$(C$_2$O$_4$)$_2$ | 1 |
| Li (18)-0.05-LiPF2(Ox)2-1 | (18) | Li+ | 0.05 | LiPF$_6$ | 1 | LiPF$_2$(C$_2$O$_4$)$_2$ | 1 |
| Li (2)-0.05-LiPF4(Ox)-1 | (2) | Li+ | 0.05 | LiPF$_6$ | 1 | LiPF$_4$(C$_2$O$_4$) | 1 |
| Li (2)-0.01-LiPF4(Ox)-1 | (2) | Li+ | 0.01 | LiPF$_6$ | 1 | LiPF$_4$(C$_2$O$_4$) | 1 |
| Li (2)-0.001-LiPF4(Ox)-1 | (2) | Li+ | 0.001 | LiPF$_6$ | 1 | LiPF$_4$(C$_2$O$_4$) | 1 |
| (0)-LiPF4(Ox)-1 | — | — | — | LiPF$_6$ | 1 | LiPF$_4$(C$_2$O$_4$) | 1 |
| (0)-LiPF4(Ox)-1-VC-0.05 | — | — | — | LiPF$_6$ | 1 | LiPF$_4$(C$_2$O$_4$), VC | 1, 0.05 |
| Li (17)-0.05-LiPF4(Ox)-1 | (17) | Li+ | 0.05 | LiPF$_6$ | 1 | LiPF$_4$(C$_2$O$_4$) | 1 |
| Li (18)-0.05-LiPF4(Ox)-1 | (18) | Li+ | 0.05 | LiPF$_6$ | 1 | LiPF$_4$(C$_2$O$_4$) | 1 |
| (0)-LiPF4(Ox)-1-VC-0.01 | — | — | — | LiPF$_6$ | 1 | LiPF$_4$(C$_2$O$_4$), VC | 1, 0.01 |
| Li (17)-0.01-LiPF4(Ox)-1 | (17) | Li+ | 0.01 | LiPF$_6$ | 1 | LiPF$_4$(C$_2$O$_4$) | 1 |
| Li (18)-0.01-LiPF4(Ox)-1 | (18) | Li+ | 0.01 | LiPF$_6$ | 1 | LiPF$_4$(C$_2$O$_4$) | 1 |
| (0)-LiPF4(Ox)-1-VC-0.001 | — | — | — | LiPF$_6$ | 1 | LiPF$_4$(C$_2$O$_4$), VC | 1, 0.001 |
| Li (17)-0.001-LiPF4(Ox)-1 | (17) | Li+ | 0.001 | LiPF$_6$ | 1 | LiPF$_4$(C$_2$O$_4$) | 1 |
| Li (18)-0.001-LiPF4(Ox)-1 | (18) | Li+ | 0.001 | LiPF$_6$ | 1 | LiPF$_4$(C$_2$O$_4$) | 1 |
| Li (4)-0.05-LiBF2(Ox)-1 | (4) | Li+ | 0.05 | LiPF$_6$ | 1 | LiBF$_2$(C$_2$O$_4$) | 1 |
| Li (4)-0.01-LiBF2(Ox)-1 | (4) | Li+ | 0.01 | LiPF$_6$ | 1 | LiBF$_2$(C$_2$O$_4$) | 1 |
| Li (4)-0.001-LiBF2(Ox)-1 | (4) | Li+ | 0.001 | LiPF$_6$ | 1 | LiBF$_2$(C$_2$O$_4$) | 1 |
| (0)-LiBF2(Ox)-1 | — | — | — | LiPF$_6$ | 1 | LiBF$_2$(C$_2$O$_4$) | 1 |
| (0)-LiBF2(Ox)-1-VC-0.05 | — | — | — | LiPF$_6$ | 1 | LiBF$_2$(C$_2$O$_4$), VC | 1, 0.05 |
| Li (17)-0.05-LiBF2(Ox)-1 | (17) | Li+ | 0.05 | LiPF$_6$ | 1 | LiBF$_2$(C$_2$O$_4$) | 1 |
| Li (18)-0.05-LiBF2(Ox)-1 | (18) | Li+ | 0.05 | LiPF$_6$ | 1 | LiBF$_2$(C$_2$O$_4$) | 1 |
| (0)-LiBF2(Ox)-1-VC-0.01 | — | — | — | LiPF$_6$ | 1 | LiBF$_2$(C$_2$O$_4$), VC | 1, 0.01 |
| Li (17)-0.01-LiBF2(Ox)-1 | (17) | Li+ | 0.01 | LiPF$_6$ | 1 | LiBF$_2$(C$_2$O$_4$) | 1 |
| Li (18)-0.01-LiBF2(Ox)-1 | (18) | Li+ | 0.01 | LiPF$_6$ | 1 | LiBF$_2$(C$_2$O$_4$) | 1 |
| (0)-LiBF2(Ox)-1-VC-0.001 | — | — | — | LiPF$_6$ | 1 | LiBF$_2$(C$_2$O$_4$), VC | 1, 0.001 |
| Li (17)-0.001-LiBF2(Ox)-1 | (17) | Li+ | 0.001 | LiPF$_6$ | 1 | LiBF$_2$(C$_2$O$_4$) | 1 |
| Li (18)-0.001-LiBF2(Ox)-1 | (18) | Li+ | 0.001 | LiPF$_6$ | 1 | LiBF$_2$(C$_2$O$_4$) | 1 |

TABLE 10

| Electrolyte solution No. | Ionic compound | | | Solute | | Other solute and additive | |
|---|---|---|---|---|---|---|---|
| | Type of anion | Counter cation | Conc. [mass %] | Type | Conc. [mol/L] | Type | Conc. [mass %] |
| Li (2)-0.5-LiPO2F2-1-[1.1] | (2) | Li+ | 0.5 | LiPF$_6$ | 1.1 | LiPO$_2$F$_2$ | 1 |
| Li (4)-0.5-LiPO2F2-1-[1.1] | (4) | Li+ | 0.5 | LiPF$_6$ | 1.1 | LiPO$_2$F$_2$ | 1 |
| Li (6)-0.5-LiPO2F2-1-[1.1] | (6) | Li+ | 0.5 | LiPF$_6$ | 1.1 | LiPO$_2$F$_2$ | 1 |
| Li (9)-0.5-LiPO2F2-1-[1.1] | (9) | Li+ | 0.5 | LiPF$_6$ | 1.1 | LiPO$_2$F$_2$ | 1 |
| Li (15)-0.5-LiPO2F2-1-[1.1] | (15) | Li+ | 0.5 | LiPF$_6$ | 1.1 | LiPO$_2$F$_2$ | 1 |
| (0)-LiPO2F2-1-[1.1] | — | — | — | LiPF$_6$ | 1.1 | LiPO$_2$F$_2$ | 1 |
| (0)-LiPO2F2-1-VC-0.5-[1.1] | — | — | — | LiPF$_6$ | 1.1 | LiPO$_2$F$_2$, VC | 1, 0.5 |
| Li (17)-0.5-LiPO2F2-1-[1.1] | (17) | Li+ | 0.5 | LiPF$_6$ | 1.1 | LiPO$_2$F$_2$ | 1 |
| Li (18)-0.5-LiPO2F2-1-[1.1] | (18) | Li+ | 0.5 | LiPF$_6$ | 1.1 | LiPO$_2$F$_2$ | 1 |
| Li (2)-0.2-LiSO3F-1 | (2) | Li+ | 0.2 | LiPF$_6$ | 1 | LiSO$_3$F | 1 |
| Li (4)-0.2-LiSO3F-1 | (4) | Li+ | 0.2 | LiPF$_6$ | 1 | LiSO$_3$F | 1 |
| Li (9)-0.2-LiSO3F-1 | (9) | Li+ | 0.2 | LiPF$_6$ | 1 | LiSO$_3$F | 1 |
| (0)-LiSO3F-1 | — | — | — | LiPF$_6$ | 1 | LiSO$_3$F | 1 |
| (0)-LiSO3F-1-VC-0.2 | — | — | — | LiPF$_6$ | 1 | LiSO$_3$F, VC | 1, 0.2 |
| Li (17)-0.2-LiSO3F-1 | (17) | Li+ | 0.2 | LiPF$_6$ | 1 | LiSO$_3$F | 1 |
| Li (18)-0.2-LiSO3F-1 | (18) | Li+ | 0.2 | LiPF$_6$ | 1 | LiSO$_3$F | 1 |
| Li (4)-0.02-LiN(SO2F)2-3-[0.8] | (4) | Li+ | 0.02 | LiPF$_6$ | 0.8 | LiN(SO$_2$F)$_2$ | 3 |
| Li (6)-0.02-LiN(SO2F)2-3-[0.8] | (6) | Li+ | 0.02 | LiPF$_6$ | 0.8 | LiN(SO$_2$F)$_2$ | 3 |

TABLE 10-continued

| Electrolyte solution No. | Ionic compound Type of anion | Counter cation | Conc. [mass %] | Solute Type | Conc. [mol/L] | Other solute and additive Type | Conc. [mass %] |
|---|---|---|---|---|---|---|---|
| (0)-LiN(SO2F)2-3-[0.8] | — | — | — | LiPF$_6$ | 0.8 | LiN(SO$_2$F)$_2$ | 3 |
| (0)-LiN(SO2F)2-3-VC-0.02-[0.8] | — | — | — | LiPF$_6$ | 0.8 | LiN(SO$_2$F)$_2$, VC | 3, 0.02 |
| Li (17)-0.02-LiN(SO2F)2-3-[0.8] | (17) | Li+ | 0.02 | LiPF$_6$ | 0.8 | LiN(SO$_2$F)$_2$ | 3 |
| Li (18)-0.02-LiN(SO2F)2-3-[0.8] | (18) | Li+ | 0.02 | LiPF$_6$ | 0.8 | LiN(SO$_2$F)$_2$ | 3 |
| Li (2)-0.02-LiN(SO2F)(POF2)-1 | (2) | Li+ | 0.02 | LiPF$_6$ | 1 | LiN(SO$_2$F)(POF$_2$) | 1 |
| Li (4)-0.02-LiN(SO2F)(POF2)-1 | (4) | Li+ | 0.02 | LiPF$_6$ | 1 | LiN(SO$_2$F)(POF$_2$) | 1 |
| Li (6)-0.02-LiN(SO2F)(POF2)-1 | (6) | Li+ | 0.02 | LiPF$_6$ | 1 | LiN(SO$_2$F)(POF$_2$) | 1 |
| Li (9)-0.02-LiN(SO2F)(POF2)-1 | (9) | Li+ | 0.02 | LiPF$_6$ | 1 | LiN(SO$_2$F)(POF$_2$) | 1 |
| Li (15)-0.02-LiN(SO2F)(POF2)-1 | (15) | Li+ | 0.02 | LiPF$_6$ | 1 | LiN(SO$_2$F)(POF$_2$) | 1 |
| (0)-LiN(SO2F)(POF2)-1 | — | — | — | LiPF$_6$ | 1 | LiN(SO$_2$F)(POF$_2$) | 1 |
| (0)-LiN(SO2F)(POF2)-1-VC-0.02 | — | — | — | LiPF$_6$ | 1 | LiN(SO$_2$F)(POF$_2$), VC | 1, 0.02 |
| Li (17)-0.02-LiN(SO2F)(POF2)-1 | (17) | Li+ | 0.02 | LiPF$_6$ | 1 | LiN(SO$_2$F)(POF$_2$) | 1 |
| Li (18)-0.02-LiN(SO2F)(POF2)-1 | (18) | Li+ | 0.02 | LiPF$_6$ | 1 | LiN(SO$_2$F)(POF$_2$) | 1 |
| Li (2)-0.01-LiN(FSO2)(POFpropynyloxy)-1 | (2) | Li+ | 0.01 | LiPF$_6$ | 1 | LiN(FSO$_2$)(POF(OCH$_2$CCH)) | 1 |
| Li (4)-0.01-LiN(FSO2)(POFpropynyloxy)-1 | (4) | Li+ | 0.01 | LiPF$_6$ | 1 | LiN(FSO$_2$)(POF(OCH$_2$CCH)) | 1 |
| Li (15)-0.01-LiN(FSO2)(POFpropynyloxy)-1 | (15) | Li+ | 0.01 | LiPF$_6$ | 1 | LiN(FSO$_2$)(POF(OCH$_2$CCH)) | 1 |
| (0)-LiN(FSO2)(POFpropynyloxy)-1 | — | — | — | LiPF$_6$ | 1 | LiN(FSO$_2$)(POF(OCH$_2$CCH)) | 1 |
| (0)-LiN(FSO2)(POFpropynyloxy)-1-VC-0.01 | — | — | — | LiPF$_6$ | 1 | LiN(FSO$_2$)(POF(OCH$_2$CCH)), VC | 1, 0.01 |
| Li (17)-0.01-LiN(FSO2)(POFpropynyloxy)-1 | (17) | Li+ | 0.01 | LiPF$_6$ | 1 | LiN(FSO$_2$)(POF(OCH$_2$CCH)) | 1 |
| Li (18)-0.01-LiN(FSO2)(POFpropynyloxy)-1 | (18) | Li+ | 0.01 | LiPF$_6$ | 1 | LiN(FSO$_2$)(POF(OCH$_2$CCH)) | 1 |

TABLE 11

| Electrolyte solution No. | Ionic compound Type of anion | Counter cation | Conc. [mass %] | Solute Type | Conc. [mol/L] | Other solute and additive Type | Conc. [mass %] |
|---|---|---|---|---|---|---|---|
| Li (2)-0.5-VC-1 | (2) | Li+ | 0.5 | LiPF$_6$ | 1 | VC | 1 |
| Li (4)-0.5-VC-1 | (4) | Li+ | 0.5 | LiPF$_6$ | 1 | VC | 1 |
| Li (6)-0.5-VC-1 | (6) | Li+ | 0.5 | LiPF$_6$ | 1 | VC | 1 |
| Li (9)-0.5-VC-1 | (9) | Li+ | 0.5 | LiPF$_6$ | 1 | VC | 1 |
| Li (15)-0.5-VC-1 | (15) | Li+ | 0.5 | LiPF$_6$ | 1 | VC | 1 |
| (0)-VC-1 | — | — | — | LiPF$_6$ | 1 | VC | 1 |
| (0)-VC-1.5 | — | — | — | LiPF$_6$ | 1 | VC | 1.5 |
| Li (17)-0.5-VC-1 | (17) | Li+ | 0.5 | LiPF$_6$ | 1 | VC | 1 |
| Li (18)-0.5-VC-1 | (18) | Li+ | 0.5 | LiPF$_6$ | 1 | VC | 1 |
| Li (2)-0.5-PS-0.5 | (2) | Li+ | 0.5 | LiPF$_6$ | 1 | PS | 0.5 |
| Li (4)-0.5-PS-0.5 | (4) | Li+ | 0.5 | LiPF$_6$ | 1 | PS | 0.5 |
| Li (6)-0.5-PS-0.5 | (6) | Li+ | 0.5 | LiPF$_6$ | 1 | PS | 0.5 |
| Li (9)-0.5-PS-0.5 | (9) | Li+ | 0.5 | LiPF$_6$ | 1 | PS | 0.5 |
| Li (15)-0.5-PS-0.5 | (15) | Li+ | 0.5 | LiPF$_6$ | 1 | PS | 0.5 |
| (0)-PS-0.5 | — | — | — | LiPF$_6$ | 1 | PS | 0.5 |
| (0)-PS-0.5-VC-0.5 | — | — | — | LiPF$_6$ | 1 | PS, VC | 0.5, 0.5 |
| Li (17)-0.5-PS-0.5 | (17) | Li+ | 0.5 | LiPF$_6$ | 1 | PS | 0.5 |
| Li (18)-0.5-PS-0.5 | (18) | Li+ | 0.5 | LiPF$_6$ | 1 | PS | 0.5 |
| Li (2)-0.5-DTDO-1 | (2) | Li+ | 0.5 | LiPF$_6$ | 1 | DTDO | 1 |
| Li (4)-0.5-DTDO-1 | (4) | Li+ | 0.5 | LiPF$_6$ | 1 | DTDO | 1 |
| Li (6)-0.5-DTDO-1 | (6) | Li+ | 0.5 | LiPF$_6$ | 1 | DTDO | 1 |
| Li (9)-0.5-DTDO-1 | (9) | Li+ | 0.5 | LiPF$_6$ | 1 | DTDO | 1 |
| Li (15)-0.5-DTDO-1 | (15) | Li+ | 0.5 | LiPF$_6$ | 1 | DTDO | 1 |

TABLE 11-continued

| Electrolyte solution No. | Ionic compound Type of anion | Ionic compound Counter cation | Ionic compound Conc. [mass %] | Solute Type | Solute Conc. [mol/L] | Other solute and additive Type | Other solute and additive Conc. [mass %] |
|---|---|---|---|---|---|---|---|
| (0)-DTDO-1 | — | — | — | LiPF$_6$ | 1 | DTDO | 1 |
| (0)-DTDO-1-VC-0.5 | — | — | — | LiPF$_6$ | 1 | DTDO, VC | 1, 0.5 |
| Li (17)-0.5-DTDO-1 | (17) | Li+ | 0.5 | LiPF$_6$ | 1 | DTDO | 1 |
| Li (18)-0.5-DTDO-1 | (18) | Li+ | 0.5 | LiPF$_6$ | 1 | DTDO | 1 |
| Li (2)-0.5-V4Si-0.2 | (2) | Li+ | 0.5 | LiPF$_6$ | 1 | V4Si | 0.2 |
| Li (4)-0.5-V4Si-0.2 | (4) | Li+ | 0.5 | LiPF$_6$ | 1 | V4Si | 0.2 |
| Li (6)-0.5-V4Si-0.2 | (6) | Li+ | 0.5 | LiPF$_6$ | 1 | V4Si | 0.2 |
| Li (9)-0.5-V4Si-0.2 | (9) | Li+ | 0.5 | LiPF$_6$ | 1 | V4Si | 0.2 |
| Li (15)-0.5-V4Si-0.2 | (15) | Li+ | 0.5 | LiPF$_6$ | 1 | V4Si | 0.2 |
| (0)-V4Si-0.2 | — | — | — | LiPF$_6$ | 1 | V4Si | 0.2 |
| (0)-V4Si-0.2-VC-0.5 | — | — | — | LiPF$_6$ | 1 | V4Si, VC | 0.2, 0.5 |
| Li (17)-0.5-V4Si-0.2 | (17) | Li+ | 0.5 | LiPF$_6$ | 1 | V4Si | 0.2 |
| Li (18)-0.5-V4Si-0.2 | (18) | Li+ | 0.5 | LiPF$_6$ | 1 | V4Si | 0.2 |
| Li (2)-0.5-FEC-1 | (2) | Li+ | 0.5 | LiPF$_6$ | 1 | FEC | 1 |
| Li (4)-0.5-FEC-1 | (4) | Li+ | 0.5 | LiPF$_6$ | 1 | FEC | 1 |
| Li (6)-0.5-FEC-1 | (6) | Li+ | 0.5 | LiPF$_6$ | 1 | FEC | 1 |
| Li (9)-0.5-FEC-1 | (9) | Li+ | 0.5 | LiPF$_6$ | 1 | FEC | 1 |
| Li (15)-0.5-FEC-1 | (15) | Li+ | 0.5 | LiPF$_6$ | 1 | FEC | 1 |
| (0)-FEC-1 | — | — | — | LiPF$_6$ | 1 | FEC | 1 |
| (0)-FEC-1-VC-0.5 | — | — | — | LiPF$_6$ | 1 | FEC, VC | 1, 0.5 |
| Li (17)-0.5-FEC-1 | (17) | Li+ | 0.5 | LiPF$_6$ | 1 | FEC | 1 |
| Li (18)-0.5-FEC-1 | (18) | Li+ | 0.5 | LiPF$_6$ | 1 | FEC | 1 |

TABLE 12

| Electrolyte solution No. | Ionic compound Type of anion | Ionic compound Counter cation | Ionic compound Conc. [mass %] | Solute Type | Solute Conc. [mol/L] | Other solute and additive Type | Other solute and additive Conc. [mass %] |
|---|---|---|---|---|---|---|---|
| Li (2)-0.02-LiPF2(Ox)2-0.2-LiPF4(Ox)-1 | (2) | Li+ | 0.02 | LiPF$_6$ | 1 | LiPF$_2$(C$_2$O$_4$)$_2$, LiPF$_4$(C$_2$O$_4$) | 0.2, 1 |
| Li (4)-0.02-LiPF2(Ox)2-0.2-LiPF4(Ox)-1 | (4) | Li+ | 0.02 | LiPF$_6$ | 1 | LiPF$_2$(C$_2$O$_4$)$_2$, LiPF$_4$(C$_2$O$_4$) | 0.2, 1 |
| Li (6)-0.02-LiPF2(Ox)2-0.2-LiPF4(Ox)-1 | (6) | Li+ | 0.02 | LiPF$_6$ | 1 | LiPF$_2$(C$_2$O$_4$)$_2$, LiPF$_4$(C$_2$O$_4$) | 0.2, 1 |
| Li (9)-0.02-LiPF2(Ox)2-0.2-LiPF4(Ox)-1 | (9) | Li+ | 0.02 | LiPF$_6$ | 1 | LiPF$_2$(C$_2$O$_4$)$_2$, LiPF$_4$(C$_2$O$_4$) | 0.2, 1 |
| Li (15)-0.02-LiPF2(Ox)2-0.2-LiPF4(Ox)-1 | (15) | Li+ | 0.02 | LiPF$_6$ | 1 | LiPF$_2$(C$_2$O$_4$)$_2$, LiPF$_4$(C$_2$O$_4$) | 0.2, 1 |
| (0)-LiPF2(Ox)2-0.2-LiPF4(Ox)-1 | — | — | — | LiPF$_6$ | 1 | LiPF$_2$(C$_2$O$_4$)$_2$, LiPF$_4$(C$_2$O$_4$) | 0.2, 1 |
| (0)-LiPF2(Ox)2-0.2-LiPF4(Ox)-1-VC-0.02 | — | — | — | LiPF$_6$ | 1 | LiPF$_2$(C$_2$O$_4$)$_2$, LiPF$_4$(C$_2$O$_4$), VC | 0.2, 1, 0.02 |
| Li (17)-0.02-LiPF2(Ox)2-0.2-LiPF4(Ox)-1 | (17) | Li+ | 0.02 | LiPF$_6$ | 1 | LiPF$_2$(C$_2$O$_4$)$_2$, LiPF$_4$(C$_2$O$_4$) | 0.2, 1 |
| Li (18)-0.02-LiPF2(Ox)2-0.2-LiPF4(Ox)-1 | (18) | Li+ | 0.02 | LiPF$_6$ | 1 | LiPF$_2$(C$_2$O$_4$)$_2$, LiPF$_4$(C$_2$O$_4$) | 0.2, 1 |
| Li (2)-0.02-VC-0.5-LiPF2(Ox)2-1 | (2) | Li+ | 0.02 | LiPF$_6$ | 1 | VC, LiPF$_2$(C$_2$O$_4$)$_2$ | 0.5, 1 |
| Li (4)-0.02-VC-0.5-LiPF2(Ox)2-1 | (4) | Li+ | 0.02 | LiPF$_6$ | 1 | VC, LiPF$_2$(C$_2$O$_4$)$_2$ | 0.5, 1 |
| Li (6)-0.02-VC-0.5-LiPF2(Ox)2-1 | (6) | Li+ | 0.02 | LiPF$_6$ | 1 | VC, LiPF$_2$(C$_2$O$_4$)$_2$ | 0.5, 1 |
| Li (9)-0.02-VC-0.5-LiPF2(Ox)2-1 | (9) | Li+ | 0.02 | LiPF$_6$ | 1 | VC, LiPF$_2$(C$_2$O$_4$)$_2$ | 0.5, 1 |
| Li (15)-0.02-VC-0.5-LiPF2(Ox)2-1 | (15) | Li+ | 0.02 | LiPF$_6$ | 1 | VC, LiPF$_2$(C$_2$O$_4$)$_2$ | 0.5, 1 |
| (0)-VC-0.5-LiPF2(Ox)2-1 | — | — | — | LiPF$_6$ | 1 | VC, LiPF$_2$(C$_2$O$_4$)$_2$ | 0.5, 1 |
| (0)-VC-0.52-LiPF2(Ox)2-1 | — | — | — | LiPF$_6$ | 1 | VC, LiPF$_2$(C$_2$O$_4$)$_2$ | 0.52, 1 |
| Li (17)-0.02-VC-0.5-LiPF2(Ox)2-1 | (17) | Li+ | 0.02 | LiPF$_6$ | 1 | VC, LiPF$_2$(C$_2$O$_4$)$_2$ | 0.5, 1 |
| Li (18)-0.02-VC-0.5-LiPF2(Ox)2-1 | (18) | Li+ | 0.02 | LiPF$_6$ | 1 | VC, LiPF$_2$(C$_2$O$_4$)$_2$ | 0.5, 1 |
| Li (2)-0.02-VC-0.5-LiPF4(Ox)-1 | (2) | Li+ | 0.02 | LiPF$_6$ | 1 | VC, LiPF$_4$(C$_2$O$_4$) | 0.5, 1 |

TABLE 12-continued

| Electrolyte solution No. | Ionic compound | | | Solute | | Other solute and additive | |
|---|---|---|---|---|---|---|---|
| | Type of anion | Counter cation | Conc. [mass %] | Type | Conc. [mol/L] | Type | Conc. [mass %] |
| Li (4)-0.02-VC-0.5-LiPF4(Ox)-1 | (4) | Li+ | 0.02 | $LiPF_6$ | 1 | VC, $LiPF_4(C_2O_4)$ | 0.5, 1 |
| Li (6)-0.02-VC-0.5-LiPF4(Ox)-1 | (6) | Li+ | 0.02 | $LiPF_6$ | 1 | VC, $LiPF_4(C_2O_4)$ | 0.5, 1 |
| Li (9)-0.02-VC-0.5-LiPF4(Ox)-1 | (9) | Li+ | 0.02 | $LiPF_6$ | 1 | VC, $LiPF_4(C_2O_4)$ | 0.5, 1 |
| Li (15)-0.02-VC-0.5-LiPF4(Ox)-1 | (15) | Li+ | 0.02 | $LiPF_6$ | 1 | VC, $LiPF_4(C_2O_4)$ | 0.5, 1 |
| (0)-VC-0.5-LiPF4(Ox)-1 | — | — | — | $LiPF_6$ | 1 | VC, $LiPF_4(C_2O_4)$ | 0.5, 1 |
| (0)-VC-0.52-LiPF4(Ox)-1 | — | — | — | $LiPF_6$ | 1 | VC, $LiPF_4(C_2O_4)$ | 0.52, 1 |
| Li (17)-0.02-VC-0.5-LiPF4(Ox)-1 | (17) | Li+ | 0.02 | $LiPF_6$ | 1 | VC, $LiPF_4(C_2O_4)$ | 0.5, 1 |
| Li (18)-0.02-VC-0.5-LiPF4(Ox)-1 | (18) | Li+ | 0.02 | $LiPF_6$ | 1 | VC, $LiPF_4(C_2O_4)$ | 0.5, 1 |
| Li (2)-0.02-VC-0.5-LiBF2(Ox)-1 | (2) | Li+ | 0.02 | $LiPF_6$ | 1 | VC, $LiBF_2(C_2O_4)$ | 0.5, 1 |
| Li (4)-0.02-VC-0.5-LiBF2(Ox)-1 | (4) | Li+ | 0.02 | $LiPF_6$ | 1 | VC, $LiBF_2(C_2O_4)$ | 0.5, 1 |
| Li (6)-0.02-VC-0.5-LiBF2(Ox)-1 | (6) | Li+ | 0.02 | $LiPF_6$ | 1 | VC, $LiBF_2(C_2O_4)$ | 0.5, 1 |
| Li (9)-0.02-VC-0.5-LiBF2(Ox)-1 | (9) | Li+ | 0.02 | $LiPF_6$ | 1 | VC, $LiBF_2(C_2O_4)$ | 0.5, 1 |
| Li (15)-0.02-VC-0.5-LiBF2(Ox)-1 | (15) | Li+ | 0.02 | $LiPF_6$ | 1 | VC, $LiBF_2(C_2O_4)$ | 0.5, 1 |
| (0)-VC-0.5-LiBF2(Ox)-1 | — | — | — | $LiPF_6$ | 1 | VC, $LiBF_2(C_2O_4)$ | 0.5, 1 |
| (0)-VC-0.52-LiBF2(Ox)-1 | — | — | — | $LiPF_6$ | 1 | VC, $LiBF_2(C_2O_4)$ | 0.52, 1 |
| Li (17)-0.02-VC-0.5-LiBF2(Ox)-1 | (17) | Li+ | 0.02 | $LiPF_6$ | 1 | VC, $LiBF_2(C_2O_4)$ | 0.5, 1 |
| Li (18)-0.02-VC-0.5-LiBF2(Ox)-1 | (18) | Li+ | 0.02 | $LiPF_6$ | 1 | VC, $LiBF_2(C_2O_4)$ | 0.5, 1 |
| Li (2)-0.05-VC-0.5-LiPO2F2-1 | (2) | Li+ | 0.05 | $LiPF_6$ | 1 | VC, $LiPO_2F_2$ | 0.5, 1 |
| Li (4)-0.05-VC-0.5-LiPO2F2-1 | (4) | Li+ | 0.05 | $LiPF_6$ | 1 | VC, $LiPO_2F_2$ | 0.5, 1 |
| Li (6)-0.05-VC-0.5-LiPO2F2-1 | (6) | Li+ | 0.05 | $LiPF_6$ | 1 | VC, $LiPO_2F_2$ | 0.5, 1 |
| Li (9)-0.05-VC-0.5-LiPO2F2-1 | (9) | Li+ | 0.05 | $LiPF_6$ | 1 | VC, $LiPO_2F_2$ | 0.5, 1 |
| Li (15)-0.05-VC-0.5-LiPO2F2-1 | (15) | Li+ | 0.05 | $LiPF_6$ | 1 | VC, $LiPO_2F_2$ | 0.5, 1 |
| (0)-VC-0.5-LiPO2F2-1 | — | — | — | $LiPF_6$ | 1 | VC, $LiPO_2F_2$ | 0.5, 1 |
| (0)-VC-0.55-LiPO2F2-1 | — | — | — | $LiPF_6$ | 1 | VC, $LiPO_2F_2$ | 0.55, 1 |
| Li (17)-0.05-VC-0.5-LiPO2F2-1 | (17) | Li+ | 0.05 | $LiPF_6$ | 1 | VC, $LiPO_2F_2$ | 0.5, 1 |
| Li (18)-0.05-VC-0.5-LiPO2F2-1 | (18) | Li+ | 0.05 | $LiPF_6$ | 1 | VC, $LiPO_2F_2$ | 0.5, 1 |

TABLE 13

| Electrolyte solution No. | Ionic compound | | | Solute | | Other solute and additive | |
|---|---|---|---|---|---|---|---|
| | Type of anion | Counter cation | Conc. [mass %] | Type | Conc. [mol/L] | Type | Conc. [mass %] |
| Li (2)-0.2-LiBOB-1-LiPO2F2-0.5 | (2) | Li+ | 0.2 | $LiPF_6$ | 1 | LiBOB, $LiPO_2F_2$ | 1, 0.5 |
| Li (4)-0.2-LiBOB-1-LiPO2F2-0.5 | (4) | Li+ | 0.2 | $LiPF_6$ | 1 | LiBOB, $LiPO_2F_2$ | 1, 0.5 |
| Li (6)-0.2-LiBOB-1-LiPO2F2-0.5 | (6) | Li+ | 0.2 | $LiPF_6$ | 1 | LiBOB, $LiPO_2F_2$ | 1, 0.5 |
| Li (9)-0.2-LiBOB-1-LiPO2F2-0.5 | (9) | Li+ | 0.2 | $LiPF_6$ | 1 | LiBOB, $LiPO_2F_2$ | 1, 0.5 |
| Li (15)-0.2-LiBOB-1-LiPO2F2-0.5 | (15) | Li+ | 0.2 | $LiPF_6$ | 1 | LiBOB, $LiPO_2F_2$ | 1, 0.5 |

TABLE 13-continued

| Electrolyte solution No. | Ionic compound | | | Solute | | Other solute and additive | |
|---|---|---|---|---|---|---|---|
| | Type of anion | Counter cation | Conc. [mass %] | Type | Conc. [mol/L] | Type | Conc. [mass %] |
| (0)-LiBOB-1-LiPO2F2-0.5 | — | — | — | LiPF$_6$ | 1 | LiBOB, LiPO$_2$F$_2$ | 1, 0.5 |
| (0)-LiBOB-1-LiPO2F2-0.5-VC-0.2 | — | — | — | LiPF$_6$ | 1 | LiBOB, LiPO$_2$F$_2$, VC | 1, 0.5, 0.2 |
| Li (17)-0.2-LiBOB-1-LiPO2F2-0.5 | (17) | Li+ | 0.2 | LiPF$_6$ | 1 | LiBOB, LiPO$_2$F$_2$ | 1, 0.5 |
| Li (18)-0.2-LiBOB-1-LiPO2F2-0.5 | (18) | Li+ | 0.2 | LiPF$_6$ | 1 | LiBOB, LiPO$_2$F$_2$ | 1, 0.5 |
| Li (2)-0.05-LiBF2(Ox)-1-LiPO2F2-0.2 | (2) | Li+ | 0.05 | LiPF$_6$ | 1 | LiBF$_2$(C$_2$O$_4$), LiPO$_2$F$_2$ | 1, 0.2 |
| Li (4)-0.05-LiBF2(Ox)-1-LiPO2F2-0.2 | (4) | Li+ | 0.05 | LiPF$_6$ | 1 | LiBF$_2$(C$_2$O$_4$), LiPO$_2$F$_2$ | 1, 0.2 |
| Li (6)-0.05-LiBF2(Ox)-1-LiPO2F2-0.2 | (6) | Li+ | 0.05 | LiPF$_6$ | 1 | LiBF$_2$(C$_2$O$_4$, LiPO$_2$F$_2$ | 1, 0.2 |
| Li (9)-0.05-LiBF2(Ox)-1-LiPO2F2-0.2 | (9) | Li+ | 0.05 | LiPF$_6$ | 1 | LiBF$_2$(C$_2$O$_4$), LiPO$_2$F$_2$ | 1, 0.2 |
| Li (15)-0.05-LiBF2(Ox)-1-LiPO2F2-0.2 | (15) | Li+ | 0.05 | LiPF$_6$ | 1 | LiBF$_2$(C$_2$O$_4$), LiPO$_2$F$_2$ | 1, 0.2 |
| (0)-LiBF2(Ox)-1-LiPO2F2-0.2 | — | — | — | LiPF$_6$ | 1 | LiBF$_2$(C$_2$O$_4$), LiPO$_2$F$_2$ | 1, 0.2 |
| (0)-LiBF2(Ox)-1-LiPO2F2-0.2-VC-0.05 | — | — | — | LiPF$_6$ | 1 | LiBF$_2$(C$_2$O$_4$), LiPO$_2$F$_2$, VC | 1, 0.2, 0.05 |
| Li (17)-0.05-LiBF2(Ox)-1-LiPO2F2-0.2 | (17) | Li+ | 0.05 | LiPF$_6$ | 1 | LiBF$_2$(C$_2$O$_4$), LiPO$_2$F$_2$ | 1, 0.2 |
| Li (18)-0.05-LiBF2(Ox)-1-LiPO2F2-0.2 | (18) | Li+ | 0.05 | LiPF$_6$ | 1 | LiBF$_2$(C$_2$O$_4$), LiPO$_2$F$_2$ | 1, 0.2 |
| Li (2)-0.5-LiN(SO2F)2-3-LiPO2F2-0.5 | (2) | Li+ | 0.5 | LiPF$_6$ | 1 | LiN(SO$_2$F)$_2$, LiPO$_2$F$_2$ | 3, 0.5 |
| Li (4)-0.5-LiN(SO2F)2-3-LiPO2F2-0.5 | (4) | Li+ | 0.5 | LiPF$_6$ | 1 | LiN(SO$_2$F)$_2$, LiPO$_2$F$_2$ | 3, 0.5 |
| Li (6)-0.5-LiN(SO2F)2-3-LiPO2F2-0.5 | (6) | Li+ | 0.5 | LiPF$_6$ | 1 | LiN(SO$_2$F)$_2$, LiPO$_2$F$_2$ | 3, 0.5 |
| Li (9)-0.5-LiN(SO2F)2-3-LiPO2F2-0.5 | (9) | Li+ | 0.5 | LiPF$_6$ | 1 | LiN(SO$_2$F)$_2$, LiPO$_2$F$_2$ | 3, 0.5 |
| Li (15)-0.5-LiN(SO2F)2-3-LiPO2F2-0.5 | (15) | Li+ | 0.5 | LiPF$_6$ | 1 | LiN(SO$_2$F)$_2$, LiPO$_2$F$_2$ | 3, 0.5 |
| (0)-LiN(SO2F)2-3-LiPO2F2-0.5 | — | — | — | LiPF$_6$ | 1 | LiN(SO$_2$F)$_2$, LiPO$_2$F$_2$ | 3, 0.5 |
| (0)-LiN(SO2F)2-3-LiPO2F2-0.5-VC-0.5 | — | — | — | LiPF$_6$ | 1 | LiN(SO$_2$F)$_2$, LiPO$_2$F$_2$, VC | 3, 0.5, 0.5 |
| Li (17)-0.5-LiN(SO2F)2-3-LiPO2F2-0.5 | (17) | Li+ | 0.5 | LiPF$_6$ | 1 | LiN(SO$_2$F)$_2$, LiPO$_2$F$_2$ | 3, 0.5 |
| Li (18)-0.5-LiN(SO2F)2-3-LiPO2F2-0.5 | (18) | Li+ | 0.5 | LiPF$_6$ | 1 | LiN(SO$_2$F)$_2$, LiPO$_2$F$_2$ | 3, 0.5 |
| Li (2)-0.02-LiN(SO2F)(POF2)-1-LiPO2F2-0.1 | (2) | Li+ | 0.02 | LiPF$_6$ | 1 | LiN(SO$_2$F)(POF$_2$), LiPO$_2$F$_2$ | 1, 0.1 |
| Li (4)-0.02-LiN(SO2F)(POF2)-1-LiPO2F2-0.1 | (4) | Li+ | 0.02 | LiPF$_6$ | 1 | LiN(SO$_2$F)(POF$_2$), LiPO$_2$F$_2$ | 1, 0.1 |
| Li (6)-0.02-LiN(SO2F)(POF2)-1-LiPO2F2-0.1 | (6) | Li+ | 0.02 | LiPF$_6$ | 1 | LiN(SO$_2$F)(POF$_2$), LiPO$_2$F$_2$ | 1, 0.1 |
| Li (9)-0.02-LiN(SO2F)(POF2)-1-LiPO2F2-0.1 | (9) | Li+ | 0.02 | LiPF$_6$ | 1 | LiN(SO$_2$F)(POF$_2$) LiPO$_2$F$_2$ | 1, 0.1 |
| Li (15)-0.02-LiN(SO2F)(POF2)-1-LiPO2F2-0.1 | (15) | Li+ | 0.02 | LiPF$_6$ | 1 | LiN(SO$_2$F)(POF$_2$), LiPO$_2$F$_2$ | 1, 0.1 |
| (0)-LiN(SO2F)(POF2)-1-LiPO2F2-0.1 | — | — | — | LiPF$_6$ | 1 | LiN(SO$_2$F)(POF$_2$), LiPO$_2$F$_2$ | 1, 0.1 |
| (0)-LiN(SO2F)(POF2)-1-LiPO2F2-0.1-VC-0.02 | — | — | — | LiPF$_6$ | 1 | LiN(SO$_2$F)(POF$_2$), LiPO$_2$F$_2$, VC | 1, 0.1, 0.02 |
| Li (17)-0.02-LiN(SO2F)(POF2)-1-LiPO2F2-0.1 | (17) | Li+ | 0.02 | LiPF$_6$ | 1 | LiN(SO$_2$F)(POF$_2$), LiPO$_2$F$_2$ | 1, 0.1 |
| Li (18)-0.02-LiN(SO2F)(POF2)-1-LiPO2F2-0.1 | (18) | Li+ | 0.02 | LiPF$_6$ | 1 | LiN(SO$_2$F)(POF$_2$), LiPO$_2$F$_2$ | 1, 0.1 |

TABLE 14

| Electrolyte solution No. | Ionic compound | | | Solute | | Other solute and additive | |
|---|---|---|---|---|---|---|---|
| | Type of anion | Counter cation | Conc. [mass %] | Type | Conc. [mol/L] | Type | Conc. [mass %] |
| Li (2)-0.5-LiPF2(Ox)2-1-LiPF4(Ox)-0.2-VC-0.5 | (2) | Li+ | 0.5 | LiPF$_6$ | 1 | LiPF$_2$(C$_2$O$_4$)$_2$, LiPF$_4$(C$_2$O$_4$), VC | 1, 0.2, 0.5 |
| Li (4)-0.5-LiPF2(Ox)2-1-LiPF4(Ox)-0.2-VC-0.5 | (4) | Li+ | 0.5 | LiPF$_6$ | 1 | LiPF$_2$(C$_2$O$_4$)$_2$, LiPF$_4$(C$_2$O$_4$), VC | 1, 0.2, 0.5 |
| Li (6)-0.5-LiPF2(Ox)2-1-LiPF4(Ox)-0.2-VC-0.5 | (6) | Li+ | 0.5 | LiPF$_6$ | 1 | LiPF$_2$(C$_2$O$_4$)$_2$, LiPF$_4$(C$_2$O$_4$), VC | 1, 0.2, 0.5 |
| Li (9)-0.5-LiPF2(Ox)2-1-LiPF4(Ox)-0.2-VC-0.5 | (9) | Li+ | 0.5 | LiPF$_6$ | 1 | LiPF$_2$(C$_2$O$_4$)$_2$, LiPF$_4$(C$_2$O$_4$), VC | 1, 0.2, 0.5 |
| Li (15)-0.5-LiPF2(Ox)2-1-LiPF4(Ox)-0.2-VC-0.5 | (15) | Li+ | 0.5 | LiPF$_6$ | 1 | LiPF$_2$(C$_2$O$_4$)$_2$, LiPF$_4$(C$_2$O$_4$), VC | 1, 0.2, 0.5 |
| (0)-LiPF2(Ox)2-1-LiPF4(Ox)-0.2-VC-0.5 | — | — | — | LiPF$_6$ | 1 | LiPF$_2$(C$_2$O$_4$)$_2$, LiPF$_4$(C$_2$O$_4$), VC | 1, 0.2, 0.5 |
| (0)-LiPF2(Ox)2-1-LiPF4(Ox)-0.2-VC-1 | — | — | — | LiPF$_6$ | 1 | LiPF$_2$(C$_2$O$_4$)$_2$, LiPF$_4$(C$_2$O$_4$), VC | 1, 0.2, 1 |
| Li (17)-0.5-LiPF2(Ox)2-1-LiPF4(Ox)-0.2-VC-0.5 | (17) | Li+ | 0.5 | LiPF$_6$ | 1 | LiPF$_2$(C$_2$O$_4$)$_2$, LiPF$_4$(C$_2$O$_4$), VC | 1, 0.2, 0.5 |
| Li (18)-0.5-LiPF2(Ox)2-1-LiPF4(Ox)-0.2-VC-0.5 | (18) | Li+ | 0.5 | LiPF$_6$ | 1 | LiPF$_2$(C$_2$O$_4$)$_2$, LiPF$_4$(C$_2$O$_4$), VC | 1, 0.2, 0.5 |
| Li (2)-0.05-LiBF4-0.2-LiBF2(Ox)-0.5-LiN(SO2F)2-2-V4Si-0.1 | (2) | Li+ | 0.05 | LiPF$_6$ | 1 | LiBF$_4$, LiBF$_2$(C$_2$O$_4$), LiN(SO$_2$F)$_2$, V4Si | 0.2, 0.5, 2, 0.1 |
| Li (4)-0.05-LiBF4-0.2-LiBF2(Ox)-0.5-LiN(SO2F)2-2-V4Si-0.1 | (4) | Li+ | 0.05 | LiPF$_6$ | 1 | LiBF$_4$, LiBF$_2$(C$_2$O$_4$), LiN(SO$_2$F)$_2$, V4Si | 0.2, 0.5, 2, 0.1 |
| Li (6)-0.05-LiBF4-0.2-LiBF2(Ox)-0.5-LiN(SO2F)2-2-V4Si-0.1 | (6) | Li+ | 0.05 | LiPF$_6$ | 1 | LiBF$_4$, LiBF$_2$(C$_2$O$_4$), LiN(SO$_2$F)$_2$, V4Si | 0.2, 0.5, 2, 0.1 |
| Li (9)-0.05-LiBF4-0.2-LiBF2(Ox)-0.5-LiN(SO2F)2-2-V4Si-0.1 | (9) | Li+ | 0.05 | LiPF$_6$ | 1 | LiBF$_4$, LiBF$_2$(C$_2$O$_4$), LiN(SO$_2$F)$_2$, V4Si | 0.2, 0.5, 2, 0.1 |
| Li (15)-0.05-LiBF4-0.2-LiBF2(Ox)-0.5-LiN(SO2F)2-2-V4Si-0.1 | (15) | Li+ | 0.05 | LiPF$_6$ | 1 | LiBF$_4$, LiBF$_2$(C$_2$O$_4$), LiN(SO$_2$F)$_2$, V4Si | 0.2, 0.5, 2, 0.1 |
| (0)-LiBF4-0.2-LiBF2(Ox)-0.5-LiN(SO2F)2-2-V4Si-0.1 | — | — | — | LiPF$_6$ | 1 | LiBF$_4$, LiBF$_2$(C$_2$O$_4$), LiN(SO$_2$F)$_2$, V4Si | 0.2, 0.5, 2, 0.1 |
| (0)-LiBF4-0.2-LiBF2(Ox)-0.5-LiN(SO2F)2-2-V4Si-0.1-VC-0.05 | — | — | — | LiPF$_6$ | 1 | LiBF$_4$, LiBF$_2$(C$_2$O$_4$), LiN(SO$_2$F)$_2$, V4Si, VC | 0.2, 0.5, 2, 0.1, 0.05 |
| Li (17)-0.05-LiBF4-0.2-LiBF2(Ox)-0.5-LiN(SO2F)2-2-V4Si-0.1 | (17) | Li+ | 0.05 | LiPF$_6$ | 1 | LiBF$_4$, LiBF$_2$(C$_2$O$_4$), LiN(SO$_2$F)$_2$, V4Si | 0.2, 0.5, 2, 0.1 |
| Li (18)-0.05-LiBF4-0.2-LiBF2(Ox)-0.5-LiN(SO2F)2-2-V4Si-0.1 | (18) | Li+ | 0.05 | LiPF$_6$ | 1 | LiBF$_4$, LiBF$_2$(C$_2$O$_4$), LiN(SO$_2$F)$_2$, V4Si | 0.2, 0.5, 2, 0.1 |
| Li (2)-0.2-LiBOB-1-LiSO3F-1-LiPO2F2-0.5-BP-2 | (2) | Li+ | 0.2 | LiPF$_6$ | 1 | LiBOB, LiSO$_3$F, LiPO$_2$F$_2$, BP | 1, 1, 0.5, 2 |
| Li (4)-0.2-LiBOB-1-LiSO3F-1-LiPO2F2-0.5-BP-2 | (4) | Li+ | 0.2 | LiPF$_6$ | 1 | LiBOB, LiSO$_3$F, LiPO$_2$F$_2$, BP | 1, 1, 0.5, 2 |
| Li (6)-0.2-LiBOB-1-LiSO3F-1-LiPO2F2-0.5-BP-2 | (6) | Li+ | 0.2 | LiPF$_6$ | 1 | LiBOB, LiSO$_3$F, LiPO$_2$F$_2$, BP | 1, 1, 0.5, 2 |
| Li (9)-0.2-LiBOB-1-LiSO3F-1-LiPO2F2-0.5-BP-2 | (9) | Li+ | 0.2 | LiPF$_6$ | 1 | LiBOB, LiSO$_3$F, LiPO$_2$F$_2$, BP | 1, 1, 0.5, 2 |
| Li (15)-0.2-LiBOB-1-LiSO3F-1-LiPO2F2-0.5-BP-2 | (15) | Li+ | 0.2 | LiPF$_6$ | 1 | LiBOB, LiSO$_3$F, LiPO$_2$F$_2$, BP | 1, 1, 0.5, 2 |
| (0)-LiBOB-1-LiSO3F-1-LiPO2F2-0.5-BP-2 | — | — | — | LiPF$_6$ | 1 | LiBOB, LiSO$_3$F, LiPO$_2$F$_2$, BP | 1, 1, 0.5, 2 |
| (0)-LiBOB-1-LiSO3F-1-LiPO2F2-0.5-BP-2-VC-0.2 | — | — | — | LiPF$_6$ | 1 | LiBOB, LiSO$_3$F, LiPO$_2$F$_2$, BP, VC | 1, 1, 0.5, 2, 0.2 |
| Li (17)-0.2-LiBOB-1-LiSO3F-1-LiPO2F2-0.5-BP-2 | (17) | Li+ | 0.2 | LiPF$_6$ | 1 | LiBOB, LiSO$_3$F, LiPO$_2$F$_2$, BP | 1, 1, 0.5, 2 |
| Li (18)-0.2-LiBOB-1-LiSO3F-1-LiPO2F2-0.5-BP-2 | (18) | Li+ | 0.2 | LiPF$_6$ | 1 | LiBOB, LiSO$_3$F, LiPO$_2$F$_2$, BP | 1, 1, 0.5, 2 |
| Li (2)-0.02-LiPF4(Ox)-1.5-LiN(SO2F)(POF2)-1-LiPO2F2-0.1-CHB-1.5 | (2) | Li+ | 0.02 | LiPF$_6$ | 1 | LiPF$_4$(C$_2$O$_4$), LiN(SO$_2$F)(POF$_2$), LiPO$_2$F$_2$, CHB | 1.5, 1, 0.1, 1.5 |
| Li (4)-0.02-LiPF4(Ox)-1.5-LiN(SO2F)(POF2)-1-LiPO2F2-0.1-CHB-1.5 | (4) | Li+ | 0.02 | LiPF$_6$ | 1 | LiPF$_4$(C$_2$O$_4$), LiN(SO$_2$F)(POF$_2$), LiPO$_2$F$_2$, CHB | 1.5, 1, 0.1, 1.5 |
| Li (6)-0.02-LiPF4(Ox)-1.5-LiN(SO2F)(POF2)-1-LiPO2F2-0.1-CHB-1.5 | (6) | Li+ | 0.02 | LiPF$_6$ | 1 | LiPF$_4$(C$_2$O$_4$), LiN(SO$_2$F)(POF$_2$), LiPO$_2$F$_2$, CHB | 1.5, 1, 0.1, 1.5 |
| Li (9)-0.02-LiPF4(Ox)-1.5-LiN(SO2F)(POF2)-1-LiPO2F2-0.1-CHB-1.5 | (9) | Li+ | 0.02 | LiPF$_6$ | 1 | LiPF$_4$(C$_2$O$_4$), LiN(SO$_2$F)(POF$_2$), LiPO$_2$F$_2$, CHB | 1.5, 1, 0.1, 1.5 |
| Li (15)-0.02-LiPF4(Ox)-1.5-LiN(SO2F)(POF2)-1-LiPO2F2-0.1-CHB-1.5 | (15) | Li+ | 0.02 | LiPF$_6$ | 1 | LiPF$_4$(C$_2$O$_4$), LiN(SO$_2$F)(POF$_2$), LiPO$_2$F$_2$, CHB | 1.5, 1, 0.1, 1.5 |
| (0)-LiPF4(Ox)-1.5-LiN(SO2F)(POF2)-1-LiPO2F2-0.1-CHB-1.5 | — | — | — | LiPF$_6$ | 1 | LiPF$_4$(C$_2$O$_4$), LiN(SO$_2$F)(POF$_2$), LiPO$_2$F$_2$, CHB | 1.5, 1, 0.1, 1.5 |
| (0)-LiPF4(Ox)-1.5-LiN(SO2F)(POF2)-1-LiPO2F2-0.1-CHB-1.5-VC-0.02 | — | — | — | LiPF$_6$ | 1 | LiPF$_4$(C$_2$O$_4$), LiN(SO$_2$F)(POF$_2$), LiPO$_2$F$_2$, CHB, VC | 1.5, 1, 0.1, 1.5, 0.02 |
| Li (17)-0.02-LiPF4(Ox)-1.5-LiN(SO2F)(POF2)-1-LiPO2F2-0.1-CHB-1.5 | (17) | Li+ | 0.02 | LiPF$_6$ | 1 | LiPF$_4$(C$_2$O$_4$), LiN(SO$_2$F)(POF$_2$), LiPO$_2$F$_2$, CHB | 1.5, 1, 0.1, 1.5 |
| Li (18)-0.02-LiPF4(Ox)-1.5-LiN(SO2F)(POF2)-1-LiPO2F2-0.1-CHB-1.5 | (18) | Li+ | 0.02 | LiPF$_6$ | 1 | LiPF$_4$(C$_2$O$_4$), LiN(SO$_2$F)(POF$_2$), LiPO$_2$F$_2$, CHB | 1.5, 1, 0.1, 1.5 |

TABLE 15

| Electrolyte solution No. | Ionic compound | | | Solute | | Other solute and additive | |
|---|---|---|---|---|---|---|---|
| | Type of anion | Counter cation | Conc. [mass %] | Type | Conc. [mol/L] | Type | Conc. [mass %] |
| Li (2)-0.02-LiBF2(Ox)-1-LiN(SO2F)(POF2)-1-V4Si-0.1 | (2) | Li+ | 0.02 | LiPF$_6$ | 1 | LiBF$_2$(C$_2$O$_4$), LiN(SO$_2$F)(POF$_2$), V4Si | 1, 1, 0.1 |
| Li (4)-0.02-LiBF2(Ox)-1-LiN(SO2F)(POF2)-1-V4Si-0.1 | (4) | Li+ | 0.02 | LiPF$_6$ | 1 | LiBF$_2$(C$_2$O$_4$), LiN(SO$_2$F)(POF$_2$), V4Si | 1, 1, 0.1 |
| Li (6)-0.02-LiBF2(Ox)-1-LiN(SO2F)(POF2)-1-V4Si-0.1 | (6) | Li+ | 0.02 | LiPF$_6$ | 1 | LiBF$_2$(C$_2$O$_4$), LiN(SO$_2$F)(POF$_2$), V4Si | 1, 1, 0.1 |
| Li (9)-0.02-LiBF2(Ox)-1-LiN(SO2F)(POF2)-1-V4Si-0.1 | (9) | Li+ | 0.02 | LiPF$_6$ | 1 | LiBF$_2$(C$_2$O$_4$), LiN(SO$_2$F)(POF$_2$), V4Si | 1, 1, 0.1 |
| Li (15)-0.02-LiBF2(Ox)-1-LiN(SO2F)(POF2)-1-V4Si-0.1 | (15) | Li+ | 0.02 | LiPF$_6$ | 1 | LiBF$_2$(C$_2$O$_4$), LiN(SO$_2$F)(POF$_2$), V4Si | 1, 1, 0.1 |
| (0)-LiBF2(Ox)-1-LiN(SO2F)(POF2)-1-V4Si-0.1 | — | — | — | LiPF$_6$ | 1 | LiBF$_2$(C$_2$O$_4$), LiN(SO$_2$F)(POF$_2$), V4Si | 1, 1, 0.1 |
| (0)-LiBF2(Ox)-1-LiN(SO2F)(POF2)-1-V4Si-0.1-VC-0.02 | — | — | — | LiPF$_6$ | 1 | LiBF$_2$(C$_2$O$_4$), LiN(SO$_2$F)(POF$_2$), V4Si, VC | 1, 1, 0.1, 0.02 |
| Li (17)-0.02-LiBF2(Ox)-1-LiN(SO2F)(POF2)-1-V4Si-0.1 | (17) | Li+ | 0.02 | LiPF$_6$ | 1 | LiBF$_2$(C$_2$O$_4$), LiN(SO$_2$F)(POF$_2$), V4Si | 1, 1, 0.1 |
| Li (18)-0.02-LiBF2(Ox)-1-LiN(SO2F)(POF2)-1-V4Si-0.1 | (18) | Li+ | 0.02 | LiPF$_6$ | 1 | LiBF$_2$(C$_2$O$_4$), LiN(SO$_2$F)(POF$_2$), V4Si | 1, 1, 0.1 |
| Li (2)-0.02-LiN(FSO2)(POFpropynyloxy)-1-LiSO3F-0.2-LiPO2F2-0.2-TBB-1.5 | (2) | Li+ | 0.02 | LiPF$_6$ | 1 | LiN(FSO$_2$)(POF(OCH$_2$CCH)), LiSO$_3$F, LiPO$_2$F$_2$, TBB | 1, 0.2, 0.2, 1.5 |
| Li (4)-0.02-LiN(FSO2)(POFpropynyloxy)-1-LiSO3F-0.2-LiPO2F2-0.2-TBB-1.5 | (4) | Li+ | 0.02 | LiPF$_6$ | 1 | LiN(FSO$_2$)(POF(OCH$_2$CCH)), LiSO$_3$F, LiPO$_2$F$_2$, TBB | 1, 0.2, 0.2, 1.5 |
| Li (6)-0.02-LiN(FSO2)(POFpropynyloxy)-1-LiSO3F-0.2-LiPO2F2-0.2-TBB-1.5 | (6) | Li+ | 0.02 | LiPF$_6$ | 1 | LiN(FSO$_2$)(POF(OCH$_2$CCH)), LiSO$_3$F, LiPO$_2$F$_2$, TBB | 1, 0.2, 0.2, 1.5 |
| Li (9)-0.02-LiN(FSO2)(POFpropynyloxy)-1-LiSO3F-0.2-LiPO2F2-0.2-TBB-1.5 | (9) | Li+ | 0.02 | LiPF$_6$ | 1 | LiN(FSO$_2$)(POF(OCH$_2$CCH)), LiSO$_3$F, LiPO$_2$F$_2$, TBB | 1, 0.2, 0.2, 1.5 |
| Li (15)-0.02-LiN(FSO2)(POFpropynyloxy)-1-LiSO3F-0.2-LiPO2F2-0.2-TBB-1.5 | (15) | Li+ | 0.02 | LiPF$_6$ | 1 | LiN(FSO$_2$)(POF(OCH$_2$CCH)), LiSO$_3$F, LiPO$_2$F$_2$, TBB | 1, 0.2, 0.2, 1.5 |
| (0)-LiN(FSO2)(POFpropynyloxy)-1-LiSO3F-0.2-LiPO2F2-0.2-TBB-1.5 | — | — | — | LiPF$_6$ | 1 | LiN(FSO$_2$)(POF(OCH$_2$CCH)), LiSO$_3$F, LiPO$_2$F$_2$, TBB | 1, 0.2, 0.2, 1.5 |
| (0)-LiN(FSO2)(POFpropynyloxy)-1-LiSO3F-0.2-LiPO2F2-0.2-TBB-1.5-VC-0.02 | — | — | — | LiPF$_6$ | 1 | LiN(FSO$_2$)(POF(OCH$_2$CCH)), LiSO$_3$F, LiPO$_2$F$_2$, TBB, VC | 1, 0.2, 0.2, 1.5, 0.02 |
| Li (17)-0.02-LiN(FSO2)(POFpropynyloxy)-1-LiSO3F-0.2-LiPO2F2-0.2-TBB-1.5 | (17) | Li+ | 0.02 | LiPF$_6$ | 1 | LiN(FSO$_2$)(POF(OCH$_2$CCH)), LiSO$_3$F, LiPO$_2$F$_2$, TBB | 1, 0.2, 0.2, 1.5 |
| Li (18)-0.02-LiN(FSO2)(POFpropynyloxy)-1-LiSO3F-0.2-LiPO2F2-0.2-TBB-1.5 | (18) | Li+ | 0.02 | LiPF$_6$ | 1 | LiN(FSO$_2$)(POF(OCH$_2$CCH)), LiSO$_3$F, LiPO$_2$F$_2$, TBB | 1, 0.2, 0.2, 1.5 |
| Li (2)-0.01-LiN(FSO2)(POFpropynyloxy)-1-LiPO2F2-0.2-DTDO-0.5-FEC-1 | (2) | Li+ | 0.01 | LiPF$_6$ | 1 | LiN(FSO$_2$)(POF(OCH$_2$CCH)), LiPO$_2$F$_2$, DTDO, FEC | 1, 0.2, 0.5, 1 |
| Li (4)-0.01-LiN(FSO2)(POFpropynyloxy)-1-LiPO2F2-0.2-DTDO-0.5-FEC-1 | (4) | Li+ | 0.01 | LiPF$_6$ | 1 | LiN(FSO$_2$)(POF(OCH$_2$CCH)), LiPO$_2$F$_2$, DTDO, FEC | 1, 0.2, 0.5, 1 |
| Li (6)-0.01-LiN(FSO2)(POFpropynyloxy)-1-LiPO2F2-0.2-DTDO-0.5-FEC-1 | (6) | Li+ | 0.01 | LiPF$_6$ | 1 | LiN(FSO$_2$)(POF(OCH$_2$CCH)), LiPO$_2$F$_2$, DTDO, FEC | 1, 0.2, 0.5, 1 |
| Li (9)-0.01-LiN(FSO2)(POFpropynyloxy)-1-LiPO2F2-0.2-DTDO-0.5-FEC-1 | (9) | Li+ | 0.01 | LiPF$_6$ | 1 | LiN(FSO$_2$)(POF(OCH$_2$CCH)), LiPO$_2$F$_2$, DTDO, FEC | 1, 0.2, 0.5, 1 |
| Li (15)-0.01-LiN(FSO2)(POFpropynyloxy)-1-LiPO2F2-0.2-DTDO-0.5-FEC-1 | (15) | Li+ | 0.01 | LiPF$_6$ | 1 | LiN(FSO$_2$)(POF(OCH$_2$CCH)), LiPO$_2$F$_2$, DTDO, FEC | 1, 0.2, 0.5, 1 |
| (0)-LiN(FSO2)(POFpropynyloxy)-1-LiPO2F2-0.2-DTDO-0.5-FEC-1 | — | — | — | LiPF$_6$ | 1 | LiN(FSO$_2$)(POF(OCH$_2$CCH)), LiPO$_2$F$_2$, DTDO, FEC | 1, 0.2, 0.5, 1 |
| (0)-LiN(FSO2)(POFpropynyloxy)-1-LiPO2F2-0.2-DTDO-0.5-FEC-1-VC-0.01 | — | — | — | LiPF$_6$ | 1 | LiN(FSO$_2$)(POF(OCH$_2$CCH)), LiPO$_2$F$_2$, DTDO, FEC, VC | 1, 0.2, 0.5, 1, 0.01 |
| Li (17)-0.01-LiN(FSO2)(POFpropynyloxy)-1-LiPO2F2-0.2-DTDO-0.5-FEC-1 | (17) | Li+ | 0.01 | LiPF$_6$ | 1 | LiN(FSO$_2$)(POF(OCH$_2$CCH)), LiPO$_2$F$_2$, DTDO, FEC | 1, 0.2, 0.5, 1 |
| Li (18)-0.01-LiN(FSO2)(POFpropynyloxy)-1-LiPO2F2-0.2-DTDO-0.5-FEC-1 | (18) | Li+ | 0.01 | LiPF$_6$ | 1 | LiN(FSO$_2$)(POF(OCH$_2$CCH)), LiPO$_2$F$_2$, DTDO, FEC | 1, 0.2, 0.5, 1 |

TABLE 16

| | Electrolyte solution No. | Positive electrode active material | Negative electrode active material | Discharge capacity retention rate after cycles* [%] | High-output capacity retention rate* [%] |
|---|---|---|---|---|---|
| Example 5-1 | Li (2)-0.05-LiPF2(Ox)2-1 | LiNi$_{0.6}$Co$_{0.2}$Mn$_{0.2}$O$_2$ | Graphite | 105 | 105 |
| Example 5-2 | Li (4)-0.05-LiPF2(Ox)2-1 | | | 106 | 109 |
| Example 5-3 | Li (6)-0.05-LiPF2(Ox)2-1 | | | 106 | 109 |
| Example 5-4 | Li (9)-0.05-LiPF2(Ox)2-1 | | | 107 | 108 |
| Example 5-5 | Li (15)-0.05-LiPF2(Ox)2-1 | | | 108 | 107 |
| Comparative Example 5-0 | (0)-LiPF2(Ox)2-1 | | | 100 | 100 |

TABLE 16-continued

|  | Electrolyte solution No. | Positive electrode active material | Negative electrode active material | Discharge capacity retention rate after cycles* [%] | High-output capacity retention rate* [%] |
|---|---|---|---|---|---|
| Comparative Example 5-1 | (0)-LiPF2(Ox)2-1-VC-0.05 |  |  | 101 | 99 |
| Comparative Example 5-2 | Li (17)-0.05-LiPF2(Ox)2-1 |  |  | 103 | 100 |
| Comparative Example 5-3 | Li (18)-0.05-LiPF2(Ox)2-1 |  |  | 100 | 100 |
| Example 6-1 | Li (2)-0.05-LiPF4(Ox)-1 |  |  | 107 | 108 |
| Example 6-2 | Li (2)-0.01-LiPF4(Ox)-1 |  |  | 104 | 105 |
| Example 6-3 | Li (2)-0.001-LiPF4(Ox)-1 |  |  | 101 | 102 |
| Comparative Example 6-0 | (0)-LiPF4(Ox)-1 |  |  | 100 | 100 |
| Comparative Example 6-1 | (0)-LiPF4(Ox)-1-VC-0.05 |  |  | 101 | 98 |
| Comparative Example 6-2 | Li (17)-0.05-LiPF4(Ox)-1 |  |  | 102 | 100 |
| Comparative Example 6-3 | Li (18)-0.05-LiPF4(Ox)-1 |  |  | 100 | 100 |
| Comparative Example 6-4 | (0)-LiPF4(Ox)-1-VC-0.01 |  |  | 100 | 100 |
| Comparative Example 6-5 | Li (17)-0.01-LiPF4(Ox)-1 |  |  | 101 | 100 |
| Comparative Example 6-6 | Li (18)-0.01-LiPF4(Ox)-1 |  |  | 100 | 100 |
| Comparative Example 6-7 | (0)-LiPF4(Ox)-1-VC-0.001 |  |  | 100 | 99 |
| Comparative Example 6-8 | Li (17)-0.001-LiPF4(Ox)-1 |  |  | 100 | 100 |
| Comparative Example 6-9 | Li (18)-0.001-LiPF4(Ox)-1 |  |  | 100 | 100 |
| Example 7-1 | Li (4)-0.05-LiBF2(Ox)-1 |  |  | 108 | 107 |
| Example 7-2 | Li (4)-0.01-LiBF2(Ox)-1 |  |  | 103 | 104 |
| Example 7-3 | Li (4)-0.001-LiBF2(Ox)-1 |  |  | 103 | 103 |
| Comparative Example 7-0 | (0)-LiBF2(Ox)-1 |  |  | 100 | 100 |
| Comparative Example 7-1 | (0)-LiBF2(Ox)-1-VC-0.05 |  |  | 101 | 98 |
| Comparative Example 7-2 | Li (17)-0.05-LiBF2(Ox)-1 |  |  | 102 | 100 |
| Comparative Example 7-3 | Li (18)-0.05-LiBF2(Ox)-1 |  |  | 100 | 100 |
| Comparative Example 7-4 | (0)-LiBF2(Ox)-1-VC-0.01 |  |  | 100 | 100 |
| Comparative Example 7-5 | Li (17)-0.01-LiBF2(Ox)-1 |  |  | 101 | 100 |
| Comparative Example 7-6 | Li (18)-0.01-LiBF2(Ox)-1 |  |  | 100 | 100 |
| Comparative Example 7-7 | (0)-LiBF2(Ox)-1-VC-0.001 |  |  | 100 | 100 |
| Comparative Example 7-8 | Li (17)-0.001-LiBF2(Ox)-1 |  |  | 100 | 100 |
| Comparative Example 7-9 | Li (18)-0.001-LiBF2(Ox)-1 |  |  | 100 | 100 |

*In Examples 5-1 to 5-5 and Comparative Examples 5-1 to 5-3, the values were each a relative value when the result of evaluation in Comparative Example 5-0 was defined as 100.
*In Examples 6-1 to 6-3 and Comparative Examples 6-1 to 6-9, the values were each a relative value when the result of evaluation in Comparative Example 6-0 was defined as 100.
*In Examples 7-1 to 7-3 and Comparative Examples 7-1 to 7-9, the values were each a relative value when the result of evaluation in Comparative Example 7-0 was defined as 100.

TABLE 17

|  | Electrolyte solution No. | Positive electrode active material | Negative electrode active material | Discharge capacity retention rate after cycles* [%] | High-output capacity retention rate* [%] |
|---|---|---|---|---|---|
| Example 8-1 | Li (2)-0.5-LiPO2F2-1-[1.1] | $LiNi_{0.6}Co_{0.2}Mn_{0.2}O_2$ | Graphite | 112 | 109 |
| Example 8-2 | Li (4)-0.5-LiPO2F2-1-[1.1] |  |  | 112 | 117 |
| Example 8-3 | Li (6)-0.5-LiPO2F2-1-[1.1] |  |  | 113 | 109 |
| Example 8-4 | Li (9)-0.5-LiPO2F2-1-[1.1] |  |  | 111 | 111 |

TABLE 17-continued

| | Electrolyte solution No. | Positive electrode active material | Negative electrode active material | Discharge capacity retention rate after cycles* [%] | High-output capacity retention rate* [%] |
|---|---|---|---|---|---|
| Example 8-5 | Li (15)-0.5-LiPO2F2-1-[1.1] | | | 114 | 111 |
| Comparative Example 8-0 | (0)-LiPO2F2-1-[1.1] | | | 100 | 100 |
| Comparative Example 8-1 | (0)-LiPO2F2-1-VC-0.5-[1.1] | | | 107 | 91 |
| Comparative Example 8-2 | Li (17)-0.5-LiPO2F2-1-[1.1] | | | 107 | 101 |
| Comparative Example 8-3 | Li (18)-0.5-LiPO2F2-1-[1.1] | | | 100 | 100 |
| Example 9-1 | Li (2)-0.2-LiSO3F-1 | | | 111 | 109 |
| Example 9-2 | Li (4)-0.2-LiSO3F-1 | | | 110 | 115 |
| Example 9-3 | Li (9)-0.2-LiSO3F-1 | | | 109 | 111 |
| Comparative Example 9-0 | (0)-LiSO3F-1 | | | 100 | 100 |
| Comparative Example 9-1 | (0)-LiSO3F-1-VC-0.2 | | | 104 | 93 |
| Comparative Example 9-2 | Li (17)-0.2-LiSO3F-1 | | | 105 | 101 |
| Comparative Example 9-3 | Li (18)-0.2-LiSO3F-1 | | | 100 | 100 |
| Example 10-1 | Li (4)-0.02-LiN(SO2F)2-3-[0.8] | | | 105 | 106 |
| Example 10-2 | Li (6)-0.02-LiN(SO2F)2-3-[0.8] | | | 105 | 104 |
| Comparative Example 10-0 | (0)-LiN(SO2F)2-3-[0.8] | | | 100 | 100 |
| Comparative Example 10-1 | (0)-LiN(SO2F)2-3-VC-0.02-[0.8] | | | 100 | 99 |
| Comparative Example 10-2 | Li (17)-0.02-LiN(SO2F)2-3-[0.8] | | | 100 | 100 |
| Comparative Example 10-3 | Li (18)-0.02-LiN(SO2F)2-3-[0.8] | | | 100 | 100 |
| Example 11-1 | Li (2)-0.02-LiN(SO2F)(POF2)-1 | | | 104 | 106 |
| Example 11-2 | Li (4)-0.02-LiN(SO2F)(POF2)-1 | | | 105 | 106 |
| Example 11-3 | Li (6)-0.02-LiN(SO2F)(POF2)-1 | | | 103 | 105 |
| Example 11-4 | Li (9)-0.02-LiN(SO2F)(POF2)-1 | | | 104 | 104 |
| Example 11-5 | Li (15)-0.02-LiN(SO2F)(POF2)-1 | | | 105 | 103 |
| Comparative Example 11-0 | (0)-LiN(SO2F)(POF2)-1 | | | 100 | 100 |
| Comparative Example 11-1 | (0)-LiN(SO2F)(POF2)-1-VC-0.02 | | | 100 | 100 |
| Comparative Example 11-2 | Li (17)-0.02-LiN(SO2F)(POF2)-1 | | | 101 | 100 |
| Comparative Example 11-3 | Li (18)-0.02-LiN(SO2F)(POF2)-1 | | | 100 | 100 |
| Example 12-1 | Li (2)-0.01-LiN(FSO2)(POFpropynyloxy)-1 | | | 104 | 104 |
| Example 12-2 | Li (4)-0.01-LiN(FSO2)(POFpropynyloxy)-1 | | | 103 | 104 |
| Example 12-3 | Li (15)-0.01-LiN(FSO2)(POFpropynyloxy)-1 | | | 102 | 103 |
| Comparative Example 12-0 | (0)-LiN(FSO2)(POFpropynyloxy)-1 | | | 100 | 100 |
| Comparative Example 12-1 | (0)-LiN(FSO2)(POFpropynyloxy)-1-VC-0.01 | | | 100 | 100 |
| Comparative Example 12-2 | Li (17)-0.01-LiN(FSO2)(POFpropynyloxy)-1 | | | 100 | 100 |
| Comparative Example 12-3 | Li (18)-0.01-LiN(FSO2)(POFpropynyloxy)-1 | | | 100 | 100 |

*In Examples 8-1 to 8-5 and Comparative Examples 8-1 to 8-3, the values were each a relative value when the result of evaluation in Comparative Example 8-0 was defined as 100.
*In Examples 9-1 to 9-3 and Comparative Examples 9-1 to 9-3, the values are each a relative value when the result of evaluation in Comparative Example 9-0 was defined as 100.
*In Examples 10-1 and 10-2 and Comparative Examples 10-1 to 10-3, the values were each a relative value when the result of evaluation in Comparative Example 10-0 was defined as 100.
*In Examples 11-1 to 11-5 and Comparative Examples 11-1 to 11-3, the values were each a relative value when the result of evaluation in Comparative Example 11-0 was defined as 100.
*In Examples 12-1 to 12-3 and Comparative Examples 12-1 to 12-3, the values were each a relative value when the result of evaluation in Comparative Example 12-0 was defined as 100.

TABLE 18

| | Electrolyte solution No. | Positive electrode active material | Negative electrode active material | Discharge capacity retention rate after cycles* [%] | High-output capacity retention rate* [%] |
|---|---|---|---|---|---|
| Example 13-1 | Li (2)-0.5-VC-1 | LiNi$_{0.6}$Co$_{0.2}$Mn$_{0.2}$O$_2$ | Graphite | 108 | 111 |
| Example 13-2 | Li (4)-0.5-VC-1 | | | 110 | 112 |
| Example 13-3 | Li (6)-0.5-VC-1 | | | 109 | 111 |
| Example 13-4 | Li (9)-0.5-VC-1 | | | 109 | 108 |
| Example 13-5 | Li (15)-0.5-VC-1 | | | 110 | 109 |
| Comparative Example 13-0 | (0)-VC-1 | | | 100 | 100 |
| Comparative Example 13-1 | (0)-VC-1.5 | | | 106 | 92 |
| Comparative Example 13-2 | Li (17)-0.5-VC-1 | | | 107 | 101 |
| Comparative Example 13-3 | Li (18)-0.5-VC-1 | | | 100 | 100 |
| Example 14-1 | Li (2)-0.5-PS-0.5 | | | 107 | 112 |
| Example 14-2 | Li (4)-0.5-PS-0.5 | | | 107 | 112 |
| Example 14-3 | Li (6)-0.5-PS-0.5 | | | 107 | 108 |
| Example 14-4 | Li (9)-0.5-PS-0.5 | | | 108 | 107 |
| Example 14-5 | Li (15)-0.5-PS-0.5 | | | 109 | 107 |
| Comparative Example 14-0 | (0)-PS-0.5 | | | 100 | 100 |
| Comparative Example 14-1 | (0)-PS-0.5-VC-0.5 | | | 107 | 93 |
| Comparative Example 14-2 | Li (17)-0.5-PS-0.5 | | | 107 | 100 |
| Comparative Example 14-3 | Li (18)-0.5-PS-0.5 | | | 100 | 100 |
| Example 15-1 | Li (2)-0.5-DTDO-1 | | | 108 | 111 |
| Example 15-2 | Li (4)-0.5-DTDO-1 | | | 111 | 110 |
| Example 15-3 | Li (6)-0.5-DTDO-1 | | | 109 | 107 |
| Example 15-4 | Li (9)-0.5-DTDO-1 | | | 106 | 108 |
| Example 15-5 | Li (15)-0.5-DTDO-1 | | | 109 | 107 |
| Comparative Example 15-0 | (0)-DTDO-1 | | | 100 | 100 |
| Comparative Example 15-1 | (0)-DTDO-1-VC-0.5 | | | 105 | 95 |
| Comparative Example 15-2 | Li (17)-0.5-DTDO-1 | | | 104 | 101 |
| Comparative Example 15-3 | Li (18)-0.5-DTDO-1 | | | 100 | 100 |
| Example 16-1 | Li (2)-0.5-V4Si-0.2 | | | 106 | 112 |
| Example 16-2 | Li (4)-0.5-V4Si-0.2 | | | 109 | 115 |
| Example 16-3 | Li (6)-0.5-V4Si-0.2 | | | 107 | 109 |
| Example 16-4 | Li (9)-0.5-V4Si-0.2 | | | 110 | 107 |
| Example 16-5 | Li (15)-0.5-V4Si-0.2 | | | 109 | 107 |
| Comparative Example 16-0 | (0)-V4Si-0.2 | | | 100 | 100 |
| Comparative Example 16-1 | (0)-V4Si-0.2-VC-0.5 | | | 104 | 90 |
| Comparative Example 16-2 | Li (17)-0.5-V4Si-0.2 | | | 105 | 100 |
| Comparative Example 16-3 | Li (18)-0.5-V4Si-0.2 | | | 100 | 100 |
| Example 17-1 | Li (2)-0.5-FEC-1 | | | 109 | 111 |
| Example 17-2 | Li (4)-0.5-FEC-1 | | | 110 | 110 |
| Example 17-3 | Li (6)-0.5-FEC-1 | | | 108 | 109 |
| Example 17-4 | Li (9)-0.5-FEC-1 | | | 110 | 107 |
| Example 17-5 | Li (15)-0.5-FEC-1 | | | 107 | 108 |
| Comparative Example 17-0 | (0)-FEC-1 | | | 100 | 100 |
| Comparative Example 17-1 | (0)-FEC-1-VC-0.5 | | | 104 | 94 |

TABLE 18-continued

|  | Electrolyte solution No. | Positive electrode active material | Negative electrode active material | Discharge capacity retention rate after cycles* [%] | High-output capacity retention rate* [%] |
|---|---|---|---|---|---|
| Comparative Example 17-2 | Li (17)-0.5-FEC-1 |  |  | 105 | 101 |
| Comparative Example 17-3 | Li (18)-0.5-FEC-1 |  |  | 100 | 100 |

*In Examples 13-1 to 13-5 and Comparative Examples 13-1 to 13-3, the values were each a relative value when the result of evaluation in Comparative Example 13-0 was defined as 100.
*In Examples 14-1 to 14-5 and Comparative Examples 14-1 to 14-3, the values were each a relative value when the result of evaluation in Comparative Example 14-0 was defined as 100.
*In Examples 15-1 to 15-5 and Comparative Examples 15-1 to 15-3, the values were each a relative value when the result of evaluation in Comparative Example 15-0 was defined as 100.
*In Examples 16-1 to 16-5 and Comparative Examples 16-1 to 16-3, the values were each a relative value when the result of evaluation in Comparative Example 16-0 was defined as 100.
*In Examples 17-1 to 17-5 and Comparative Examples 17-1 to 17-3, the values were each a relative value when the result of evaluation in Comparative Example 17-0 was defined as 100.

TABLE 19

|  | Electrolyte solution No. | Positive electrode active material | Negative electrode active material | Discharge capacity retention rate after cycles* [%] | High-output capacity retention rate* [%] |
|---|---|---|---|---|---|
| Example 18-1 | Li (2)-0.02-LiPF2(Ox)2-0.2-LiPF4(Ox)-1 | LiNi$_{0.6}$Co$_{0.2}$Mn$_{0.2}$O$_2$ | Graphite | 105 | 104 |
| Example 18-2 | Li (4)-0.02-LiPF2(Ox)2-0.2-LiPF4(Ox)-1 |  |  | 106 | 105 |
| Example 18-3 | Li (6)-0.02-LiPF2(Ox)2-0.2-LiPF4(Ox)-1 |  |  | 106 | 104 |
| Example 18-4 | Li (9)-0.02-LiPF2(Ox)2-0.2-LiPF4(Ox)-1 |  |  | 104 | 103 |
| Example 18-5 | Li (15)-0.02-LiPF2(Ox)2-0.2-LiPF4(Ox)-1 |  |  | 104 | 103 |
| Comparative Example 18-0 | (0)-LiPF2(Ox)2-0.2-LiPF4(Ox)-1 |  |  | 100 | 100 |
| Comparative Example 18-1 | (0)-LiPF2(Ox)2-0.2-LiPF4(Ox)-1-VC-0.02 |  |  | 100 | 99 |
| Comparative Example 18-2 | Li (17)-0.02-LiPF2(Ox)2-0.2-LiPF4(Ox)-1 |  |  | 101 | 100 |
| Comparative Example 18-3 | Li (18)-0.02-LiPF2(Ox)2-0.2-LiPF4(Ox)-1 |  |  | 100 | 100 |
| Example 19-1 | Li (2)-0.02-VC-0.5-LiPF2(Ox)2-1 |  |  | 104 | 106 |
| Example 19-2 | Li (4)-0.02-VC-0.5-LiPF2(Ox)2-1 |  |  | 103 | 105 |
| Example 19-3 | Li (6)-0.02-VC-0.5-LiPF2(Ox)2-1 |  |  | 104 | 104 |
| Example 19-4 | Li (9)-0.02-VC-0.5-LiPF2(Ox)2-1 |  |  | 103 | 104 |
| Example 19-5 | Li (15)-0.02-VC-0.5-LiPF2(Ox)2-1 |  |  | 103 | 103 |
| Comparative Example 19-0 | (0)-VC-0.5-LiPF2(Ox)2-1 |  |  | 100 | 100 |
| Comparative Example 19-1 | (0)-VC-0.52-LiPF2(Ox)2-1 |  |  | 100 | 100 |
| Comparative Example 19-2 | Li (17)-0.02-VC-0.5-LiPF2(Ox)2-1 |  |  | 100 | 100 |
| Comparative Example 19-3 | Li (18)-0.02-VC-0.5-LiPF2(Ox)2-1 |  |  | 100 | 100 |
| Example 20-1 | Li (2)-0.02-VC-0.5-LiPF4(Ox)-1 |  |  | 103 | 104 |
| Example 20-2 | Li (4)-0.02-VC-0.5-LiPF4(Ox)-1 |  |  | 104 | 104 |
| Example 20-3 | Li (6)-0.02-VC-0.5-LiPF4(Ox)-1 |  |  | 104 | 103 |
| Example 20-4 | Li (9)-0.02-VC-0.5-LiPF4(Ox)-1 |  |  | 103 | 103 |
| Example 20-5 | Li (15)-0.02-VC-0.5-LiPF4(Ox)-1 |  |  | 104 | 102 |
| Comparative Example 20-0 | (0)-VC-0.5-LiPF4(Ox)-1 |  |  | 100 | 100 |
| Comparative Example 20-1 | (0)-VC-0.52-LiPF4(Ox)-1 |  |  | 100 | 100 |
| Comparative Example 20-2 | Li (17)-0.02-VC-0.5-LiPF4(Ox)-1 |  |  | 101 | 100 |
| Comparative Example 20-3 | Li (18)-0.02-VC-0.5-LiPF4(Ox)-1 |  |  | 100 | 100 |
| Example 21-1 | Li (2)-0.02-VC-0.5-LiBF2(Ox)-1 |  |  | 104 | 105 |
| Example 21-2 | Li (4)-0.02-VC-0.5-LiBF2(Ox)-1 |  |  | 104 | 105 |
| Example 21-3 | Li (6)-0.02-VC-0.5-LiBF2(Ox)-1 |  |  | 104 | 103 |
| Example 21-4 | Li (9)-0.02-VC-0.5-LiBF2(Ox)-1 |  |  | 103 | 103 |
| Example 21-5 | Li (15)-0.02-VC-0.5-LiBF2(Ox)-1 |  |  | 103 | 103 |
| Comparative Example 21-0 | (0)-VC-0.5-LiBF2(Ox)-1 |  |  | 100 | 100 |

TABLE 19-continued

|  | Electrolyte solution No. | Positive electrode active material | Negative electrode active material | Discharge capacity retention rate after cycles* [%] | High-output capacity retention rate* [%] |
|---|---|---|---|---|---|
| Comparative Example 21-1 | (0)-VC-0.52-LiBF2(Ox)-1 |  |  | 100 | 100 |
| Comparative Example 21-2 | Li (17)-0.02-VC-0.5-LiBF2(Ox)-1 |  |  | 100 | 100 |
| Comparative Example 21-3 | Li (18)-0.02-VC-0.5-LiBF2(Ox)-1 |  |  | 100 | 100 |
| Example 22-1 | Li (2)-0.05-VC-0.5-LiPO2F2-1 |  |  | 107 | 107 |
| Example 22-2 | Li (4)-0.05-VC-0.5-LiPO2F2-1 |  |  | 108 | 108 |
| Example 22-3 | Li (6)-0.05-VC-0.5-LiPO2F2-1 |  |  | 105 | 104 |
| Example 22-4 | Li (9)-0.05-VC-0.5-LiPO2F2-1 |  |  | 105 | 105 |
| Example 22-5 | Li (15)-0.05-VC-0.5-LiPO2F2-1 |  |  | 105 | 104 |
| Comparative Example 22-0 | (0)-VC-0.5-LiPO2F2-1 |  |  | 100 | 100 |
| Comparative Example 22-1 | (0)-VC-0.55-LiPO2F2-1 |  |  | 101 | 98 |
| Comparative Example 22-2 | Li (17)-0.05-VC-0.5-LiPO2F2-1 |  |  | 101 | 100 |
| Comparative Example 22-3 | Li (18)-0.05-VC-0.5-LiPO2F2-1 |  |  | 100 | 100 |

*In Examples 18-1 to 18-5 and Comparative Examples 18-1 to 18-3, the values were each a relative value when the result of evaluation in Comparative Example 18-0 was defined as 100.
*In Examples 19-1 to 19-5 and Comparative Examples 19-1 to 19-3, the values were each a relative value when the result of evaluation in Comparative Example 19-0 was defined as 100.
*In Examples 20-1 to 20-5 and Comparative Examples 20-1 to 20-3, the values were each a relative value when the result of evaluation in Comparative Example 20-0 was defined as 100.
*In Examples 21-1 to 21-5 and Comparative Examples 21-1 to 21-3, the values were each a relative value when the result of evaluation in Comparative Example 21-0 was defined as 100.
*In Examples 22-1 to 22-5 and Comparative Examples 22-1 to 22-3, the values were each a relative value when the result of evaluation in Comparative Example 22-0 was defined as 100.

TABLE 20

|  | Electrolyte solution No. | Positive electrode active material | Negative electrode active material | Discharge capacity retention rate after cycles* [%] | High-output capacity retention rate* [%] |
|---|---|---|---|---|---|
| Example 23-1 | Li (2)-0.2-LiBOB-1-LiPO2F2-0.5 | LiNi$_{0.6}$Co$_{0.2}$Mn$_{0.2}$O$_2$ | Graphite | 110 | 111 |
| Example 23-2 | Li (4)-0.2-LiBOB-1-LiPO2F2-0.5 |  |  | 110 | 112 |
| Example 23-3 | Li (6)-0.2-LiBOB-1-LiPO2F2-0.5 |  |  | 108 | 107 |
| Example 23-4 | Li (9)-0.2-LiBOB-1-LiPO2F2-0.5 |  |  | 107 | 109 |
| Example 23-5 | Li (15)-0.2-LiBOB-1-LiPO2F2-0.5 |  |  | 111 | 107 |
| Comparative Example 23-0 | (0)-LiBOB-1-LiPO2F2-0.5 |  |  | 100 | 100 |
| Comparative Example 23-1 | (0)-LiBOB-1-LiPO2F2-0.5-VC-0.2 |  |  | 103 | 96 |
| Comparative Example 23-2 | Li (17)-0.2-LiBOB-1-LiPO2F2-0.5 |  |  | 104 | 100 |
| Comparative Example 23-3 | Li (18)-0.2-LiBOB-1-LiPO2F2-0.5 |  |  | 100 | 100 |
| Example 24-1 | Li (2)-0.05-LiBF2(Ox)-1-LiPO2F2-0.2 |  |  | 107 | 106 |
| Example 24-2 | Li (4)-0.05-LiBF2(Ox)-1-LiPO2F2-0.2 |  |  | 106 | 107 |
| Example 24-3 | Li (6)-0.05-LiBF2(Ox)-1-LiPO2F2-0.2 |  |  | 106 | 105 |
| Example 24-4 | Li (9)-0.05-LiBF2(Ox)-1-LiPO2F2-0.2 |  |  | 108 | 105 |
| Example 24-5 | Li (15)-0.05-LiBF2(Ox)-1-LiPO2F2-0.2 |  |  | 109 | 106 |
| Comparative Example 24-0 | (0)-LiBF2(Ox)-1-LiPO2F2-0.2 |  |  | 100 | 100 |

TABLE 20-continued

| | Electrolyte solution No. | Positive electrode active material | Negative electrode active material | Discharge capacity retention rate after cycles* [%] | High-output capacity retention rate* [%] |
|---|---|---|---|---|---|
| Comparative Example 24-1 | (0)-LiBF2(Ox)-1-LiPO2F2-0.2-VC-0.05 | | | 101 | 100 |
| Comparative Example 24-2 | Li (17)-0.05-LiBF2(Ox)-1-LiPO2F2-0.2 | | | 100 | 100 |
| Comparative Example 24-3 | Li (18)-0.05-LiBF2(Ox)-1-LiPO2F2-0.2 | | | 100 | 100 |
| Example 25-1 | Li (2)-0.5-LiN(SO2F)2-3-LiPO2F2-0.5 | | | 112 | 113 |
| Example 25-2 | Li (4)-0.5-LiN(SO2F)2-3-LiPO2F2-0.5 | | | 113 | 114 |
| Example 25-3 | Li (6)-0.5-LiN(SO2F)2-3-LiPO2F2-0.5 | | | 111 | 111 |
| Example 25-4 | Li (9)-0.5-LiN(SO2F)2-3-LiPO2F2-0.5 | | | 112 | 109 |
| Example 25-5 | Li (15)-0.5-LiN(SO2F)2-3-LiPO2F2-0.5 | | | 113 | 110 |
| Comparative Example 25-0 | (0)-LiN(SO2F)2-3-LiPO2F2-0.5 | | | 100 | 100 |
| Comparative Example 25-1 | (0)-LiN(SO2F)2-3-LiPO2F2-0.5-VC-0.5 | | | 106 | 93 |
| Comparative Example 25-2 | Li (17)-0.5-LiN(SO2F)2-3-LiPO2F2-0.5 | | | 104 | 100 |
| Comparative Example 25-3 | Li (18)-0.5-LiN(SO2F)2-3-LiPO2F2-0.5 | | | 101 | 100 |
| Example 26-1 | Li (2)-0.02-LiN(SO2F)(POF2)-1-LiPO2F2-0.1 | | | 106 | 107 |
| Example 26-2 | Li (4)-0.02-LiN(SO2F)(POF2)-1-LiPO2F2-0.1 | | | 106 | 107 |
| Example 26-3 | Li (6)-0.02-LiN(SO2F)(POF2)-1-LiPO2F2-0.1 | | | 104 | 103 |
| Example 26-4 | Li (9)-0.02-LiN(SO2F)(POF2)-1-LiPO2F2-0.1 | | | 105 | 104 |
| Example 26-5 | Li (15)-0.02-LiN(SO2F)(POF2)-1-LiPO2F2-0.1 | | | 105 | 103 |
| Comparative Example 26-0 | (0)-LiN(SO2F)(POF2)-1-LiPO2F2-0.1 | | | 100 | 100 |
| Comparative Example 26-1 | (0)-LiN(SO2F)(POF2)-1-LiPO2F2-0.1-VC-0.02 | | | 100 | 99 |
| Comparative Example 26-2 | Li (17)-0.02-LiN(SO2F)(POF2)-1-LiPO2F2-0.1 | | | 100 | 100 |
| Comparative Example 26-3 | Li (18)-0.02-LiN(SO2F)(POF2)-1-LiPO2F2-0.1 | | | 100 | 100 |

*In Examples 23-1 to 23-5 and Comparative Examples 23-1 to 23-3, the values were each a relative value when the result of evaluation in Comparative Example 23-0 was defined as 100.
*In Examples 24-1 to 24-5 and Comparative Examples 24-1 to 24-3, the values were each a relative value when the result of evaluation in Comparative Example 24-0 was defined as 100.
*In Examples 25-1 to 25-5 and Comparative Examples 25-1 to 25-3, the values were each a relative value when the result of evaluation in Comparative Example 25-0 was defined as 100.
*In Examples 26-1 to 26-5 and Comparative Examples 26-1 to 26-3, the values were each a relative value when the result of evaluation in Comparative Example 26-0 was defined as 100.

TABLE 21

| | Electrolyte solution No. | Positive electrode active material | Negative electrode active material | Discharge capacity retention rate after cycles* [%] | High-output capacity retention rate* [%] |
|---|---|---|---|---|---|
| Example 27-1 | Li (2)-0.5-LiPF2(Ox)2-1-LiPF4(Ox)-0.2-VC-0.5 | $LiNi_{0.6}Co_{0.2}Mn_{0.2}O_2$ | Graphite | 109 | 108 |
| Example 27-2 | Li (4)-0.5-LiPF2(Ox)2-1-LiPF4(Ox)-0.2-VC-0.5 | | | 111 | 113 |

TABLE 21-continued

|  | Electrolyte solution No. | Positive electrode active material | Negative electrode active material | Discharge capacity retention rate after cycles* [%] | High-output capacity retention rate* [%] |
|---|---|---|---|---|---|
| Example 27-3 | Li (6)-0.5-LiPF2(Ox)2-1-LiPF4(Ox)-0.2-VC-0.5 |  |  | 106 | 107 |
| Example 27-4 | Li (9)-0.5-LiPF2(Ox)2-1-LiPF4(Ox)-0.2-VC-0.5 |  |  | 107 | 110 |
| Example 27-5 | Li (15)-0.5-LiPF2(Ox)2-1-LiPF4(Ox)-0.2-VC-0.5 |  |  | 108 | 109 |
| Comparative Example 27-0 | (0)-LiPF2(Ox)2-1-LiPF4(Ox)-0.2-VC-0.5 |  |  | 100 | 100 |
| Comparative Example 27-1 | (0)-LiPF2(Ox)2-1-LiPF4(Ox)-0.2-VC-1 |  |  | 103 | 96 |
| Comparative Example 27-2 | Li (17)-0.5-LiPF2(Ox)2-1-LiPF4(Ox)-0.2-VC-0.5 |  |  | 103 | 100 |
| Comparative Example 27-3 | Li (18)-0.5-LiPF2(Ox)2-1-LiPF4(Ox)-0.2-VC-0.5 |  |  | 100 | 100 |
| Example 28-1 | Li (2)-0.05-LiBF4-0.2-LiBF2(Ox)-0.5-LiN(SO2F)2-2-V4Si-0.1 |  |  | 105 | 104 |
| Example 28-2 | Li (4)-0.05-LiBF4-0.2-LiBF2(Ox)-0.5-LiN(SO2F)2-2-V4Si-0.1 |  |  | 106 | 106 |
| Example 28-3 | Li (6)-0.05-LiBF4-0.2-LiBF2(Ox)-0.5-LiN(SO2F)2-2-V4Si-0.1 |  |  | 105 | 103 |
| Example 28-4 | Li (9)-0.05-LiBF4-0.2-LiBF2(Ox)-0.5-LiN(SO2F)2-2-V4Si-0.1 |  |  | 105 | 104 |
| Example 28-5 | Li (15)-0.05-LiBF4-0.2-LiBF2(Ox)-0.5-LiN(SO2F)2-2-V4Si-0.1 |  |  | 104 | 104 |
| Comparative Example 28-0 | (0)-LiBF4-0.2-LiBF2(Ox)-0.5-LiN(SO2F)2-2-V4Si-0.1 |  |  | 100 | 100 |
| Comparative Example 28-1 | (0)-LiBF4-0.2-LiBF2(Ox)-0.5-LiN(SO2F)2-2-V4Si-0.1-VC-0.05 |  |  | 100 | 100 |
| Comparative Example 28-2 | Li (17)-0.05-LiBF4-0.2-LiBF2(Ox)-0.5-LiN(SO2F)2-2-V4Si-0.1 |  |  | 100 | 100 |
| Comparative Example 28-3 | Li (18)-0.05-LiBF4-0.2-LiBF2(Ox)-0.5-LiN(SO2F)2-2-V4Si-0.1 |  |  | 100 | 100 |
| Example 29-1 | Li (2)-0.2-LiBOB-1-LiSO3F-1-LiPO2F2-0.5-BP-2 |  |  | 108 | 106 |
| Example 29-2 | Li (4)-0.2-LiBOB-1-LiSO3F-1-LiPO2F2-0.5-BP-2 |  |  | 110 | 110 |
| Example 29-3 | Li (6)-0.2-LiBOB-1-LiSO3F-1-LiPO2F2-0.5-BP-2 |  |  | 105 | 105 |
| Example 29-4 | Li (9)-0.2-LiBOB-1-LiSO3F-1-LiPO2F2-0.5-BP-2 |  |  | 105 | 107 |
| Example 29-5 | Li (15)-0.2-LiBOB-1-LiSO3F-1-LiPO2F2-0.5-BP-2 |  |  | 105 | 106 |
| Comparative Example 29-0 | (0)-LiBOB-1-LiSO3F-1-LiPO2F2-0.5-BP-2 |  |  | 100 | 100 |
| Comparative Example 29-1 | (0)-LiBOB-1-LiSO3F-1-LiPO2F2-0.5-BP-2-VC-0.2 |  |  | 101 | 96 |
| Comparative Example 29-2 | Li (17)-0.2-LiBOB-1-LiSO3F-1-LiPO2F2-0.5-BP-2 |  |  | 102 | 100 |
| Comparative Example 29-3 | Li (18)-0.2-LiBOB-1-LiSO3F-1-LiPO2F2-0.5-BP-2 |  |  | 100 | 100 |
| Example 30-1 | Li (2)-0.02-LiPF4(Ox)-1.5-LiN(SO2F)(POF2)-1-LiPO2F2-0.1-CHB-1.5 |  |  | 103 | 102 |
| Example 30-2 | Li (4)-0.02-LiPF4(Ox)-1.5-LiN(SO2F)(POF2)-1-LiPO2F2-0.1-CHB-1.5 |  |  | 104 | 106 |
| Example 30-3 | Li (6)-0.02-LiPF4(Ox)-1.5-LiN(SO2F)(POF2)-1-LiPO2F2-0.1-CHB-1.5 |  |  | 103 | 102 |
| Example 30-4 | Li (9)-0.02-LiPF4(Ox)-1.5-LiN(SO2F)(POF2)-1-LiPO2F2-0.1-CHB-1.5 |  |  | 103 | 103 |
| Example 30-5 | Li (15)-0.02-LiPF4(Ox)-1.5-LiN(SO2F)(POF2)-1-LiPO2F2-0.1-CHB-1.5 |  |  | 103 | 103 |
| Comparative Example 30-0 | (0)-LiPF4(Ox)-1.5-LiN(SO2F)(POF2)-1-LiPO2F2-0.1-CHB-1.5 |  |  | 100 | 100 |

TABLE 21-continued

|  | Electrolyte solution No. | Positive electrode active material | Negative electrode active material | Discharge capacity retention rate after cycles* [%] | High-output capacity retention rate* [%] |
|---|---|---|---|---|---|
| Comparative Example 30-1 | (0)-LiPF4(Ox)-1.5-LiN(SO2F)(POF2)-1-LiPO2F2-0.1-CHB-1.5-VC-0.02 | | | 100 | 100 |
| Comparative Example 30-2 | Li (17)-0.02-LiPF4(Ox)-1.5-LiN(SO2F)(POF2)-1-LiPO2F2-0.1-CHB-1.5 | | | 100 | 100 |
| Comparative Example 30-3 | Li (18)-0.02-LiPF4(Ox)-1.5-LiN(SO2F)(POF2)-1-LiPO2F2-0.1-CHB-1.5 | | | 100 | 100 |

*In Examples 27-1 to 27-5 and Comparative Examples 27-1 to 27-3, the values were each a relative value when the result of evaluation in Comparative Example 27-0 was defined as 100.
*In Examples 28-1 to 28-5 and Comparative Examples 28-1 to 28-3, the values were each a relative value when the result of evaluation in Comparative Example 28-0 was defined as 100.
*In Examples 29-1 to 29-5 and Comparative Examples 29-1 to 29-3, the values were each a relative value when the result of evaluation in Comparative Example 29-0 was defined as 100.
*In Examples 30-1 to 30-5 and Comparative Examples 30-1 to 30-3, the values were each a relative value when the result of evaluation in Comparative Example 30-0 was defined as 100.

TABLE 22

|  | Electrolyte solution No. | Positive electrode active material | Negative electrode active material | Discharge capacity retention rate after cycles* [%] | High-output capacity retention rate* [%] |
|---|---|---|---|---|---|
| Example 31-1 | Li (2)-0.02-LiBF2(Ox)-1-LiN(SO2F)(POF2)-1-V4Si-0.1 | $LiNi_{0.6}Co_{0.2}Mn_{0.2}O_2$ | Graphite | 104 | 103 |
| Example 31-2 | Li (4)-0.02-LiBF2(Ox)-1-LiN(SO2F)(POF2)-1-V4Si-0.1 | | | 104 | 107 |
| Example 31-3 | Li (6)-0.02-LiBF2(Ox)-1-LiN(SO2F)(POF2)-1-V4Si-0.1 | | | 103 | 102 |
| Example 31-4 | Li (9)-0.02-LiBF2(Ox)-1-LiN(SO2F)(POF2)-1-V4Si-0.1 | | | 103 | 103 |
| Example 31-5 | Li (15)-0.02-LiBF2(Ox)-1-LiN(SO2F)(POF2)-1-V4Si-0.1 | | | 104 | 104 |
| Comparative Example 31-0 | (0)-LiBF2(Ox)-1-LiN(SO2F)(POF2)-1-V4Si-0.1 | | | 100 | 100 |
| Comparative Example 31-1 | (0)-LiBF2(Ox)-1-LiN(SO2F)(POF2)-1-V4Si-0.1-VC-0.02 | | | 100 | 100 |
| Comparative Example 31-2 | Li (17)-0.02-LiBF2(Ox)-1-LiN(SO2F)(POF2)-1-V4Si-0.1 | | | 100 | 100 |
| Comparative Example 31-3 | Li (18)-0.02-LiBF2(Ox)-1-LiN(SO2F)(POF2)-1-V4Si-0.1 | | | 100 | 100 |
| Example 32-1 | Li (2)-0.02-LiN(FSO2)(POFpropynyloxy)-1-LiSO3F-0.2-LiPO2F2-0.2-TBB-1.5 | | | 104 | 104 |
| Example 32-2 | Li (4)-0.02-LiN(FSO2)(POFpropynyloxy)-1-Li SO3F-0.2-LiPO2F2-0.2-TBB-1.5 | | | 103 | 104 |
| Example 32-3 | Li (6)-0.02-LiN(FSO2)(POFpropynyloxy)-1-LiSO3F-0.2-LiPO2F2-0.2-TBB-1.5 | | | 103 | 103 |
| Example 32-4 | Li (9)-0.02-LiN(FSO2)(POFpropynyloxy)-1-LiSO3F-0.2-LiPO2F2-0.2-TBB-1.5 | | | 103 | 102 |
| Example 32-5 | Li (15)-0.02-LiN(FSO2)(POFpropynyloxy)-1-LiSO3F-0.2-LiPO2F2-0.2-TBB-1.5 | | | 103 | 102 |
| Comparative Example 32-0 | (0)-LiN(FSO2)(POFpropynyloxy)-1-LiSO3F-0.2-LiPO2F2-0.2-TBB-1.5 | | | 100 | 100 |
| Comparative Example 32-1 | (0)-LiN(FSO2)(POFpropynyloxy)-1-LiSO3F-0.2-LiP02F2-0.2-TBB-1.5-VC-0.02 | | | 100 | 100 |
| Comparative Example 32-2 | Li (17)-0.02-LiN(FSO2)(POFpropynyloxy)-1-LiSO3F-0.2-LiPO2F2-0.2-TBB-1.5 | | | 100 | 100 |
| Comparative Example 32-3 | Li (18)-0.02-LiN(FSO2)(POFpropynyloxy)-1-LiSO3F-0.2-LiPO2F2-0.2-TBB-1.5 | | | 100 | 100 |

TABLE 22-continued

|  | Electrolyte solution No. | Positive electrode active material | Negative electrode active material | Discharge capacity retention rate after cycles* [%] | High-output capacity retention rate* [%] |
|---|---|---|---|---|---|
| Example 33-1 | Li (2)-0.01-LiN(FSO2)(POFpropynyloxy)-1-LiPO2F2-0.2-DTDO-0.5-FEC-1 | | | 103 | 102 |
| Example 33-2 | Li (4)-0.01-LiN(FSO2)(POFpropynyloxy)-1-LiPO2F2-0.2-DTDO-0.5-FEC-1 | | | 104 | 103 |
| Example 33-3 | Li (6)-0.01-LiN(FSO2)(POFpropynyloxy)-1-LiPO2F2-0.2-DTDO-0.5-FEC-1 | | | 103 | 102 |
| Example 33-4 | Li (9)-0.01-LiN(FSO2)(POFpropynyloxy)-1-LiPO2F2-0.2-DTDO-0.5-FEC-1 | | | 104 | 103 |
| Example 33-5 | Li (15)-0.01-LiN(FSO2)(POFpropynyloxy)-1-LiPO2F2-0.2-DTDO-0.5-FEC-1 | | | 102 | 103 |
| Comparative Example 33-0 | (0)-LiN(FSO2)(POFpropynyloxy)-1-LiPO2F2-0.2-DTDO-0.5-FEC-1 | | | 100 | 100 |
| Comparative Example 33-1 | (0)-LiN(FSO2)(POFpropynyloxy)-1-LiPO2F2-0.2-DTDO-0.5-FEC-1-VC-0.01 | | | 100 | 100 |
| Comparative Example 33-2 | Li (17)-0.01-LiN(FSO2)(POFpropynyloxy)-1-LiPO2F2-0.2-DTDO-0.5-FEC-1 | | | 100 | 100 |
| Comparative Example 33-3 | Li (18)-0.01-LiN(FSO2)(POFpropynyloxy)-1-LiPO2F2-0.2-DTDO-0.5-FEC-1 | | | 100 | 100 |

*In Examples 31-1 to 31-5 and Comparative Examples 31-1 to 31-3, the values were each a relative value when the result of evaluation in Comparative Example 31-0 was defined as 100.
*In Examples 32-1 to 32-5 and Comparative Examples 32-1 to 32-3, the values were each a relative value when the result of evaluation in Comparative Example 32-0 was defined as 100.
*In Examples 33-1 to 33-5 and Comparative Examples 33-1 to 33-3, the values were each a relative value when the result of evaluation in Comparative Example 33-0 was defined as 100.

Incidentally, in the tables, "LiPF2(Ox)2" means $LiPF_2(C_2O_4)_2$, "LiPF4 (Ox)" means $LiPF_4(C_2O_4)$, "LiBF2(Ox)" means $LiBF_2(C_2O_4)$, "LiBOB" means $LiB(C_2O_4)_2$, "LiN (FSO2)(POFpropynyloxy)" means $LiN(FSO_2)(POF(OCH_2C\equiv CH))$, "FEC" means fluoroethylene carbonate, "PS" means 1,3-propanesultone, "DTDO" means 1,3,2-dioxathiolane 2,2-dioxide, "V4Si" means tetravinylsilane, "TBB" means t-butylbenzene, "BP" means biphenyl, and "CHB" means cyclohexylbenzene.

Examples and Comparative Examples Having Variously Modified Negative Electrode Bodies Batteries having the structures in which the electrolyte solutions and the negative electrode bodies were variously modified as shown in Tables 23 to 25 were produced and were evaluated as described above.

TABLE 23

|  | Electrolyte solution No. | Positive electrode active material | Negative electrode active material | Discharge capacity retention rate after cycles* [%] | High-output capacity retention rate* [%] |
|---|---|---|---|---|---|
| Example 34-1 | Li (1)-1 | $LiNi_{0.6}Co_{0.2}Mn_{0.2}O_2$ | $Li_4Ti_5O_{12}$ | 110 | 108 |
| Example 34-2 | Li (2)-1 | | | 112 | 115 |
| Example 34-3 | Li (9)-1 | | | 126 | 113 |
| Comparative Example 34-0 | (0) | | | 100 | 100 |
| Comparative Example 34-1 | (0)-VC-1 | | | 103 | 90 |
| Comparative Example 34-2 | Li (17)-1 | | | 107 | 100 |
| Comparative Example 34-3 | Li (18)-1 | | | 101 | 100 |
| Comparative Example 35-0 | (0)-LiPO2F2-1-[1.1] | | | 100 | 100 |
| Comparative Example 35-1 | (0)-LiPO2F2-1-VC-0.5-[1.1] | | | 103 | 94 |
| Comparative Example 35-2 | Li (17)-0.5-LiPO2F2-1-[1.1] | | | 105 | 100 |

TABLE 23-continued

|  | Electrolyte solution No. | Positive electrode active material | Negative electrode active material | Discharge capacity retention rate after cycles* [%] | High-output capacity retention rate* [%] |
|---|---|---|---|---|---|
| Comparative Example 35-3 | Li (18)-0.5-LiPO2F2-1-[1.1] |  |  | 100 | 100 |
| Example 36-1 | Li (2)-0.5-LiN(SO2F)2-3-LiPO2F2-0.5 |  |  | 115 | 110 |
| Example 36-2 | Li (4)-0.5-LiN(SO2F)2-3-LiPO2F2-0.5 |  |  | 112 | 115 |
| Comparative Example 36-0 | (0)-LiN(SO2F)2-3-LiPO2F2-0.5 |  |  | 100 | 100 |
| Comparative Example 36-1 | (0)-LiN(SO2F)2-3-LiPO2F2-0.5-VC-0.5 |  |  | 102 | 94 |
| Comparative Example 36-2 | Li (17)-0.5-LiN(SO2F)2-3-LiPO2F2-0.5 |  |  | 103 | 100 |
| Comparative Example 36-3 | Li (18)-0.5-LiN(SO2F)2-3-LiPO2F2-0.5 |  |  | 101 | 100 |

*In Examples 34-1 to 34-3 and Comparative Examples 34-1 to 34-3, the values were each a relative value when the result of evaluation in Comparative Example 34-0 was defined as 100.
*In Comparative Examples 35-1 to 35-3, the values were each a relative value when the result of evaluation in Comparative Example 35-0 was defined as 100.
*In Examples 36-1 and 36-2 and Comparative Examples 36-1 to 36-3, the values were each a relative value when the result of evaluation in Comparative Example 36-0 was defined as 100.

TABLE 24

|  | Electrolyte solution No. | Positive electrode active material | Negative electrode active material | Discharge capacity retention rate after cycles* [%] | High-output capacity retention rate* [%] |
|---|---|---|---|---|---|
| Example 37-1 | Li (4)-1 | LiNi$_{0.6}$Co$_{0.2}$Mn$_{0.2}$O$_2$ | Graphite (containing silicon) | 130 | 135 |
| Example 37-2 | Li (9)-1 |  |  | 132 | 140 |
| Example 37-3 | Li (15)-1 |  |  | 129 | 133 |
| Comparative Example 37-0 | (0) |  |  | 100 | 100 |
| Comparative Example 37-1 | (0)-VC-1 |  |  | 102 | 90 |
| Comparative Example 37-2 | Li (17)-1 |  |  | 105 | 99 |
| Comparative Example 37-3 | Li (18)-1 |  |  | 101 | 100 |
| Example 38-1 | Li (4)-0.02-LiN(SO2F)(POF2)-1 |  |  | 108 | 109 |
| Example 38-2 | Li (9)-0.02-LiN(SO2F)(POF2)-1 |  |  | 107 | 110 |
| Example 38-3 | Li (15)-0.02-LiN(SO2F)(POF2)-1 |  |  | 106 | 108 |
| Comparative Example 38-0 | (0)-LiN(SO2F)(POF2)-1 |  |  | 100 | 100 |
| Comparative Example 38-1 | (0)-LiN(SO2F)(POF2)-1-VC-0.02 |  |  | 100 | 99 |
| Comparative Example 38-2 | Li (17)-0.02-LiN(SO2F)(POF2)-1 |  |  | 100 | 100 |
| Comparative Example 38-3 | Li (18)-0.02-LiN(SO2F)(POF2)-1 |  |  | 100 | 100 |
| Example 39-1 | Li (2)-0.5-LiN(SO2F)2-3-LiPO2F2-0.5 |  |  | 118 | 121 |
| Example 39-2 | Li (9)-0.5-LiN(SO2F)2-3-LiPO2F2-0.5 |  |  | 118 | 119 |
| Example 39-3 | Li (15)-0.5-LiN(SO2F)2-3-LiPO2F2-0.5 |  |  | 119 | 117 |
| Comparative Example 39-0 | (0)-LiN(SO2F)2-3-LiPO2F2-0.5 |  |  | 100 | 100 |
| Comparative Example 39-1 | (0)-LiN(SO2F)2-3-LiPO2F2-0.5-VC-0.5 |  |  | 102 | 92 |
| Comparative Example 39-2 | Li (17)-0.5-LiN(SO2F)2-3-LiPO2F2-0.5 |  |  | 104 | 100 |
| Comparative Example 39-3 | Li (18)-0.5-LiN(SO2F)2-3-LiPO2F2-0.5 |  |  | 100 | 100 |
| Example 40-1 | Li (4)-0.02-LiBF2(Ox)-1-LiN(SO2F)(POF2)-1-V4Si-0.1 |  |  | 105 | 108 |
| Example 40-2 | Li (6)-0.02-LiBF2(Ox)-1-LiN(SO2F)(POF2)-1-V4Si-0.1 |  |  | 105 | 107 |
| Example 40-3 | Li (9)-0.02-LiBF2(Ox)-1-LiN(SO2F)(POF2)-1-V4Si-0.1 |  |  | 106 | 107 |

TABLE 24-continued

|  | Electrolyte solution No. | Positive electrode active material | Negative electrode active material | Discharge capacity retention rate after cycles* [%] | High-output capacity retention rate* [%] |
|---|---|---|---|---|---|
| Comparative Example 40-0 | (0)-LiBF2(Ox)-1-LiN(SO2F)(POF2)-1-V4Si-0.1 |  |  | 100 | 100 |
| Comparative Example 40-1 | (0)-LiBF2(Ox)-1-LiN(SO2F)(POF2)-1-V4Si-0.1-VC-0.02 |  |  | 100 | 100 |
| Comparative Example 40-2 | Li (17)-0.02-LiBF2(Ox)-1-LiN(SO2F)(POF2)-1-V4Si-0.1 |  |  | 100 | 100 |
| Comparative Example 40-3 | Li (18)-0.02-LiBF2(Ox)-1-LiN(SO2F)(POF2)-1-V4Si-0.1 |  |  | 100 | 100 |

*In Examples 37-1 to 37-3 and Comparative Examples 37-1 to 37-3, the values were each a relative value when the result of evaluation in Comparative Example 37-0 was defined as 100.
*In Examples 38-1 to 38-3 and Comparative Examples 38-1 to 38-3, the values were each a relative value when the result of evaluation in Comparative Example 38-0 was defined as 100.
*In Examples 39-1 to 39-3 and Comparative Examples 39-1 to 39-3, the values were each a relative value when the result of evaluation in Comparative Example 39-0 was defined as 100.
*In Examples 40-1 to 40-3 and Comparative Examples 40-1 to 40-3, the values were each a relative value when the result of evaluation in Comparative Example 40-0 was defined as 100.

TABLE 25

|  | Electrolyte solution No. | Positive electrode active material | Negative electrode active material | Discharge capacity retention rate after cycles* [%] | High-output capacity retention rate* [%] |
|---|---|---|---|---|---|
| Example 41-1 | Li (4)-1 | $LiNi_{0.6}Co_{0.2}Mn_{0.2}O_2$ | Hard carbon | 115 | 120 |
| Example 41-2 | Li (9)-1 |  |  | 117 | 112 |
| Example 41-3 | Li (15)-1 |  |  | 119 | 111 |
| Comparative Example 41-0 | (0) |  |  | 100 | 100 |
| Comparative Example 41-1 | (0)-VC-1 |  |  | 104 | 94 |
| Comparative Example 41-2 | Li (17)-1 |  |  | 103 | 100 |
| Comparative Example 41-3 | Li (18)-1 |  |  | 100 | 100 |
| Example 42-1 | Li (2)-0.02-LiPF4(Ox)-1.5-LiN(SO2F)(POF2)-1-LiPO2F2-0.1-CHB-1.5 |  |  | 104 | 104 |
| Example 42-2 | Li (4)-0.02-LiPF4(Ox)-1.5-LiN(SO2F)(POF2)-1-LiPO2F2-0.1-CHB-1.5 |  |  | 104 | 106 |
| Example 42-3 | Li (15)-0.02-LiPF4(Ox)-1.5-LiN(SO2F)(POF2)-1-LiPO2F2-0.1-CHB-1.5 |  |  | 103 | 104 |
| Comparative Example 42-0 | (0)-LiPF4(Ox)-1.5-LiN(SO2F)(POF2)-1-LiPO2F2-0.1-CHB-1.5 |  |  | 100 | 100 |
| Comparative Example 42-1 | (0)-LiPF4(Ox)-1.5-LiN(SO2F)(POF2)-1-LiPO2F2-0.1-CHB-1.5-VC-0.02 |  |  | 100 | 100 |
| Comparative Example 42-2 | Li (17)-0.02-LiPF4(Ox)-1.5-LiN(SO2F)(POF2)-1-LiPO2F2-0.1-CHB-1.5 |  |  | 100 | 100 |
| Comparative Example 42-3 | Li (18)-0.02-LiPF4(Ox)-1.5-LiN(SO2F)(POF2)-1-LiPO2F2-0.1-CHB-1.5 |  |  | 100 | 100 |

*In Examples 41-1 to 41-3 and Comparative Examples 41-1 to 41-3, the values were each a relative value when the result of evaluation in Comparative Example 41-0 was defined as 100.
*In Examples 42-1 to 42-3 and Comparative Examples 42-1 to 42-3, the values were each a relative value when the result of evaluation in Comparative Example 42-0 was defined as 100.

Incidentally, a negative electrode body whose negative electrode active material is $Li_4Ti_5O_{12}$ was produced by mixing a $Li_4Ti_5O_{12}$ powder (90 mass %) with PVDF (5 mass %) as a binder and acetylene black (5 mass %) as a conductive agent, further adding NMP to the resultant mixture, applying the resultant paste onto copper foil, and drying it. In the evaluation of the battery, the charge termination voltage was 2.7 V, and the discharge termination voltage was 1.5 V.

A negative electrode body whose negative electrode active material is graphite (containing silicon) was produced by mixing a graphite powder (80 mass %) with a silicon powder (10 mass %) and PVDF (10 mass %) as a binder, further adding NMP to the resultant mixture, applying the resultant paste onto copper foil, and drying it. In the evaluation of the battery, the charge termination voltage and the discharge termination voltage were the same as those in Example 1-1.

A negative electrode body whose negative electrode active material is hard carbon was produced by mixing hard carbon (90 mass %) with PVDF (5 mass %) as a binder and acetylene black (5 mass %) as a conductive agent, further adding NMP to the resultant mixture, applying the resultant paste onto copper foil, and drying it. In the evaluation of the battery, the charge termination voltage was 4.2 V, and the discharge termination voltage was 2.2 V.

It was confirmed that also for each of the electrode compositions using $Li_4Ti_5O_{12}$, graphite (containing silicon), and hard carbon as the negative electrode active material as described above, the high-temperature cycle properties and the low-temperature output properties can be exhibited in a well-balanced manner by using an electrolyte solution containing the ionic compound of the present invention.

Accordingly, the non-aqueous electrolyte solution battery that can exhibit the high-temperature cycle properties and the low-temperature output properties in a well-balanced manner was obtained regardless of the type of the negative electrode active material, by using the electrolyte solution having the composition containing the ionic compound having the specific structure of the present invention.

Examples and Comparative Examples Having Variously Modified Positive Electrode Bodies Batteries having the structures in which the electrolyte solution and the positive electrode body were variously modified as shown in Tables 26 to 29 were produced and were evaluated as described above.

TABLE 26

|  | Electrolyte solution No. | Positive electrode active material | Negative electrode active material | Discharge capacity retention rate after cycles* [%] | High-output capacity retention rate* [%] |
| --- | --- | --- | --- | --- | --- |
| Example 43-1 | Li (1)-1 | LiCoO$_2$ | Graphite | 111 | 112 |
| Example 43-2 | Li (2)-1 |  |  | 110 | 118 |
| Example 43-3 | Li (9)-1 |  |  | 122 | 118 |
| Comparative Example 43-0 | (0) |  |  | 100 | 100 |
| Comparative Example 43-1 | (0)-VC-1 |  |  | 107 | 92 |
| Comparative Example 43-2 | Li (17)-1 |  |  | 107 | 100 |
| Comparative Example 43-3 | Li (18)-1 |  |  | 101 | 100 |
| Example 44-1 | Li (4)-0.5-VC-1 |  |  | 107 | 112 |
| Example 44-2 | Li (9)-0.5-VC-1 |  |  | 110 | 113 |
| Example 44-3 | Li (15)-0.5-VC-1 |  |  | 108 | 109 |
| Comparative Example 44-0 | (0)-VC-1 |  |  | 100 | 100 |
| Comparative Example 44-1 | (0)-VC-1.5 |  |  | 104 | 95 |
| Comparative Example 44-2 | Li (17)-0.5-VC-1 |  |  | 104 | 100 |
| Comparative Example 44-3 | Li (18)-0.5-VC-1 |  |  | 100 | 100 |

*In Examples 43-1 to 43-3 and Comparative Examples 43-1 to 43-3, the values were each a relative value when the result of evaluation in Comparative Example 43-0 was defined as 100.
*In Examples 44-1 to 44-3 and Comparative Examples 44-1 to 44-3, the values were each a relative value when the result of evaluation in Comparative Example 44-0 was defined as 100.

TABLE 27

|  | Electrolyte solution No. | Positive electrode active material | Negative electrode active material | Discharge capacity retention rate after cycles* [%] | High-output capacity retention rate* [%] |
| --- | --- | --- | --- | --- | --- |
| Example 45-1 | Li (2)-1 | LiNi$_{0.8}$Co$_{0.15}$Al$_{0.05}$O$_2$ | Graphite | 112 | 115 |
| Example 45-2 | Li (4)-1 |  |  | 119 | 119 |
| Example 45-3 | Li (9)-1 |  |  | 124 | 116 |
| Comparative Example 45-0 | (0) |  |  | 100 | 100 |
| Comparative Example 45-1 | (0)-VC-1 |  |  | 107 | 94 |
| Comparative Example 45-2 | Li (17)-1 |  |  | 107 | 99 |
| Comparative Example 45-3 | Li (18)-1 |  |  | 101 | 100 |
| Example 46-1 | Li (2)-0.02-LiPF4(Ox)-1.5-LiN(SO2F)(POF2)-1-LiPO2F2-0.1-CHB-1.5 |  |  | 104 | 103 |

TABLE 27-continued

| | Electrolyte solution No. | Positive electrode active material | Negative electrode active material | Discharge capacity retention rate after cycles* [%] | High-output capacity retention rate* [%] |
|---|---|---|---|---|---|
| Example 46-2 | Li (4)-0.02-LiPF4(Ox)-1.5-LiN(SO2F)(POF2)-1-LiPO2F2-0.1-CHB-1.5 | | | 105 | 106 |
| Example 46-3 | Li (6)-0.02-LiPF4(Ox)-1.5-LiN(SO2F)(POF2)-1-LiPO2F2-0.1-CHB-1.5 | | | 102 | 103 |
| Example 46-4 | Li (9)-0.02-LiPF4(Ox)-1.5-LiN(SO2F)(POF2)-1-LiPO2F2-0.1-CHB-1.5 | | | 103 | 104 |
| Example 46-5 | Li (15)-0.02-LiPF4(Ox)-1.5-LiN(SO2F)(POF2)-1-LiPO2F2-0.1-CHB-1.5 | | | 103 | 105 |
| Comparative Example 46-0 | (0)-LiPF4(Ox)-1.5-LiN(SO2F)(POF2)-1-LiPO2F2-0.1-CHB-1.5 | | | 100 | 100 |
| Comparative Example 46-1 | (0)-LiPF4(Ox)-1.5-LiN(SO2F)(POF2)-1-LiPO2F2-0.1-CHB-1.5-VC-0.02 | | | 100 | 100 |
| Comparative Example 46-2 | Li (17)-0.02-LiPF4(Ox)-1.5-LiN(SO2F)(POF2)-1-LiPO2F2-0.1-CHB-1.5 | | | 100 | 100 |
| Comparative Example 46-3 | Li (18)-0.02-LiPF4(Ox)-1.5-LiN(SO2F)(POF2)-1-LiPO2F2-0.1-CHB-1.5 | | | 100 | 100 |
| Example 47-1 | Li (2)-0.02-LiBF2(Ox)-1-LiN(SO2F)(POF2)-1-V4Si-0.1 | | | 104 | 104 |
| Example 47-2 | Li (4)-0.02-LiBF2(Ox)-1-LiN(SO2F)(POF2)-1-V4Si-0.1 | | | 105 | 107 |
| Example 47-3 | Li (6)-0.02-LiBF2(Ox)-1-LiN(SO2F)(POF2)-1-V4Si-0.1 | | | 102 | 103 |
| Example 47-4 | Li (9)-0.02-LiBF2(Ox)-1-LiN(SO2F)(POF2)-1-V4Si-0.1 | | | 103 | 105 |
| Example 47-5 | Li (15)-0.02-LiBF2(Ox)-1-LiN(SO2F)(POF2)-1-V4Si-0.1 | | | 104 | 104 |
| Comparative Example 47-0 | (0)-LiBF2(Ox)-1-LiN(SO2F)(POF2)-1-V4Si-0.1 | | | 100 | 100 |
| Comparative Example 47-1 | (0)-LiBF2(Ox)-1-LiN(SO2F)(POF2)-1-V4Si-0.1-VC-0.02 | | | 100 | 100 |
| Comparative Example 47-2 | Li (17)-0.02-LiBF2(Ox)-1-LiN(SO2F)(POF2)-1-V4Si-0.1 | | | 100 | 100 |
| Comparative Example 47-3 | Li (18)-0.02-LiBF2(Ox)-1-LiN(SO2F)(POF2)-1-V4Si-0.1 | | | 100 | 100 |

*In Examples 45-1 to 45-3 and Comparative Examples 45-1 to 45-3, the values were each a relative value when the result of evaluation in Comparative Example 45-0 was defined as 100.
*In Examples 46-1 to 46-5 and Comparative Examples 46-1 to 46-3, the values were each a relative value when the result of evaluation in Comparative Example 46-0 was defined as 100.
*In Examples 47-1 to 47-5 and Comparative Examples 47-1 to 47-3, the values were each a relative value when the result of evaluation in Comparative Example 47-0 was defined as 100.

TABLE 28

| | Electrolyte solution No. | Positive electrode active material | Negative electrode active material | Discharge capacity retention rate after cycles* [%] | High-output capacity retention rate* [%] |
|---|---|---|---|---|---|
| Example 48-1 | Li (2)-1 | LiMn$_2$O$_4$ | Graphite | 111 | 114 |
| Example 48-2 | Li (4)-1 | | | 119 | 121 |
| Example 48-3 | Li (9)-1 | | | 124 | 116 |
| Comparative Example 48-0 | (0) | | | 100 | 100 |
| Comparative Example 48-1 | (0)-VC-1 | | | 106 | 91 |
| Comparative Example 48-2 | Li (17)-1 | | | 107 | 99 |
| Comparative Example 48-3 | Li (18)-1 | | | 100 | 100 |

TABLE 28-continued

|  | Electrolyte solution No. | Positive electrode active material | Negative electrode active material | Discharge capacity retention rate after cycles* [%] | High-output capacity retention rate* [%] |
|---|---|---|---|---|---|
| Example 49-1 | Li (2)-0.2-LiBOB-1-LiPO2F2-0.5 |  |  | 110 | 109 |
| Example 49-2 | Li (4)-0.2-LiBOB-1-LiPO2F2-0.5 |  |  | 111 | 113 |
| Example 49-3 | Li (9)-0.2-LiBOB-1-LiPO2F2-0.5 |  |  | 111 | 110 |
| Comparative Example 49-0 | (0)-LiBOB-1-LiPO2F2-0.5 |  |  | 100 | 100 |
| Comparative Example 49-1 | (0)-LiBOB-1-LiPO2F2-0.5-VC-0.2 |  |  | 103 | 96 |
| Comparative Example 49-2 | Li (17)-0.2-LiBOB-1-LiPO2F2-0.5 |  |  | 103 | 100 |
| Comparative Example 49-3 | Li (18)-0.2-LiBOB-1-LiPO2F2-0.5 |  |  | 100 | 100 |
| Example 50-1 | Li (2)-0.02-LiPF4(Ox)-1.5-LiN(SO2F)(POF2)-1-LiPO2F2-0.1-CHB-1.5 |  |  | 103 | 102 |
| Example 50-2 | Li (4)-0.02-LiPF4(Ox)-1.5-LiN(SO2F)(POF2)-1-LiPO2F2-0.1-CHB-1.5 |  |  | 105 | 105 |
| Example 50-3 | Li (15)-0.02-LiPF4(Ox)-1.5-LiN(SO2F)(POF2)-1-LiPO2F2-0.1-CHB-1.5 |  |  | 103 | 102 |
| Comparative Example 50-0 | (0)-LiPF4(Ox)-1.5-LiN(SO2F)(POF2)-1-LiPO2F2-0.1-CHB-1.5 |  |  | 100 | 100 |
| Comparative Example 50-1 | (0)-LiPF4(Ox)-1.5-LiN(SO2F)(POF2)-1-LiPO2F2-0.1-CHB-1.5-VC-0.02 |  |  | 100 | 100 |
| Comparative Example 50-2 | Li (17)-0.02-LiPF4(Ox)-1.5-LiN(SO2F)(POF2)-1-LiPO2F2-0.1-CHB-1.5 |  |  | 100 | 100 |
| Comparative Example 50-3 | Li (18)-0.02-LiPF4(Ox)-1.5-LiN(SO2F)(POF2)-1-LiPO2F2-0.1-CHB-1.5 |  |  | 100 | 100 |

*In Examples 48-1 to 48-3 and Comparative Examples 48-1 to 48-3, the values were each a relative value when the result of evaluation in Comparative Example 48-0 was defined as 100.
*In Examples 49-1 to 49-3 and Comparative Examples 49-1 to 49-3, the values were each a relative value when the result of evaluation in Comparative Example 49-0 was defined as 100.
*In Examples 50-1 to 50-3 and Comparative Examples 50-1 to 50-3, the values were each a relative value when the result of evaluation in Comparative Example 50-0 was defined as 100.

TABLE 29

|  | Electrolyte solution No. | Positive electrode active material | Negative electrode active material | Discharge capacity retention rate after cycles* [%] | High-output capacity retention rate* [%] |
|---|---|---|---|---|---|
| Example 51-1 | Li (2)-1 | LiFePO$_4$ | Graphite | 112 | 112 |
| Example 51-2 | Li (4)-1 |  |  | 117 | 126 |
| Example 51-3 | Li (9)-1 |  |  | 122 | 118 |
| Comparative Example 51-0 | (0) |  |  | 100 | 100 |
| Comparative Example 51-1 | (0)-VC-1 |  |  | 107 | 92 |
| Comparative Example 51-2 | Li (17)-1 |  |  | 107 | 99 |
| Comparative Example 51-3 | Li (18)-1 |  |  | 101 | 100 |
| Example 52-1 | Li (4)-0.02-LiBF2(Ox)-1-LiN(SO2F)(POF2)-1-V4Si-0.1 |  |  | 105 | 106 |
| Example 52-2 | Li (9)-0.02-LiBF2(Ox)-1-LiN(SO2F)(POF2)-1-V4Si-0.1 |  |  | 104 | 103 |
| Example 52-3 | Li (15)-0.02-LiBF2(Ox)-1-LiN(SO2F)(POF2)-1-V4Si-0.1 |  |  | 104 | 103 |

TABLE 29-continued

|  | Electrolyte solution No. | Positive electrode active material | Negative electrode active material | Discharge capacity retention rate after cycles* [%] | High-output capacity retention rate* [%] |
|---|---|---|---|---|---|
| Comparative Example 52-0 | (0)-LiBF2(Ox)-1-LiN(SO2F)(POF2)-1-V4Si-0.1 |  |  | 100 | 100 |
| Comparative Example 52-1 | (0)-LiBF2(Ox)-1-LiN(SO2F)(POF2)-1-V4Si-0.1-VC-0.02 |  |  | 100 | 100 |
| Comparative Example 52-2 | Li (17)-0.02-LiBF2(Ox)-1-LiN(SO2F)(POF2)-1-V4Si-0.1 |  |  | 100 | 100 |
| Comparative Example 52-3 | Li (18)-0.02-LiBF2(Ox)-1-LiN(SO2F)(POF2)-1-V4Si-0.1 |  |  | 100 | 100 |

*In Examples 51-1 to 51-3 and Comparative Examples 51-1 to 51-3, the values were each a relative value when the result of evaluation in Comparative Example 51-0 was defined as 100.
*In Examples 52-1 to 52-3 and Comparative Examples 52-1 to 52-3, the values were each a relative value when the result of evaluation in Comparative Example 52-0 was defined as 100.

Incidentally, a positive electrode body whose positive electrode active material is $LiCoO_2$ was produced by mixing a $LiCoO_2$ powder (90 mass %) with PVDF (5 mass %) as a binder and acetylene black (5 mass %) as a conductive material, further adding NMP to the resultant mixture, applying the resultant paste onto aluminum foil, and drying it. In the evaluation of the battery, the charge termination voltage was 4.2 V, and the discharge termination voltage was 3.0 V.

A positive electrode body whose positive electrode active material is $LiNi_{0.8}Co_{0.15}Al_{0.05}O_2$ was produced by mixing a $LiNi_{0.8}Co_{0.15}Al_{0.05}O_2$ powder (90 mass %) with PVDF (5 mass %) as a binder and acetylene black (5 mass %) as a conductive material, further adding NMP to the resultant mixture, applying the resultant paste onto aluminum foil, and drying it. In the evaluation of the battery, the charge termination voltage was 4.2 V, and the discharge termination voltage was 3.0 V.

A positive electrode body whose positive electrode active material is $LiMn_2O_4$ was produced by mixing a $LiMn_2O_4$ powder (90 mass %) with PVDF (5 mass %) as a binder and acetylene black (5 mass %) as a conductive material, further adding NMP to the resultant mixture, applying the resultant paste onto aluminum foil, and drying it. In the evaluation of the battery, the charge termination voltage was 4.2 V, and the discharge termination voltage was 3.0 V.

A positive electrode body whose positive electrode active material is $LiFePO_4$ was produced by mixing a $LiFePO_4$ powder coated with amorphous carbon (90 mass %) with PVDF (5 mass %) as a binder and acetylene black (5 mass %) as a conductive material, further adding NMP to the resultant mixture, applying the resultant paste onto aluminum foil, and drying it. In the evaluation of the battery, the charge termination voltage was 4.1 V, and the discharge termination voltage was 2.5 V.

Also for each of the electrode compositions using $LiCoO_2$, $LiNi_{0.8}Co_{0.15}Al_{0.05}O_2$, $LiMn_2O_4$, and $LiFePO_4$ as the positive electrode active material as described above, it was confirmed that the high-temperature cycle properties and the low-temperature output properties can be exhibited in a well-balanced manner by using the electrolyte solution containing the ionic compound of the present invention.

Accordingly, the non-aqueous electrolyte solution battery that can exhibit high-temperature cycle properties and low-temperature output properties in a well-balanced manner was obtained regardless of the type of the positive electrode active material by using the electrolyte solution having the composition containing the ionic compound having the specific structure of the present invention.

Sodium Ion Battery

Example 53-1

Preparation of Electrolyte Solution

Non-aqueous electrolyte solution No. Na(2)-0.5 [Na] was prepared by using a mixed solvent of propylene carbonate, ethylene carbonate and diethyl carbonate at a volume ratio of 2:1:7 as a non-aqueous solvent and dissolving $NaPF_6$ as a solute and a Na salt of Anion (2) as the ionic compound in the solvent such that the concentration of $NaPF_6$ was 1.0 mol/L and that the concentration of the Na salt (the content of Cl in the ionic compound as a raw material before being dissolved in the electrolyte solution was 20 mass ppm, and the content of hydrofluoric acid was 110 mass ppm) was 0.5 mass % based on the total amount of the non-aqueous solvent, the solute, and the ionic compound. The above preparation was performed while maintaining the solution temperature at 25° C. The conditions for preparing the non-aqueous electrolyte solution are shown in Table 30.

Production of Battery

A battery was produced as in Example 1-1 except that the above electrolyte solution was used, the positive electrode material was $NaNi_{0.60}Co_{0.05}Mn_{0.35}O_2$, and the negative electrode material was hard carbon, and the resultant battery was evaluated as in Example 1-1. Incidentally, the positive electrode body whose positive electrode active material is $NaNi_{0.60}Co_{0.05}Mn_{0.35}O_2$ was produced by mixing a $NaNi_{0.60}Co_{0.05}Mn_{0.35}O_2$ powder (90 mass %) with PVDF (5 mass %) as a binder and acetylene black (5 mass %) as a conductive material, further adding NMP to the resultant mixture, applying the resultant paste onto aluminum foil, and drying it. In the evaluation of the battery, the charge termination voltage was 3.9 V, and the discharge termination voltage was 1.5 V.

The results of the evaluation of the batteries as prepared are shown in Table 31. Incidentally, the values of the discharge capacity retention rates after cycles and the high-output capacity retention rates of the batteries shown in Table 31 are relative values when the discharge capacity retention rate after cycles and the high-output capacity retention rate of a laminated battery produced using the electrolyte solution No. (0) [Na] described below were each defined as 100.

TABLE 30

| Electrolyte solution No. | Ionic compound | | | Solute | | Other solute and additive | |
|---|---|---|---|---|---|---|---|
| | Type of anion | Counter cation | Conc. [mass %] | Type | Conc. [mol/L] | Type | Conc. [mass %] |
| Na (2)-0.5 [Na] | (2) | Na+ | 0.5 | NaPF$_6$ | 1 | — | — |
| Na (4)-0.5 [Na] | (4) | Na+ | 0.5 | NaPF$_6$ | 1 | — | — |
| Na (6)-0.5 [Na] | (6) | Na+ | 0.5 | NaPF$_6$ | 1 | — | — |
| Na (9)-0.5 [Na] | (9) | Na+ | 0.5 | NaPF$_6$ | 1 | — | — |
| Na (15)-0.5 [Na] | (15) | Na+ | 0.5 | NaPF$_6$ | 1 | — | — |
| (0) [Na] | — | — | — | NaPF$_6$ | 1 | — | — |
| (0)-VC-0.5 [Na] | — | — | — | NaPF$_6$ | 1 | VC | 0.5 |
| Na (17)-0.5 [Na] | (17) | Na+ | 0.5 | NaPF$_6$ | 1 | — | — |
| Na (18)-0.5 [Na] | (18) | Na+ | 0.5 | NaPF$_6$ | 1 | — | — |
| Na (2)-0.5-FEC-1 [Na] | (2) | Na+ | 0.5 | NaPF$_6$ | 1 | FEC | 1 |
| Na (4)-0.5-FEC-1 [Na] | (4) | Na+ | 0.5 | NaPF$_6$ | 1 | FEC | 1 |
| Na (6)-0.5-FEC-1 [Na] | (6) | Na+ | 0.5 | NaPF$_6$ | 1 | FEC | 1 |
| Na (9)-0.5-FEC-1 [Na] | (9) | Na+ | 0.5 | NaPF$_6$ | 1 | FEC | 1 |
| Na (15)-0.5-FEC-1 [Na] | (15) | Na+ | 0.5 | NaPF$_6$ | 1 | FEC | 1 |
| (0)-FEC-1 [Na] | — | — | — | NaPF$_6$ | 1 | FEC | 1 |
| (0)-FEC-1-VC-0.5 [Na] | — | — | — | NaPF$_6$ | 1 | FEC, VC | 1, 0.5 |
| Na (17)-0.5-FEC-1 [Na] | (17) | Na+ | 0.5 | NaPF$_6$ | 1 | FEC | 1 |
| Na (18)-0.5-FEC-1 [Na] | (18) | Na+ | 0.5 | NaPF$_6$ | 1 | FEC | 1 |
| Na (2)-0.5-NaPF4(Ox)-2 [Na] | (2) | Na+ | 0.5 | NaPF$_6$ | 1 | NaPF$_4$(C$_2$O$_4$) | 2 |
| Na (4)-0.5-NaPF4(Ox)-2 [Na] | (4) | Na+ | 0.5 | NaPF$_6$ | 1 | NaPF$_4$(C$_2$O$_4$) | 2 |
| Na (6)-0.5-NaPF4(Ox)-2 [Na] | (6) | Na+ | 0.5 | NaPF$_6$ | 1 | NaPF$_4$(C$_2$O$_4$) | 2 |
| Na (9)-0.5-NaPF4(Ox)-2 [Na] | (9) | Na+ | 0.5 | NaPF$_6$ | 1 | NaPF$_4$(C$_2$O$_4$) | 2 |
| Na (15)-0.5-NaPF4(Ox)-2 [Na] | (15) | Na+ | 0.5 | NaPF$_6$ | 1 | NaPF$_4$(C$_2$O$_4$) | 2 |
| (0)-NaPF4(Ox)-2 [Na] | — | — | — | NaPF$_6$ | 1 | NaPF$_4$(C$_2$O$_4$) | 2 |
| (0)-NaPF4(Ox)-2-VC-0.5 [Na] | — | — | — | NaPF$_6$ | 1 | NaPF$_4$(C$_2$O$_4$), VC | 2, 0.5 |
| Na (17)-0.5-NaPF4(Ox)-2 [Na] | (17) | Na+ | 0.5 | NaPF$_6$ | 1 | NaPF$_4$(C$_2$O$_4$) | 2 |
| Na (18)-0.5-NaPF4(Ox)-2 [Na] | (18) | Na+ | 0.5 | NaPF$_6$ | 1 | NaPF$_4$(C$_2$O$_4$) | 2 |
| Na (2)-0.3-NaN(SO2F)2-1 [Na] | (2) | Na+ | 0.3 | NaPF$_6$ | 1 | NaN(SO$_2$F)$_2$ | 1 |
| Na (4)-0.3-NaN(SO2F)2-1 [Na] | (4) | Na+ | 0.3 | NaPF$_6$ | 1 | NaN(SO$_2$F)$_2$ | 1 |
| Na (6)-0.3-NaN(SO2F)2-1 [Na] | (6) | Na+ | 0.3 | NaPF$_6$ | 1 | NaN(SO$_2$F)$_2$ | 1 |
| Na (9)-0.3-NaN(SO2F)2-1 [Na] | (9) | Na+ | 0.3 | NaPF$_6$ | 1 | NaN(SO$_2$F)$_2$ | 1 |
| Na (15)-0.3-NaN(SO2F)2-1 [Na] | (15) | Na+ | 0.3 | NaPF$_6$ | 1 | NaN(SO$_2$F)$_2$ | 1 |
| (0)-NaN(SO2F)2-1 [Na] | — | — | — | NaPF$_6$ | 1 | NaN(SO$_2$F)$_2$ | 1 |
| (0)-NaN(SO2F)2-1-VC-0.3 [Na] | — | — | — | NaPF$_6$ | 1 | NaN(SO$_2$F)$_2$, VC | 1, 0.3 |
| Na (17)-0.3-NaN(SO2F)2-1 [Na] | (17) | Na+ | 0.3 | NaPF$_6$ | 1 | NaN(SO$_2$F)$_2$ | 1 |
| Na (18)-0.3-NaN(SO2F)2-1 [Na] | (18) | Na+ | 0.3 | NaPF$_6$ | 1 | NaN(SO$_2$F)$_2$ | 1 |
| Na (2)-0.1-NaN(SO2F)(POF2)-1 [Na] | (2) | Na+ | 0.1 | NaPF$_6$ | 1 | NaN(SO$_2$F)(POF$_2$) | 1 |
| Na (4)-0.1-NaN(SO2F)(POF2)-1 [Na] | (4) | Na+ | 0.1 | NaPF$_6$ | 1 | NaN(SO$_2$F)(POF$_2$) | 1 |
| Na (6)-0.1-NaN(SO2F)(POF2)-1 [Na] | (6) | Na+ | 0.1 | NaPF$_6$ | 1 | NaN(SO$_2$F)(POF$_2$) | 1 |
| Na (9)-0.1-NaN(SO2F)(POF2)-1 [Na] | (9) | Na+ | 0.1 | NaPF$_6$ | 1 | NaN(SO$_2$F)(POF$_2$) | 1 |
| Na (15)-0.1-NaN(SO2F)(POF2)-1 [Na] | (15) | Na+ | 0.1 | NaPF$_6$ | 1 | NaN(SO$_2$F)(POF$_2$) | 1 |
| (0)-NaN(SO2F)(POF2)-1 [Na] | — | — | — | NaPF$_6$ | 1 | NaN(SO$_2$F)(POF$_2$) | 1 |
| (0)-NaN(SO2F)(POF2)-1-VC-0.1 [Na] | — | — | — | NaPF$_6$ | 1 | NaN(SO$_2$F)(POF$_2$), VC | 1, 0.1 |
| Na (17)-0.1-NaN(SO2F)(POF2)-1 [Na] | (17) | Na+ | 0.1 | NaPF$_6$ | 1 | NaN(SO$_2$F)(POF$_2$) | 1 |
| Na (18)-0.1-NaN(SO2F)(POF2)-1 [Na] | (18) | Na+ | 0.1 | NaPF$_6$ | 1 | NaN(SO$_2$F)(POF$_2$) | 1 |
| Na (2)-0.5-NaN(SO2F)(COF)-1-FEC-1 [Na] | (2) | Na+ | 0.5 | NaPF$_6$ | 1 | NaN(SO$_2$F)(COF), FEC | 1, 1 |

TABLE 30-continued

| Electrolyte solution No. | Ionic compound | | | Solute | | Other solute and additive | |
|---|---|---|---|---|---|---|---|
| | Type of anion | Counter cation | Conc. [mass %] | Type | Conc. [mol/L] | Type | Conc. [mass %] |
| Na (4)-0.5-NaN(SO2F)(COF)-1-FEC-1 [Na] | (4) | Na+ | 0.5 | NaPF$_6$ | 1 | NaN(SO$_2$F)(COF), FEC | 1, 1 |
| Na (6)-0.5-NaN(SO2F)(COF)-1-FEC-1 [Na] | (6) | Na+ | 0.5 | NaPF$_6$ | 1 | NaN(SO$_2$F)(COF), FEC | 1, 1 |
| Na (9)-0.5-NaN(SO2F)(COF)-1-FEC-1 [Na] | (9) | Na+ | 0.5 | NaPF$_6$ | 1 | NaN(SO$_2$F)(COF), FEC | 1, 1 |
| Na (15)-0.5-NaN(SO2F)(COF)-1-FEC-1 [Na] | (15) | Na+ | 0.5 | NaPF$_6$ | 1 | NaN(SO$_2$F)(COF), FEC | 1, 1 |
| (0)-NaN(SO2F)(COF)-1-FEC-1 [Na] | — | — | — | NaPF$_6$ | 1 | NaN(SO$_2$F)(COF), FEC | 1, 1 |
| (0)-NaN(SO2F)(COF)-1-FEC-1-VC-0.5 [Na] | — | — | — | NaPF$_6$ | 1 | NaN(SO$_2$F)(COF), FEC, VC | 1, 1, 0.5 |
| Na (17)-0.5-NaN(SO2F)(COF)-1-FEC-1 [Na] | (17) | Na+ | 0.5 | NaPF$_6$ | 1 | NaN(SO$_2$F)(COF), FEC | 1, 1 |
| Na (18)-0.5-NaN(SO2F)(COF)-1-FEC-1 [Na] | (18) | Na+ | 0.5 | NaPF$_6$ | 1 | NaN(SO$_2$F)(COF), FEC | 1, 1 |

TABLE 31

| | Electrolyte solution No. | Positive electrode active material | Negative electrode active material | Discharge capacity retention rate after cycles* [%] | High-output capacity retention rate* [%] |
|---|---|---|---|---|---|
| Example 53-1 | Na (2)-0.5 [Na] | NaNi$_{0.60}$Co$_{0.05}$Mn$_{0.35}$O$_2$ | Hard carbon | 116 | 117 |
| Example 53-2 | Na (4)-0.5 [Na] | | | 127 | 135 |
| Example 53-3 | Na (6)-0.5 [Na] | | | 122 | 113 |
| Example 53-4 | Na (9)-0.5 [Na] | | | 117 | 120 |
| Example 53-5 | Na (15)-0.5 [Na] | | | 120 | 121 |
| Comparative Example 53-0 | (0) [Na] | | | 100 | 100 |
| Comparative Example 53-1 | (0)-VC-0.5 [Na] | | | 100 | 90 |
| Comparative Example 53-2 | Na (17)-0.5 [Na] | | | 103 | 100 |
| Comparative Example 53-3 | Na (18)-0.5 [Na] | | | 101 | 100 |
| Example 54-1 | Na (2)-0.5-FEC-1 [Na] | | | 112 | 111 |
| Example 54-2 | Na (4)-0.5-FEC-1 [Na] | | | 125 | 137 |
| Example 54-3 | Na (6)-0.5-FEC-1 [Na] | | | 119 | 109 |
| Example 54-4 | Na (9)-0.5-FEC-1 [Na] | | | 118 | 121 |
| Example 54-5 | Na (15)-0.5-FEC-1 [Na] | | | 119 | 120 |
| Comparative Example 54-0 | (0)-FEC-1 [Na] | | | 100 | 100 |
| Comparative Example 54-1 | (0)-FEC-1-VC-0.5 [Na] | | | 101 | 95 |
| Comparative Example 54-2 | Na (17)-0.5-FEC-1 [Na] | | | 103 | 100 |
| Comparative Example 54-3 | Na (18)-0.5-FEC-1 [Na] | | | 102 | 100 |

*In Examples 53-1 to 53-5 and Comparative Examples 53-1 to 53-3, the values were each a relative value when the result of evaluation in Comparative Example 53-0 was defined as 100.
*In Examples 54-1 to 54-5 and Comparative Examples 54-1 to 54-3, the values were each a relative value when the result of evaluation in Comparative Example 54-0 was defined as 100.

Examples and Comparative Examples Having Variously Modified Electrolyte Solution Compositions, Negative Electrode Bodies, and Positive Electrode Bodies Electrolyte solutions were each prepared by the same procedure as that in Electrolyte solution No. Na(2)-0.5 [Na] except that the types and the concentrations of the ionic compounds and the types and the concentrations of other solutes and additives were variously changed as shown in Table 30.

Batteries having the electrode compositions shown in Tables 31 to 33 were produced using the resultant electrolyte solutions by the same procedure as that in Example 53-1 and were evaluated as described above.

Incidentally, the positive electrode body whose positive electrode active material is $NaFe_{0.4}Ni_{0.3}Mn_{0.3}O_2$ was produced by mixing a $NaFe_{0.4}Ni_{0.3}Mn_{0.3}O_2$ powder (90 mass %) with PVDF (5 mass %) as a binder and acetylene black (5 mass %) as a conductive material, further adding NMP to the resultant mixture, applying the resultant paste onto aluminum foil, and drying it. In the evaluation of the battery, the charge termination voltage was 4.1 V, and the discharge termination voltage was 2.0 V.

The positive electrode body whose positive electrode active material is $NaNi_{1/3}Ti_{1/6}Mn_{1/2}O_2$ was produced by mixing a $NaNi_{1/3}Ti_{1/6}Mn_{1/2}O_2$ powder (90 mass %) with PVDF (5 mass %) as a binder and acetylene black (5 mass %) as a conductive material, further adding NMP to the resultant mixture, applying the resultant paste onto aluminum foil, and drying it. In the evaluation of the battery, the charge termination voltage was 4.5 V, and the discharge termination voltage was 1.5 V.

TABLE 32

| | Electrolyte solution No. | Positive electrode active material | Negative electrode active material | Discharge capacity retention rate after cycles* [%] | High-output capacity retention rate* [%] |
|---|---|---|---|---|---|
| Example 55-1 | Na (2)-0.5-NaPF4(Ox)-2 [Na] | $NaFe_{0.4}Ni_{0.3}Mn_{0.3}O_2$ | Hard carbon | 115 | 110 |
| Example 55-2 | Na (4)-0.5-NaPF4(Ox)-2 [Na] | | | 128 | 125 |
| Example 55-3 | Na (6)-0.5-NaPF4(Ox)-2 [Na] | | | 119 | 111 |
| Example 55-4 | Na (9)-0.5-NaPF4(Ox)-2 [Na] | | | 118 | 113 |
| Example 55-5 | Na (15)-0.5-NaPF4(Ox)-2 [Na] | | | 120 | 118 |
| Comparative Example 55-0 | (0)-NaPF4(Ox)-2 [Na] | | | 100 | 100 |
| Comparative Example 55-1 | (0)-NaPF4(Ox)-2-VC-0.5 [Na] | | | 101 | 93 |
| Comparative Example 55-2 | Na (17)-0.5-NaPF4(Ox)-2 [Na] | | | 104 | 100 |
| Comparative Example 55-3 | Na (18)-0.5-NaPF4(Ox)-2 [Na] | | | 101 | 100 |
| Example 56-1 | Na (2)-0.3-NaN(SO2F)2-1 [Na] | | | 117 | 116 |
| Example 56-2 | Na (4)-0.3-NaN(SO2F)2-1 [Na] | | | 122 | 135 |
| Example 56-3 | Na (6)-0.3-NaN(SO2F)2-1 [Na] | | | 117 | 111 |
| Example 56-4 | Na (9)-0.3-NaN(SO2F)2-1 [Na] | | | 118 | 117 |
| Example 56-5 | Na (15)-0.3-NaN(SO2F)2-1 [Na] | | | 119 | 120 |
| Comparative Example 56-0 | (0)-NaN(SO2F)2-1 [Na] | | | 100 | 100 |
| Comparative Example 56-1 | (0)-NaN(SO2F)2-1-VC-0.3 [Na] | | | 100 | 97 |
| Comparative Example 56-2 | Na (17)-0.3-NaN(SO2F)2-1 [Na] | | | 104 | 100 |
| Comparative Example 56-3 | Na (18)-0.3-NaN(SO2F)2-1 [Na] | | | 101 | 100 |

*In Examples 55-1 to 55-5 and Comparative Examples 55-1 to 55-3, the values were each a relative value when the result of evaluation in Comparative Example 55-0 was defined as 100.
*In Examples 56-1 to 56-5 and Comparative Examples 56-1 to 56-3, the values were each a relative value when the result of evaluation in Comparative Example 56-0 was defined as 100.

TABLE 33

| | Electrolyte solution No. | Positive electrode active material | Negative electrode active material | Discharge capacity retention rate after cycles* [%] | High-output capacity retention rate* [%] |
|---|---|---|---|---|---|
| Example 57-1 | Na (2)-0.1-NaN(SO2F)(POF2)-1 [Na] | $NaNi_{1/3}Ti_{1/6}Mn_{1/2}O_2$ | Hard carbon | 109 | 108 |
| Example 57-2 | Na (4)-0.1-NaN(SO2F)(POF2)-1 [Na] | | | 116 | 119 |
| Example 57-3 | Na (6)-0.1-NaN(SO2F)(POF2)-1 [Na] | | | 110 | 107 |
| Example 57-4 | Na (9)-0.1-NaN(SO2F)(POF2)-1 [Na] | | | 116 | 117 |
| Example 57-5 | Na (15)-0.1-NaN(SO2F)(POF2)-1 [Na] | | | 111 | 115 |

TABLE 33-continued

|  | Electrolyte solution No. | Positive electrode active material | Negative electrode active material | Discharge capacity retention rate after cycles* [%] | High-output capacity retention rate* [%] |
|---|---|---|---|---|---|
| Comparative Example 57-0 | (0)-NaN(SO2F)(POF2)-1 [Na] |  |  | 100 | 100 |
| Comparative Example 57-1 | (0)-NaN(SO2F)(POF2)-1-VC-0.1 [Na] |  |  | 101 | 98 |
| Comparative Example 57-2 | Na (17)-0.1-NaN(SO2F)(POF2)-1 [Na] |  |  | 102 | 100 |
| Comparative Example 57-3 | Na (18)-0.1-NaN(SO2F)(POF2)-1 [Na] |  |  | 101 | 100 |
| Example 58-1 | Na (2)-0.5-NaN(SO2F)(COF)-1-FEC-1 [Na] |  |  | 113 | 114 |
| Example 58-2 | Na (4)-0.5-NaN(SO2F)(COF)-1-FEC-1 [Na] |  |  | 121 | 120 |
| Example 58-3 | Na (6)-0.5-NaN(SO2F)(COF)-1-FEC-1 [Na] |  |  | 114 | 115 |
| Example 58-4 | Na (9)-0.5-NaN(SO2F)(COF)-1-FEC-1 [Na] |  |  | 120 | 117 |
| Example 58-5 | Na (15)-0.5-NaN(SO2F)(COF)-1-FEC-1 [Na] |  |  | 121 | 123 |
| Comparative Example 58-0 | (0)-NaN(SO2F)(COF)-1-FEC-1 [Na] |  |  | 100 | 100 |
| Comparative Example 58-1 | (0)-NaN(SO2F)(COF)-1-FEC-1-VC-0.5 [Na] |  |  | 100 | 95 |
| Comparative Example 58-2 | Na (17)-0.5-NaN(SO2F)(COF)-1-FEC-1 [Na] |  |  | 104 | 99 |
| Comparative Example 58-3 | Na (18)-0.5-NaN(SO2F)(COF)-1-FEC-1 [Na] |  |  | 101 | 100 |

*In Examples 57-1 to 57-5 and Comparative Examples 57-1 to 57-3, the values were each a relative value when the result of evaluation in Comparative Example 57-0 was defined as 100.
*In Examples 58-1 to 58-5 and Comparative Examples 58-1 to 58-3, the values were each a relative value when the result of evaluation in Comparative Example 58-0 was defined as 100.

It was confirmed from the results shown in Tables 31 to 33 that also for the sodium ion batteries, similarly, the high-temperature cycle properties and the low-temperature output properties can be exhibited in a well-balanced manner regardless of the types of the negative electrode active materials and the positive electrode active materials by using the electrolyte solutions containing the ionic compounds of the present invention.

What is claimed is:

1. An additive for a non-aqueous electrolyte solution represented by formula [1]:

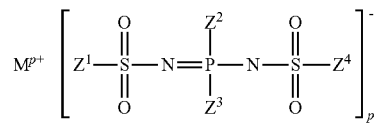

[1]

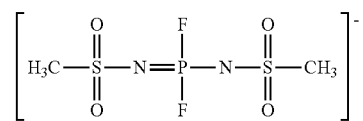

(1)

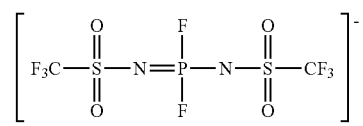

(2)

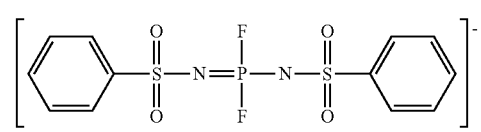

(3)

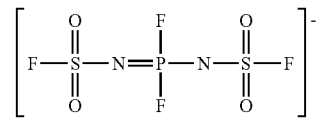

(4)

wherein in formula [1], the anion is selected from the group consisting of:

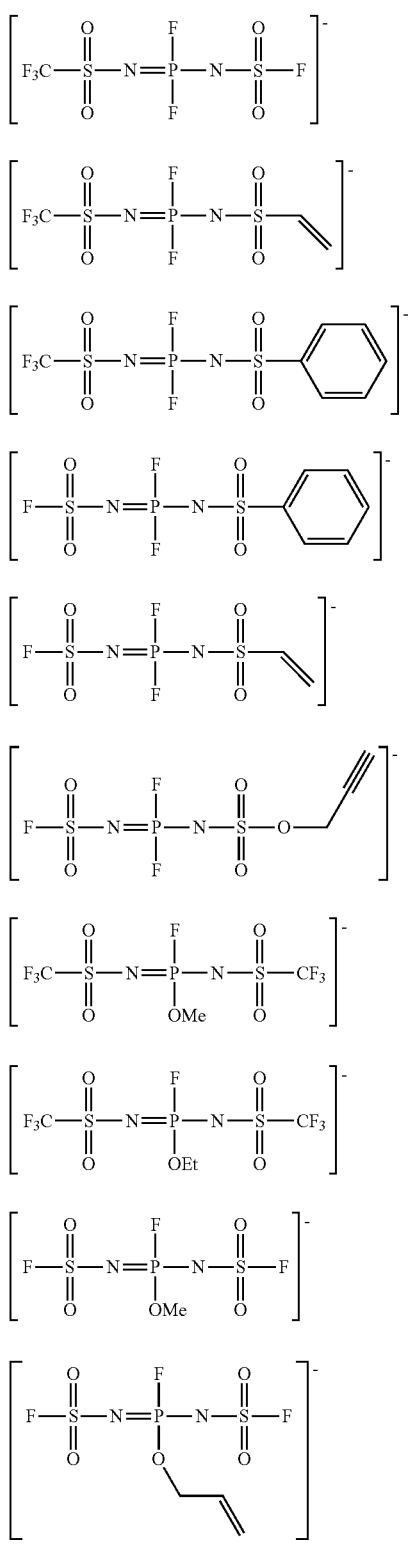

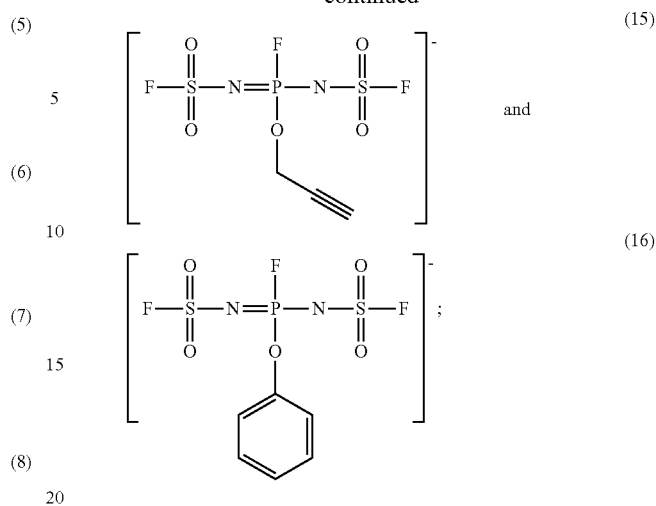

$M^{p+}$ is a proton, a metal cation, or an onium cation; and p is a cation valence.

2. The additive for a non-aqueous electrolyte solution according to claim 1, wherein $M^{p+}$ is at least one cation selected from the group consisting of a proton, a lithium ion, a sodium ion, a potassium ion, a tetraalkylammonium ion, and a tetraalkylphosphonium ion.

3. A non-aqueous electrolyte solution comprising a non-aqueous solvent, a solute, and the additive for a non-aqueous electrolyte solution according to claim 1.

4. The non-aqueous electrolyte solution according to claim 3, wherein a content of the additive for a non-aqueous electrolyte solution is within a range of 0.005 to 5.0 mass % based on the total amount of the non-aqueous solvent, the solute, and the additive for a non-aqueous electrolyte solution.

5. The non-aqueous electrolyte solution according to claim 3, wherein the solute is at least one selected from the group consisting of $LiPF_6$, $LiBF_4$, $LiPF_2(C_2O_4)_2$, $LiPF_4(C_2O_4)_2$, $LiP(C_2O_4)_3$, $LiBF_2(C_2O_4)$, $LiB(C_2O_4)_2$, $LiPO_2F_2$, $LiN(POF_2)_2$, $LiN(FSO_2)(POF_2)$, $LiN(FSO_2)(POF(OCH_2C\equiv CH))$, $LiN(FSO_2)_2$, $LiN(CF_3SO_2)_2$, $LiN(CF_3SO_2)(FSO_2)$, $LiSO_3F$, $NaPF_6$, $NaBF_4$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(POF_2)_2$, $NaN(FSO_2)(POF_2)$, $NaN(FSO_2)(POF(OCH_2C\equiv CH))$, $NaN(FSO_2)_2$, $NaN(FSO_2)(FCO)$, $NaN(CF_3SO_2)_2$, $NaN(CF_3SO_2)(FSO_2)$, and $NaSO_3F$.

6. The non-aqueous electrolyte solution according to claim 3, further comprising at least one selected from the group consisting of vinylene carbonate, fluoroethylene carbonate, 1,3,2-dioxathiolane 2,2-dioxide, tetravinylsilane, and 1,3-propanesultone.

7. The non-aqueous electrolyte solution according to claim 3, wherein the non-aqueous solvent is at least one selected from the group consisting of a cyclic carbonate, a chain carbonate, a cyclic ester, a chain ester, a cyclic ether, a chain ether, a sulfone compound, a sulfoxide compound, and an ionic liquid.

8. A non-aqueous electrolyte solution battery at least comprising a positive electrode, a negative electrode, and the non-aqueous electrolyte solution according to claim 3.

* * * * *